US012785820B2

(12) United States Patent
Deban et al.

(10) Patent No.: US 12,785,820 B2
(45) Date of Patent: Nov. 3, 2026

(54) SYSTEMS AND METHODS FOR COMMON MODE REJECTION (CMR) FILTERING IN A SUBSTRATE

(71) Applicant: CIENA CORPORATION, Hanover, MD (US)

(72) Inventors: Ramin Deban, Côte St-Luc (CA); Shuhui Deng, Nepean (CA)

(73) Assignee: CIENA CORPORATION, Hanover, MD (US)

( * ) Notice: Subject to any disclaimer, the term of this patent is extended or adjusted under 35 U.S.C. 154(b) by 251 days.

(21) Appl. No.: 18/664,532

(22) Filed: May 15, 2024

(65) Prior Publication Data

US 2025/0358022 A1 Nov. 20, 2025

(51) Int. Cl.
*H04B 15/02* (2006.01)
*H04B 1/40* (2015.01)
(Continued)

(52) U.S. Cl.
CPC ............... *H04B 15/02* (2013.01); *H04B 1/40* (2013.01); *H04B 3/06* (2013.01); *H04B 10/65* (2020.05)

(58) Field of Classification Search
CPC .......... H04B 1/40; H04B 10/65; H04B 15/02; H04B 3/06; H04B 1/0003; H04B 1/005; H04B 1/02; H04B 1/06; H04B 1/38; H04B 1/3805; H04B 1/3816; H04B 1/3827; H04B 1/62; H04B 1/66; H04B 1/69; H04B 1/74;
(Continued)

(56) References Cited

U.S. PATENT DOCUMENTS 10,491,184 B1 * 11/2019 Yan ...................... H03H 7/0115
2004/0042141 A1 * 3/2004 Mikolajczak ........ H05K 1/0233 361/103

(Continued)

FOREIGN PATENT DOCUMENTS

CN 107039719 A * 8/2017 .............. H01P 1/207
CN 110212274 A * 9/2019 .............. H01P 1/208

(Continued)

OTHER PUBLICATIONS

C. Olivieri et al., "Miniaturization Approach for EBG-Based Common Mode Filter and Interference Analysis," May 14, 2015, 2015 IEEE Symposium on Electromagnetic Compatibility and Signal Integrity, pp. 1-5.*

(Continued)

*Primary Examiner* — Omar S Ismail
(74) *Attorney, Agent, or Firm* — Guntin & Gust, PLC; Kenneth S. Kwan

(57) ABSTRACT

Aspects of the subject disclosure may include, for example, a substrate, comprising a first layer, a second layer, and an intermediary layer between the first layer and the second layer, a first pair of traces positioned in the first layer, a second pair of traces positioned in the second layer, and a jumper configuration at least partially defined in the intermediary layer, wherein the jumper configuration comprises a pair of vias that are configured for coupling the first pair of traces and the second pair of traces and for providing common mode rejection (CMR) filtering between first signals on the first pair of traces and second signals on the second pair of traces. Other embodiments are disclosed.

20 Claims, 52 Drawing Sheets portion of flex 220

(51) Int. Cl.
*H04B 3/06* (2006.01)
*H04B 10/61* (2013.01)

(58) Field of Classification Search
CPC ... H04B 3/02; H04B 3/14; H04B 3/16; H04B 3/20; H04B 3/32; H04B 3/36; H04B 3/46; H04B 3/54; H04B 5/20; H04B 5/40; H04B 5/70; H04B 5/24; H04B 10/66; H04B 10/03; H04B 10/07; H04B 10/11; H04B 10/25; H04B 10/27; H04B 10/29; H04B 10/40; H04B 10/50; H04B 10/60; H04B 10/61; H04B 10/615; H04B 10/616; H04B 10/80; H04B 14/02; H04B 14/002; H04B 17/0082; H04B 17/10; H04B 17/20; H04B 17/30; H04B 17/40; H04B 2201/69; H04B 2203/54; H04B 2210/07; H04B 2210/25; H04B 2215/061; H04B 2215/064; H04B 3/04; H04B 1/707; H04B 1/713; H04B 1/04; H04B 1/03
See application file for complete search history.

(56) References Cited

U.S. PATENT DOCUMENTS

2013/0009740 A1* 1/2013 Chang .................. H01F 27/255 336/200
2015/0381219 A1* 12/2015 Kramer ................ H04B 1/0475 375/297
2022/0109238 A1* 4/2022 Varnoosfaderani .......................... H01Q 1/2283
2022/0173507 A1* 6/2022 Varnoosfaderani .......................... H01Q 21/0006
2023/0336248 A1* 10/2023 Nagarajan .............. H04B 10/66

FOREIGN PATENT DOCUMENTS

CN 111478000 B * 9/2021 ................ H01P 1/20
CN 113381141 A * 9/2021 .............. H01P 1/203
CN 113727513 A * 11/2021 ............ H10W 70/65
CN 114899564 A * 8/2022 ............ H01P 1/2135
JP 2020017830 A * 1/2020
WO WO-2024169294 A1 * 8/2024 ........... H01F 27/292

OTHER PUBLICATIONS

Dan Botez et al., Component for Optical Communication Systems:A Review, : Feb. 13, 1980, Proceedings of the IEEE, vol. 68, No. 6, Jun. 1980, pp. 689-716.*
Marina Y. Koledintseva, Design And Sensitivity Analysis Of EBG Stripline Common-Mode Filters, Dec. 1, 2019, IEEE Transactions on Electromagnetic Compatibility, vol. 61, No. 6, pp. 1746-1755.*
Jose L. Medran del Rio et al.,"Multilayered Balanced Dual-Band Bandpass Filter Based on Magnetically Coupled Open-Loop Resonators with Intrinsic Common-Mode Rejection," Apr. 29, 2020, Applied Sciences,2020,10, 3113, pp. 1-10.*
Josuke Ozaki et al., "Coherent Driver Modulator With Flexible Printed Circuit RF Interface for 128-Gbaud Operations," Oct. 21, 2022, IEEE Photonics Technology Letters, vol. 34, No. 23, Dec. 1, 2022, pp. 1289-1292.*
Xuedong Fu et al.,"Improved HMSIW Cavity for Differential Antenna With High Common-Mode Rejection," Dec. 1, 2022, IEEE Antennas and Wireless Propagation Letters, vol. 21, No. 12, Dec. 2022,pp. 2497-2500.*

* cited by examiner portion of flex 220 portion of flex 320 portion of flex 420 portion of flex 420 portion of flex 520 portion of flex 520 portion of flex 620 portion of flex 620 portion of flex 720 portion of flex 720

900

SYSTEMS AND METHODS FOR COMMON MODE REJECTION (CMR) FILTERING IN A SUBSTRATE

FIELD OF THE DISCLOSURE

The subject disclosure relates to common mode rejection (CMR) filtering in a substrate.

BACKGROUND

Many optical communications devices leverage flexible printed circuits (FPCs)—also referred to as flex-PCBs (or simply flex)—in their designs. For instance, a flex may be used to interconnect a transmitter (Tx) application specific integrated circuit (ASIC) and a coherent driver modulator (CDM) transmitter optical package. Similarly, a flex may be used to interconnect an opto-electric receiver, such as a receiver (Rx) ASIC, and an intradyne coherent receiver (ICR) or micro-ICR (μICR).

BRIEF DESCRIPTION OF THE DRAWINGS

Reference will now be made to the accompanying drawings, which are not necessarily drawn to scale, and wherein.

DETAILED DESCRIPTION

Figure 1A:
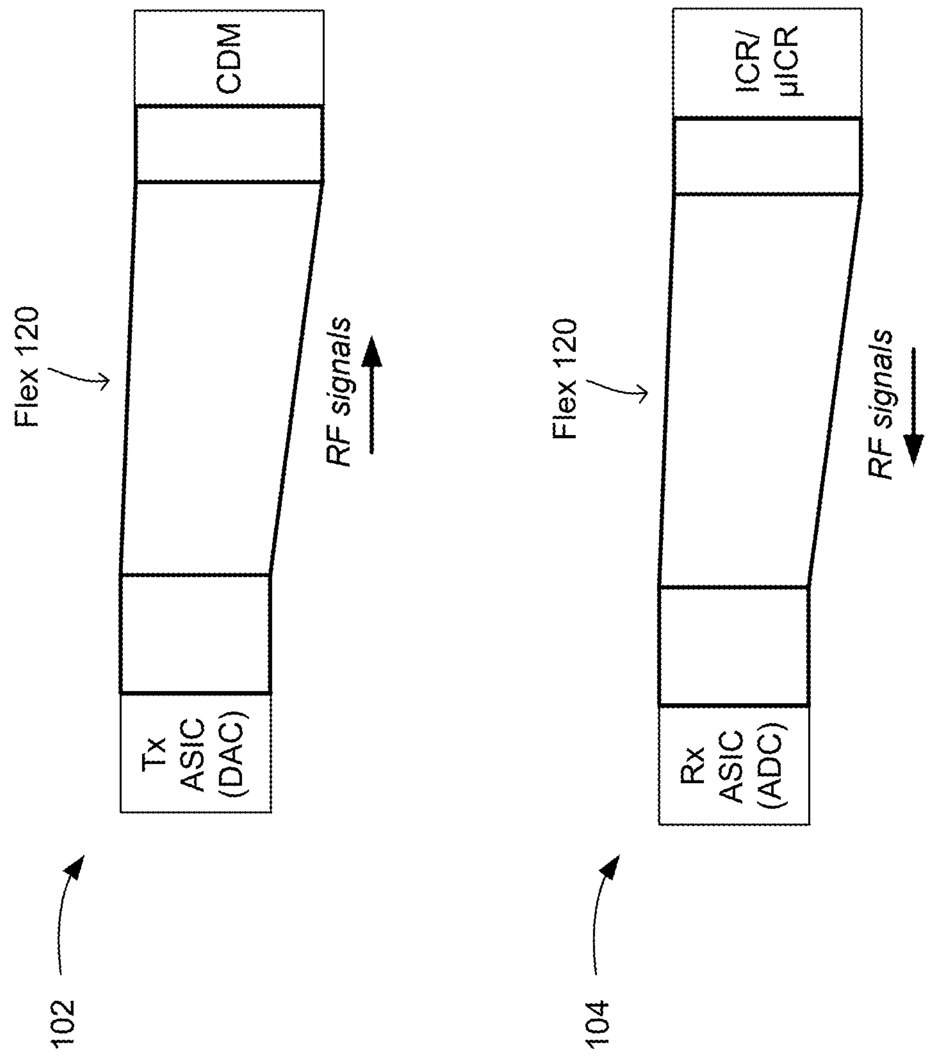
FIG. 1A shows an example flex that can be used to interconnect optical communications system components, such as a Tx ASIC (e.g., digital-to-analog converter (DAC)) and a high-speed CDM or an ICR/μICR and an Rx ASIC (e.g., analog-to-digital converter (ADC)), in accordance with various aspects described herein.

Common mode noise is noise that is common to a differential pair of signals/lines, and can negatively impact device performance. Sources of common mode noise include radio frequency (RF) noise from circuitry, switch mode power supplies, high-frequency signal switching, and so on. The ability of a system to reduce common mode noise is characterized by the ratio between the differential mode gain and the common mode gain—i.e., the common mode rejection ratio (CMRR). A given flex in an optical device or package may be designed to incorporate a mixture or hybrid of traces, such as single-ended lines and differential lines, which can help to mitigate common mode noise. Different types of transitions can also be implemented between a flex and an associated carrier (e.g., an Indium Phosphide (InP) CDM high-temperature co-fired ceramic (HTCC) package, an optical receiver on a substrate-like printed circuit board (PCB) (SLP), etc.) to address common mode noise. However, the common mode noise reduction capabilities of these techniques is generally limited. For instance, common mode noise reduction from the use of different types of flex-to-carrier transitions is bandwidth limited.

The subject disclosure describes, among other things, illustrative embodiments of a jumper (or jumper pair) configuration in a substrate, such as a flex, that facilitates signal transitions across different layers of a substrate, and more particularly, coupling of different sets of differential traces that are in different layers of the substrate. Implementation of the jumper configuration advantageously provides millimeter wave common mode rejection filtering. For instance, a particular jumper pair implementation was found to provide about 3 decibels (dB) of CMRR improvement. In one or more embodiments, multiple jumper pairs (e.g., two or more jumper pairs) may be arranged in a cascaded manner across the flex and coupled with corresponding trace pairs (or bridge traces) to provide additional CMRR improvement. For example, certain jumper pairs arranged in a cascaded manner were found to provide even greater CMR filtering magnitudes—e.g., at least 5 dB to 6 dB of CMRR improvement per jumper pair. Details of the various embodiments are described in more detail below.

While various embodiments of the jumper configuration are described herein as being implemented in a flex, it is to be understood and appreciated that the jumper configuration may also be implemented in other materials or structures, such as ceramic substrates, high-density build-up (HDBU) substrates, SLPs, etc. to provide CMRR improvement.

Further, while various embodiments of the jumper configuration are described herein as being implemented in a flex that interconnects particular optical communications components (such as a Tx ASIC and CDM or an Rx ASIC and ICR/μICR), it is to be understood and appreciated that the jumper configuration may be utilized in a variety of applications, such as, for instance, transceiver applications, intensity modulation/direct detection (IM/DD) applications (e.g., on-board optics (OBO), co-packaged optics (CPO), etc.), etc.

One or more aspects of the subject disclosure include a substrate. The substrate may include a first layer, a second layer, and an intermediary layer between the first layer and the second layer. The substrate may further include a first pair of traces positioned in the first layer. The substrate may further include a second pair of traces positioned in the second layer. The substrate may further include a jumper configuration at least partially defined in the intermediary layer, wherein the jumper configuration comprises a pair of vias that are configured for coupling the first pair of traces and the second pair of traces and for providing common mode rejection (CMR) filtering between first signals on the first pair of traces and second signals on the second pair of traces.

One or more aspects of the subject disclosure include an apparatus. The apparatus may include first and second components of an optical communications system. The apparatus may further include a substrate that interconnects the first and second components, the substrate having a first layer, a second layer, and an intermediary layer between the first layer and the second layer, a first pair of traces positioned in the first layer, a second pair of traces positioned in the second layer, and a jumper configuration at least partially defined in the intermediary layer, wherein the jumper configuration comprises a pair of vias for coupling the first pair of traces and the second pair of traces and for providing common mode rejection (CMR) filtering between first signals on the first pair of traces and second signals on the second pair of traces.

One or more aspects of the subject disclosure include a method. The method may include identifying a portion of an intermediary layer of a substrate for implementing a jumper configuration, wherein the intermediary layer is disposed between a first layer of the substrate and a second layer of the substrate, wherein a first pair of traces is positioned in the first layer, and wherein a second pair of traces is positioned in the second layer. The method may further include at least partially defining the jumper configuration in the portion of the intermediary layer, wherein the jumper configuration comprises a pair of vias for coupling the first pair of traces and the second pair of traces and for providing common mode rejection (CMR) filtering between first signals on the first pair of traces and second signals on the second pair of traces.

Figure 1B:
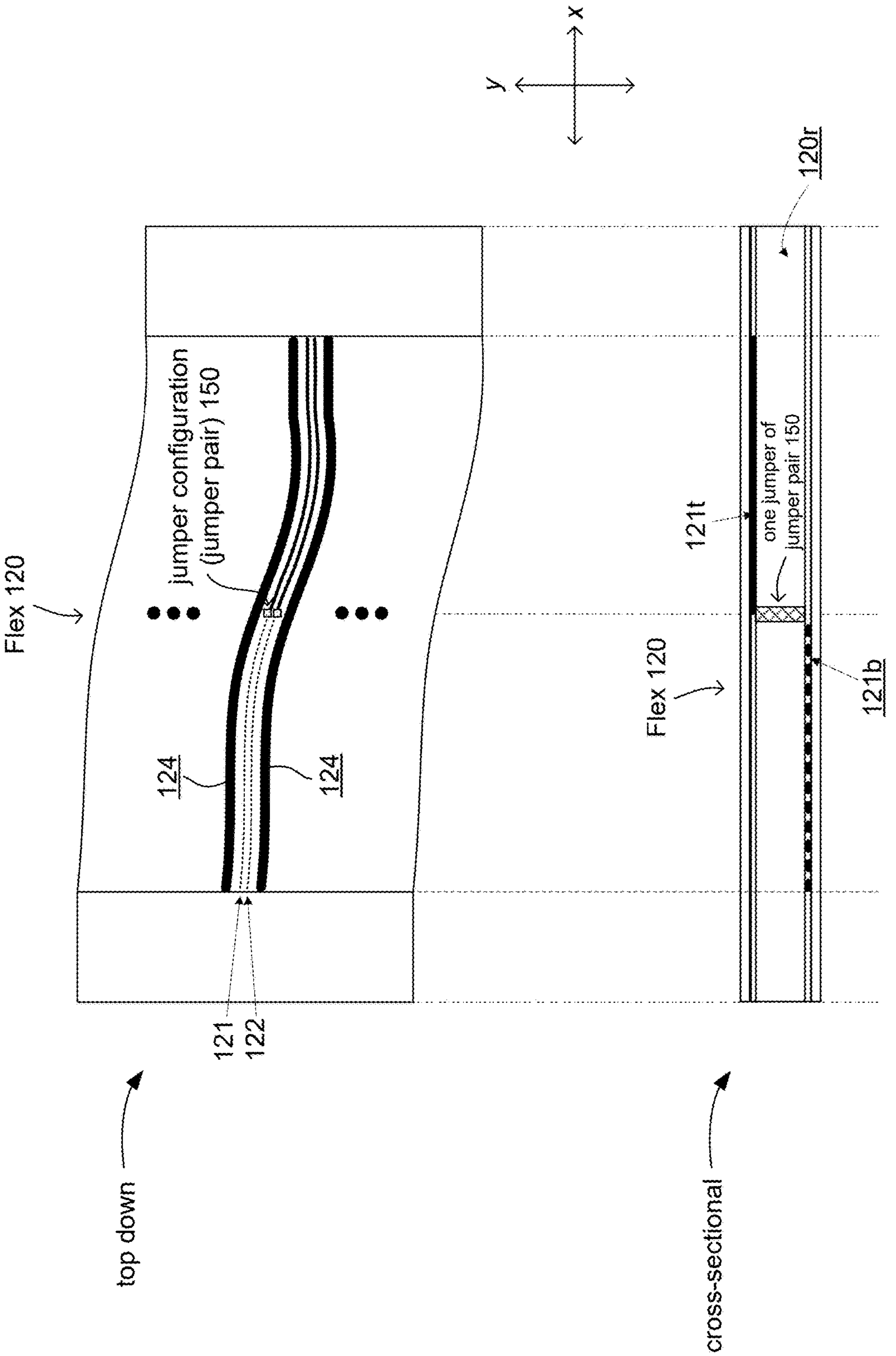
FIG. 1B shows top down and cross-sectional views of the flex of FIG. 1A in accordance with various aspects described herein.

FIG. 1A shows an example flex 120 that can be used to interconnect optical communications system components, such as a Tx ASIC (e.g., DAC) and a high-speed CDM (102) or an ICR/μICR and an Rx ASIC (e.g., ADC) (104), in accordance with various aspects described herein. FIG. 1B shows top down and cross-sectional views of the flex 120 in accordance with various aspects described herein.

The high-speed CDM and the Tx ASIC may be included as part of an optical transmitter of a communication network that is in communication with at least one optical receiver. The optical transmitter may be capable of transmitting signals to the at least one optical receiver over an optical communication channel (e.g., one or more links, where each link may include one or more spans, and where each span may include a length of optical fiber and one or more optical amplifiers). In some embodiments, the optical transmitter may also be capable of receiving signals and/or the optical receiver(s) may also be capable of transmitting signals. Thus, the optical transmitter and/or the optical receiver(s) may each be capable of acting as a transceiver. In one or more embodiments, the optical transmitter and/or the optical receiver(s) may each be a coherent modem. In exemplary embodiments, the high-speed CDM may include a combination of optical and electrical components, such as, for example, a driver and one or more modulators and/or one or more other components of the optical transmitter, such as laser source(s), a modulator bias controller, a Tx controller, and/or the like. In various embodiments, the high-speed CDM may employ nested Mach-Zehnder (MZ) architecture(s)—i.e., two dual-parallel MZs (DPMZs), each with two inner MZs and one outer MZ—resulting in a quad parallel MZ (QPMZ) modulator. In some embodiments, the high-speed CDM may be a thin-film Lithium Niobate (TFLN)-based modulator. In other embodiments, the high-speed CDM may be based on one or more other suitable materials/technologies. In one or more embodiments, the optical transmitter may be equipped to control four quadrature data signals via the Tx ASIC (i.e., radio frequency (RF) XI, RF XQ, RF YI, RF YQ signals, where X, Y denote polarization and I, Q denote in-phase and quadrature, respectively). For instance, the high-speed CDM may include an XI modulator, an XQ modulator, and an outer phase modulator (respectively functioning as two inner MZs nested within an outer MZ for the X polarization) as well as a YI modulator, a YQ modulator, and an outer phase modulator (respectively functioning as two inner MZs nested within an outer MZ for the Y polarization). The laser source(s) may provide laser output(s) for modulation by the modulators of the high-speed CDM. A laser output may be divided (e.g., via a beam splitter) into X and Y polarizations, where the X polarization may be further divided (e.g., via another beam splitter) into an optical I input that is fed into an X-pol I-arm (i.e., the XI modulator) and an optical Q input that is fed into an X-pol Q-arm (i.e., the XQ modulator), and where the Y polarization may be further divided (e.g., via yet another beam splitter) into an optical I input that is fed into a Y-pol I-arm (i.e., the YI modulator) and an optical Q input that is fed into a Y-pol Q-arm (i.e., the YQ modulator). The high-speed CDM may be capable of independently generating orthogonal optical electric field components (I channel and Q channel) for each polarization X and Y, according to various types of multi-value modulation methods, such as N-quadrature amplitude modulation (QAM), differential quadrature phase shift keying (D-QPSK), etc.

In general operation, the Tx ASIC may receive a digital information stream at a digital input and convert the digital information stream (based on an associated modulation scheme) for driving the modulators of the high-speed CDM via analog outputs (RF XI, RF XQ, RF YI, RF YQ). The analog outputs may be communicatively coupled to the modulator via the flex 120. In some embodiments, the Tx ASIC may include a digital filter that provides a transfer function H on the received digital input. DAC(s) may be connected to an output of the digital filter. Output(s) of the DAC(s) may be connected to the driver of the high-speed CDM (which may include an analog amplifier and/or various other components) via the electrically conductive traces of the flex 120 to provide a gain G. Output(s) of the driver may provide the analog output(s) to the modulators of the high-speed CDM. In certain embodiments, a controller may be connected to the digital filter and the driver to control the transfer function H and/or the gain G responsive to a data inversion control signal from a Tx controller.

In the receiver implementation, the ICR/μICR may be configured to receive an optical signal, which may comprise a degraded version of an optical signal generated by a transmitter device (e.g., the Tx ASIC and CDM shown by reference number 102). The optical signal generated by the transmitter device may be representative of information bits (also referred to as client bits) which are to be communicated to the receiver. The optical signal generated by the transmitter device may be representative of a stream of symbols. According to some examples, the transmitter device may be configured to apply forward error correction (FEC) encoding to the client bits to generate FEC-encoded bits, which may then be mapped to one or more streams of data symbols. The optical signal transmitted by the transmitter device may be generated using any of a variety of techniques, such as frequency division multiplexing (FDM), polarization-division multiplexing (PDM), single polarization modulation, modulation of an unpolarized carrier, mode-division multiplexing, spatial-division multiplexing, Stokes-space modulation, polarization balanced modulation, wavelength division multiplexing (WDM) (where a plurality of data streams is transmitted in parallel, over a respective plurality of carriers, and where each carrier is generated by a different laser), and/or the like. The overall receiver may be configured to recover corrected client bits from the received optical signal. The ICR/μICR may include a polarizing beam splitter configured to split the received optical signal into polarized components. According to one example implementation, the polarized components may include orthogonally polarized components corresponding to an X polarization and a Y polarization. An optical hybrid may be configured to process the polarized components with respect to an optical signal produced by a laser, thereby resulting in output optical signals. Photodetectors may be configured to convert the optical signals output by the optical hybrid to analog electrical signals. In some embodiments, various components, such as transimpedance amplifier(s) (TIA(s)), a photonic integrated circuit (PIC) (such as a silicon photonics (SiPhot) coherent receiver chip with high-speed photodiodes) may be implemented in an electronic integrated circuit (EIC) that converts optical signals into analog electrical signals. In any case, the frequency difference between the Rx laser and the Tx laser is the Intermediate Frequency, and an offset of that away from nominal can be called fIF. (The nominal difference is usually zero.) According to one example implementation, the analog electrical signals may include four signals corresponding, respectively, to the dimensions XI, XQ, YI, and YQ. Together, elements such as the beam splitter, the laser, the optical hybrid, and the photodetectors may form a communication interface configured to receive optical signals from other devices in a communication network.

The Rx ASIC may include ADCs that are configured to sample the analog electrical signals and generate respective digital signals. In certain alternate embodiments, the ADCs or portions thereof may be separate from the ASIC. The ADCs may sample the analog electrical signals periodically at a sample rate that is based on a signal received from a voltage-controlled oscillator (VCO) at the receiver device. The ASIC may be configured to apply digital signal processing to the digital signals using a digital signal processing system. The digital signal processing system may be configured to perform equalization processing that is designed to compensate for a variety of channel impairments, such as CD, SOP rotation, mean PMD that determines the probability distribution which instantiates as differential group delay (DGD), PDL or PDG, and/or other effects. The digital signal processing system may further be configured to perform carrier recovery processing, which may include calculating an estimate of carrier frequency offset fIF (i.e., the difference between the frequency of the transmitter laser and the frequency of the receiver laser). According to some example implementations, the digital signal processing system may further be configured to perform operations such as multiple-input-multiple-output (MIMO) filtering, clock recovery, and FDM subcarrier de-multiplexing. The digital signal processing system may also be configured to perform symbol-to-bit demapping (or decoding) using a decision circuit, such that signals output by the digital signal processing system are representative of bit estimates. Where the received optical signal is representative of symbols comprising FEC-encoded bits generated as a result of applying FEC encoding to client bits, the signals output by the digital signal processing system may further undergo FEC decoding to recover the corrected client bits. The equalization processing implemented as part of the digital signal processing system may include one or more equalizers, some or all of which may be configured to compensate for impairments in the channel response. In general, an equalizer applies a substantially linear filter to an input signal to generate an output signal that is less degraded than the input signal. The filter may be characterized by compensation coefficients which may be incrementally updated from time to time (e.g., every so many clock cycles or every so many seconds) with the goal of reducing the degradation observed in the output signal.

Figure 1C:
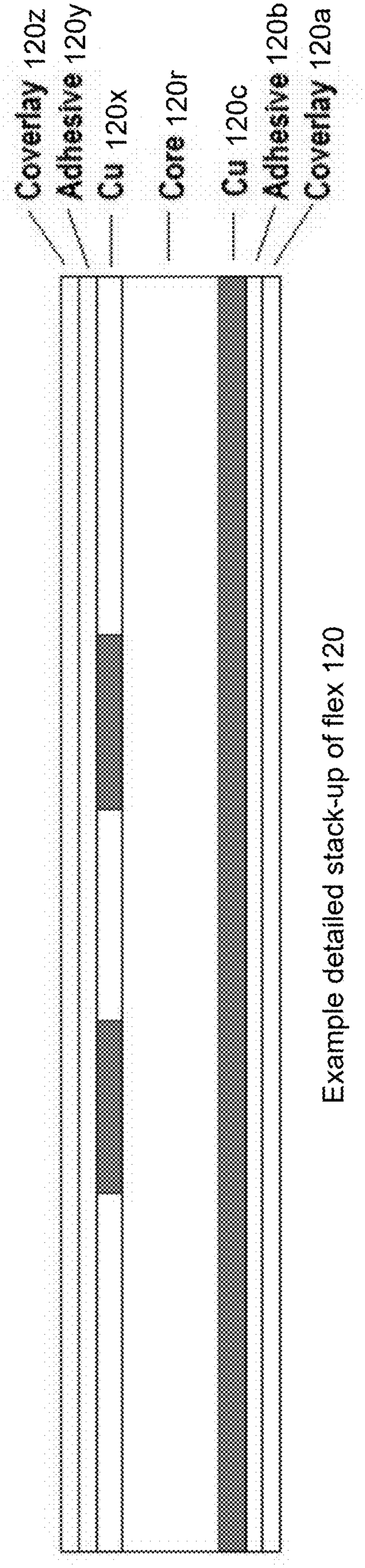
FIG. 1C shows an example stack-up of the flex of FIG. 1A in more detail, in accordance with various aspects described herein.

The flex 120 may be a multi-layer, semi-rigid flex substrate construction. One or more portions of the flex 120 may be composed of one or more materials (e.g., liquid crystal polymer or other composite material, such as Pyralux® TK or the like). The flexible section may be at least partially composed of a thin, flexible structural support material (e.g., 120*r* of FIG. 1B). In various embodiments, the flexible support material may be a dielectric material. Example dielectric materials include polyester, polyimide, and/or the like. The circuit may be defined by placing or printing electrically conductive (RF) traces (e.g., composed of copper or other suitable conductors) on the material and laminating the traces with one or more insulating layers, which can prevent the traces from shorting one another. Example insulating layer materials include polymer, such as epoxy, polyester, and/or the like. Laminating adhesive (e.g., a thermoset adhesive) may be used to bond the various materials together via high temperature curing. FIG. 1C shows an example stack-up of the flex 120 in more detail, in accordance with various aspects described herein. As depicted in FIG. 1C, the flex 120 may include coverlays 120*a*, 120*z* coupled to conductive (e.g., copper (CU)) layers 120*c*, 120*x* by way of respective adhesive layers 120*b*, 120*y*, all sandwiching core dielectric layer 120*r*. It is to be understood and appreciated that the flex 120 may include additional layers, such as one or more ground layers, one or more additional conductive layers, and/or one or more additional dielectric layers throughout the stack.

The flex 120 may include multiple pairs of differential traces, each pair of which may carry an analog electrical signal and a corresponding inverted signal. In particular, a first trace of one pair of differential traces may carry an XI signal and a second trace of that pair may carry an inversion of the XI signal, a first trace of another pair of differential traces may carry an XQ signal and a second trace of that pair may carry an inversion of the XQ signal, and so on for the YI and YQ signals. For instance, the top down view in FIG. 1B shows a pair of differential traces 121, 122. In this way, the flex 120 may include at least four pairs of differential traces. The flex may, of course, also include other traces, such as ground (GND) traces 124.

Depending on the particular implementation of the components that are to be interconnected by the flex 120 (e.g., whether the CDM is a flip-chip design or otherwise) and their relative positions (e.g., in height), there may be a desire to define traces in or proximate to a lower surface or layer of the flex 120 for one span of the flex 120 and to define traces in or proximate to an upper surface or layer of the flex 120 for another span of the flex 120. In exemplary embodiments, the flex 120 may, for a given pair of differential traces, include a jumper configuration (or a jumper pair) 150 that functions as an electrically conductive transition between such traces. See, for instance, the cross-sectional view in FIG. 1B in which a trace 121*b* of differential trace 121 is defined in or proximate to the lower surface or layer of the flex 120, a trace 121*t* of differential trace 121 is defined in or proximate to the upper surface or layer of the flex 120, and a jumper of the jumper configuration 150 electrically couples traces 121*b* and 121*t*.

Figure 1D:
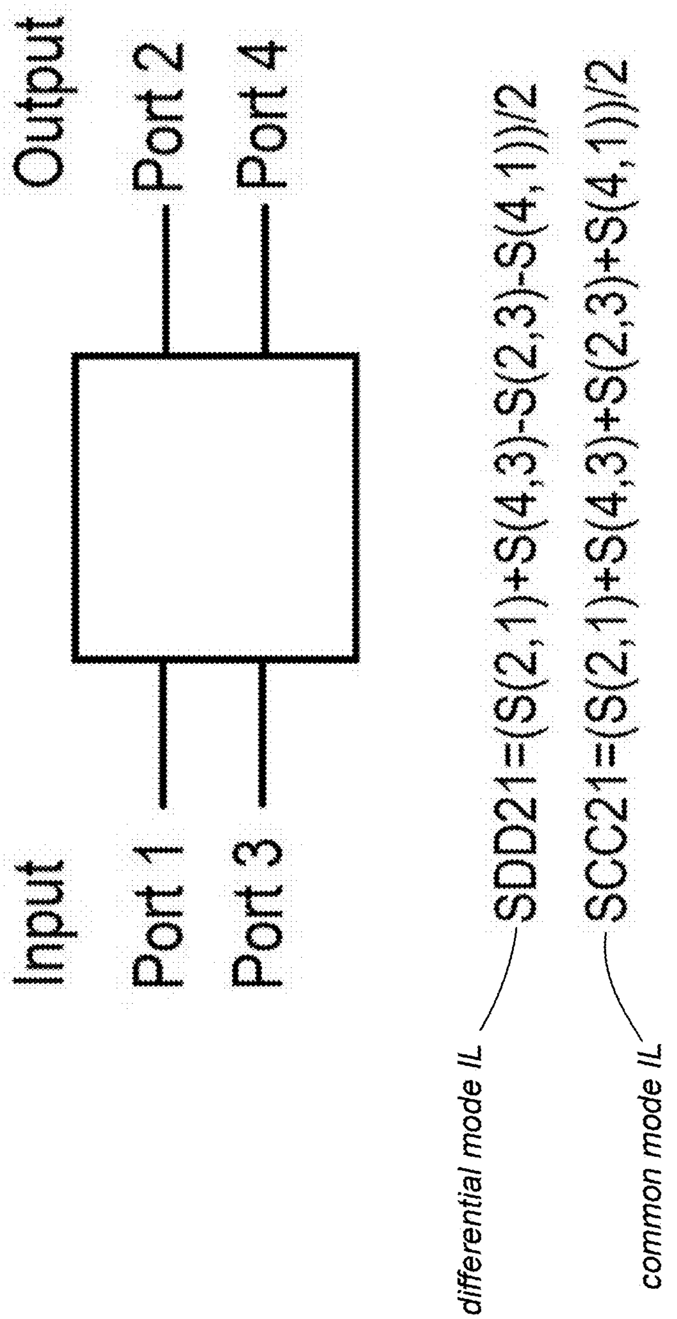
FIG. 1D shows a jumper configuration represented as a CMR filter block with particular equations that characterize the differential mode insertion loss (IL) and common mode IL of the CMR filter, in accordance with various aspects described herein.

FIG. 1D shows a jumper configuration represented as a CMR filter block with particular equations that characterize the differential mode IL and common mode IL of the CMR filter, in accordance with various aspects described herein. The representation shown in FIG. 1D may correspond to the jumper configuration 150 described above with respect to FIG. 1B (i.e., a single jumper configuration) or any other jumper configuration that includes multiple jumper pairs (e.g., a dual jumper configuration, a triple jumper configuration, etc., as described in more detail below). Here, assuming that signaling is from left to right, ports 1 and 3 are at an input side of the jumper configuration and ports 2 and 4 are at the output side of the jumper configuration, with differential signals flowing from port 1 to port 2 and from port 3 to port 4. For a regular transmission pair, the single-ended through S(2,1) or S(4,3) is much stronger than the mutual coupling S(2,3) or S(4,1). Both SDD21 and SCC21 are low-loss for differential and common mode signal transmissions from the input to the output. The CMR filtering may be designed such that the mutual coupling magnitude of S(2,3) or S(4,1) increases toward or approaches the through S(2,1) or S(4,3). The phase of the mutual coupling may also be adjusted. For common mode IL SCC21, there may be cancellations (or near cancellations) between S(2,1) and S(2,3) and between S(4,3) and S(4,1). The relative phase is the phase difference between S(2,3) and S(2,1) or between S(4,1) and S(4,3), and may approach −180 degrees. These characteristics allow for common mode rejection. For differential mode IL SDD21, there may be enhancements between S(2,1) and −S(2,3) and between S(4,3) and −S(4,1). In essence, the p-n coupling phase change provided by the jumper pair contributes to the CMR filtering property and also enhances the differential mode.

While there are signal vias in the overall CMR filter design, the differential mode IL SDD21 is nevertheless good (e.g., for up to 100 gigahertz (GHz)). It is to be understood and appreciated that the jumper configuration may be built or used for any type of lines to provide CMR filtering—e.g., differential microstrip lines, coplanar lines, strip lines, and other transmission lines.

Figure 2A:
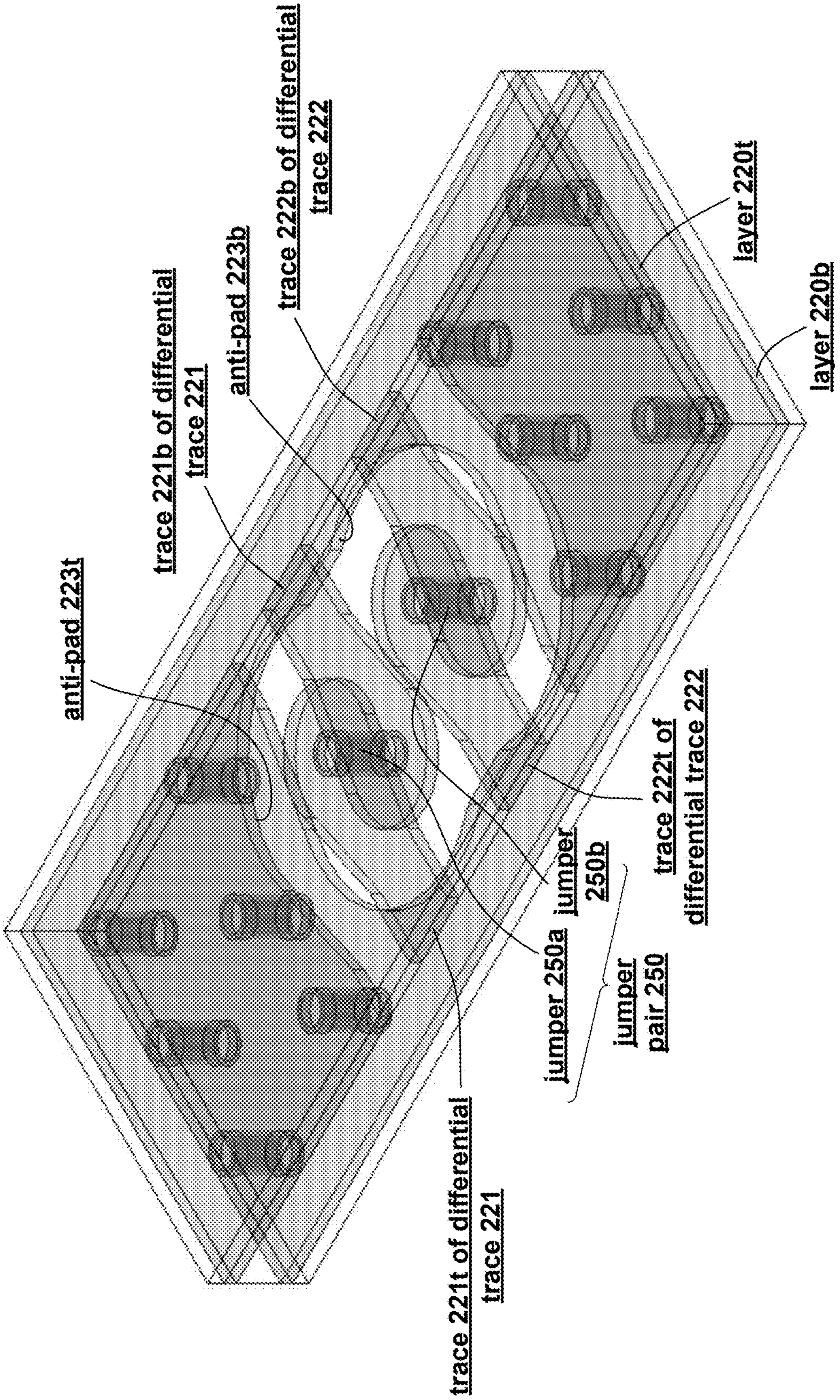
FIGS. 2A and 2B show a transparent perspective view and a top down view, respectively, of a portion of a flex that is configured with a single jumper configuration (or a single jumper pair), in accordance with various aspects described herein.
Figure 2B:
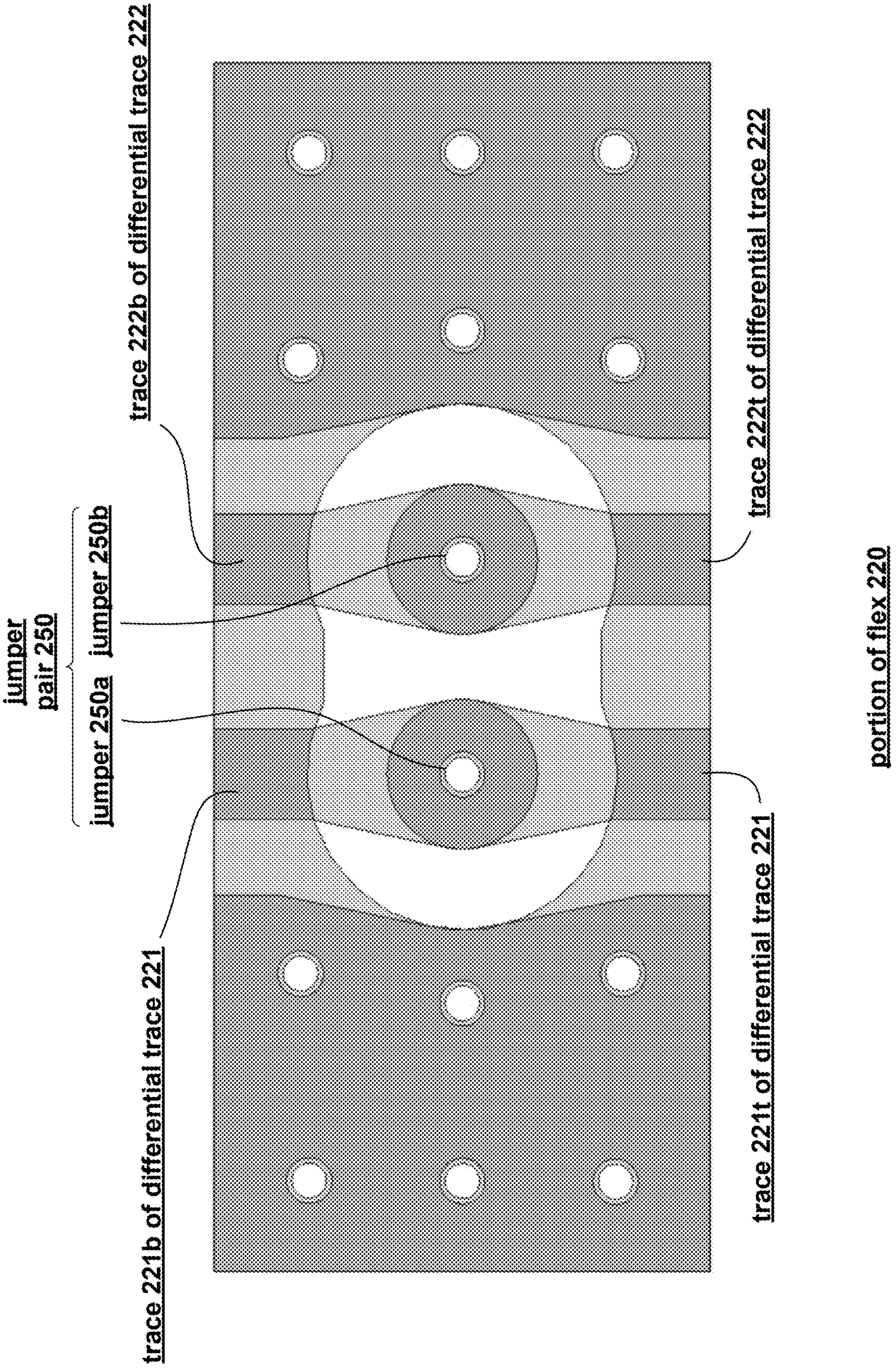

FIGS. 2A and 2B show a transparent perspective view and a top down view, respectively, of a portion of a flex 220 that is configured with a single jumper configuration (or a single jumper pair) 250, in accordance with various aspects described herein. In certain embodiments, the flex 220 may be the same as or similar to the flex 120 described above with respect to FIGS. 1A to 1C, and the jumper configuration 250 may be the same as or similar to the jumper configuration 150 described above with respect to FIG. 1B.

As depicted in FIGS. 2A and 2B, the jumper configuration 250 may include two jumpers 250*a*, 250*b* that respectively interconnect traces 221*t*, 222*t* of differential lines 221, 222 in a layer 220*t* of the flex 220 with traces 221*b*, 222*b* of the differential lines 221, 222 in a layer 220*b* of the flex 220, with anti-pads 223*t*, 223*b* being respectively defined in those layers.

In various embodiments, the jumpers 250*a*, 250*b* may be formed as vias (e.g., a micro via or the like). In some embodiments, the jumpers 250*a*, 250*b* may be formed or etched using lithography followed by hole plating and/or filling. For instance, the jumpers 250*a*, 250*b* may each be plated with electrically conductive material (e.g., copper, tungsten, aluminum, gold, and/or the like) (e.g., at a thickness of about 10 micrometers (μm)) and/or partially or fully filled with such electrically conductive material, such that the traces 221*t*, 222*t* become electrically coupled to the traces 221*b*, 222*b* by way of the jumpers 250*a*, 250*b*. It is to be understood and appreciated that for a substrate other than a flex (e.g., a ceramic substrate), other techniques, such as mechanical drilling or the like, may additionally, or alternatively, be used to form the jumper pair.

The length and/or the diameter of (e.g., each of) the jumpers 250*a*, 250*b* may be defined or selected to achieve certain (e.g., optimal) CMRR improvement. For instance, in one or more implementations, the length of (e.g., each of) the jumpers 250*a*, 250*b* may be about 100 μm (e.g., which may correspond to a thickness of a core like the core 120*r* described above with respect to FIGS. 1B and 1C). As another example, the diameter of (e.g., each of) the jumpers 250*a*, 250*b* may be about 80 μm or about 85 μm. With the thickness of the conductive layers and a ground layer each at about 27 μm, the thickness of the coverlays and adhesive layers each at about 37 μm, where the input and output of the jumper configuration are on different (e.g., opposite layers) of the flex 220, the overall construction shown in FIGS. 2A and 2B was found to provide about 3 dB of CMRR improvement. In various embodiments, the dimensions and/or the shapes of the anti-pads 223*t*, 223*b* may additionally, or alternatively, be selected for differential impedance matching.

Figure 3A:
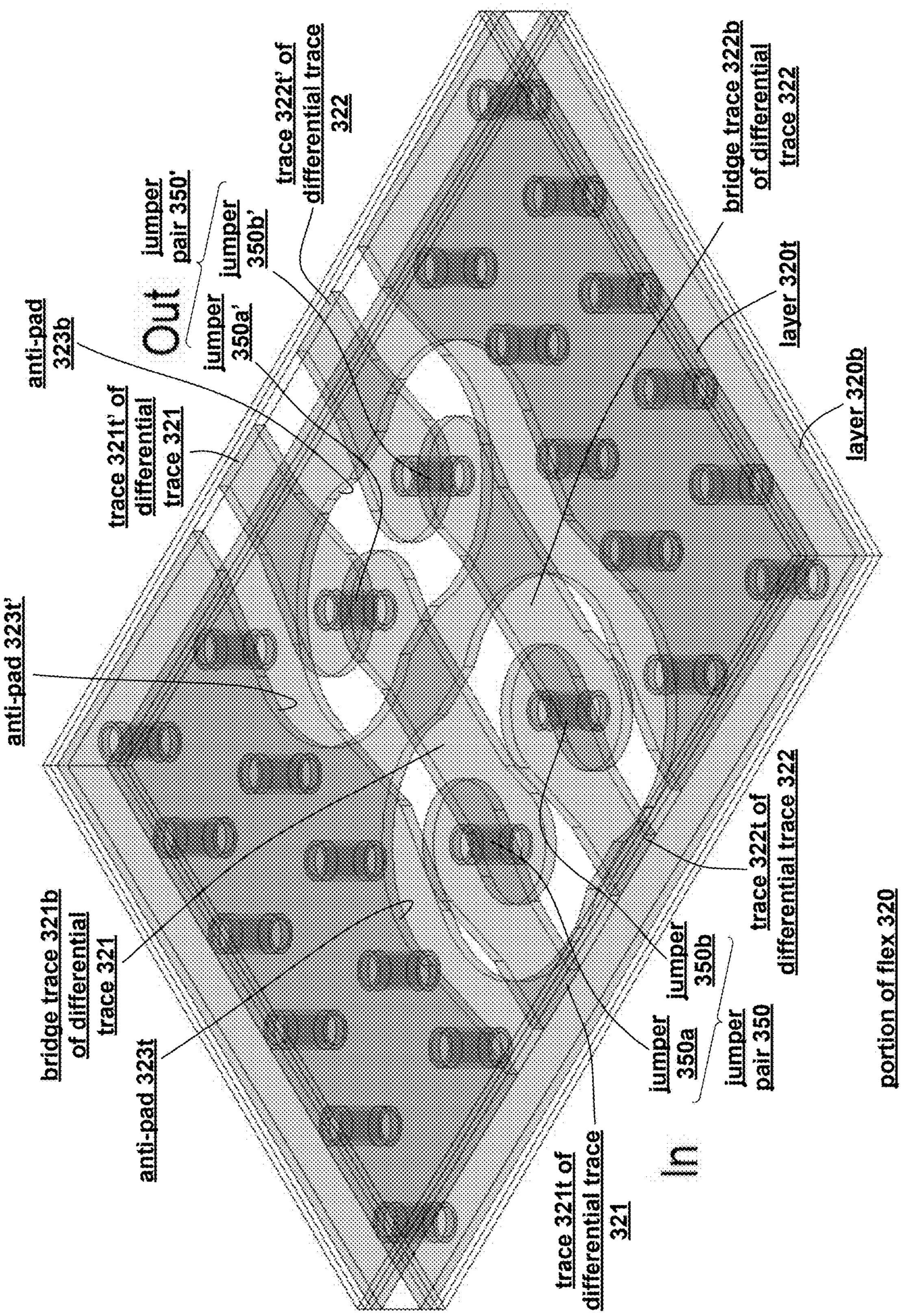
FIGS. 3A to 3C show a transparent perspective view, a top down view, and a cross-sectional view, respectively, of a portion of a flex that is configured with two jumper configurations (or two jumper pairs) in a cascaded arrangement, in accordance with various aspects described herein.
Figure 3B:
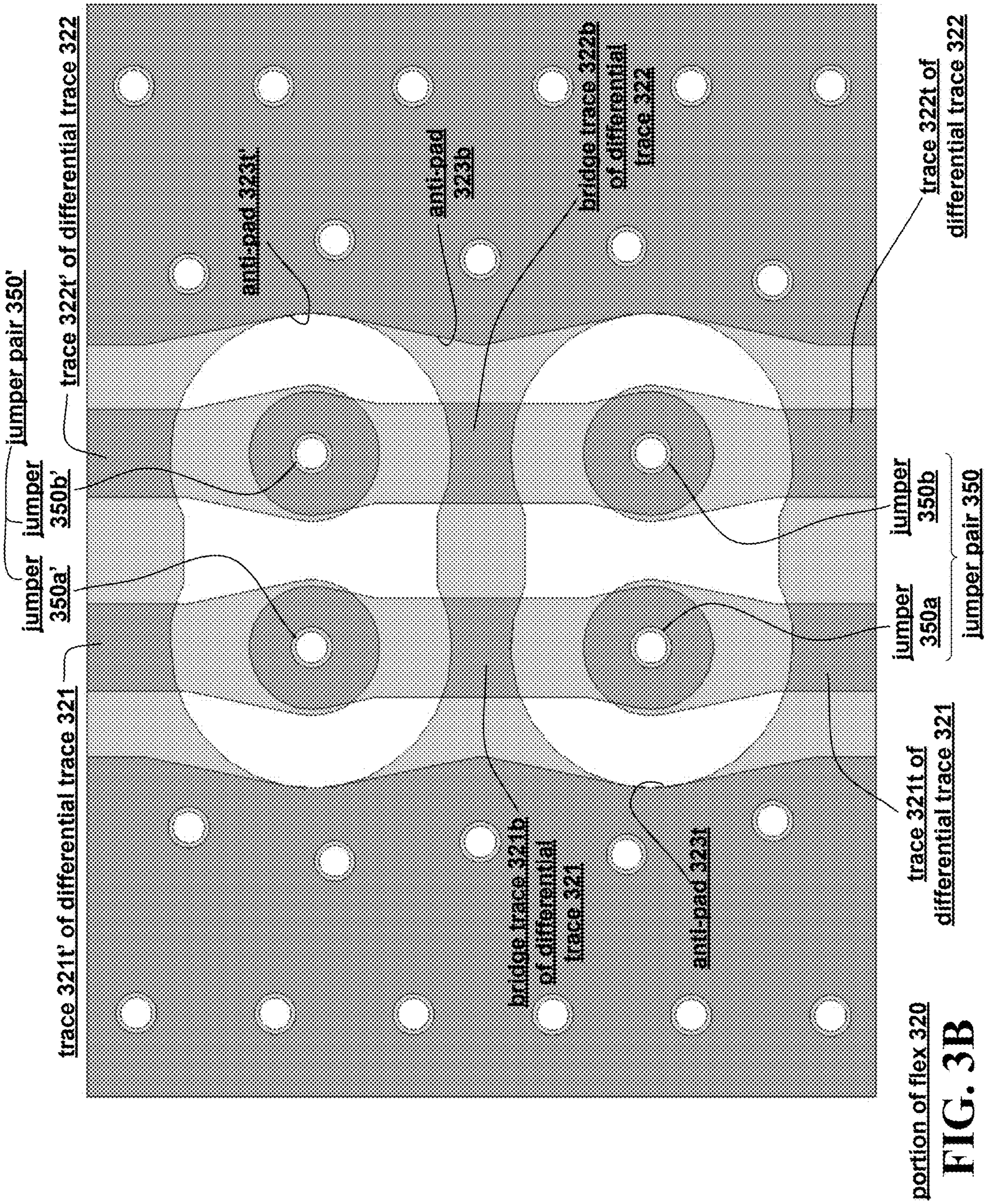
Figure 3C:
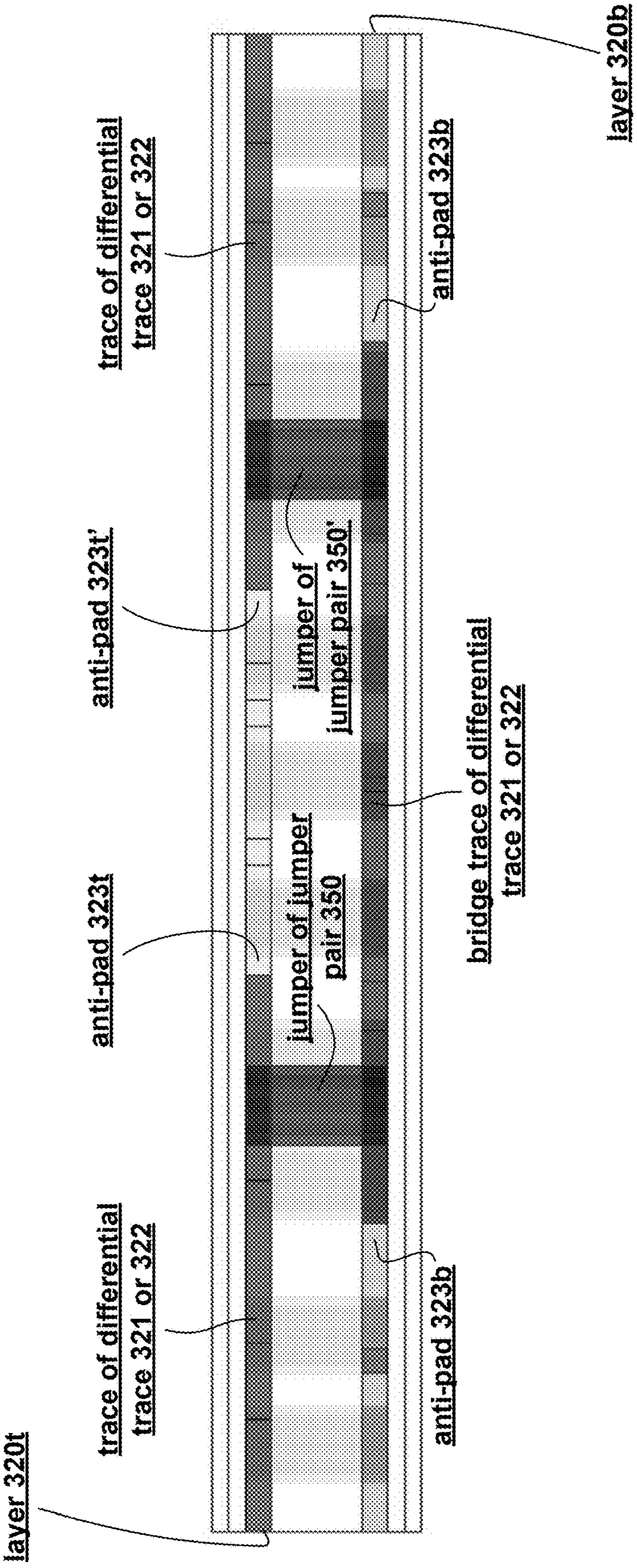
Figure 3D:
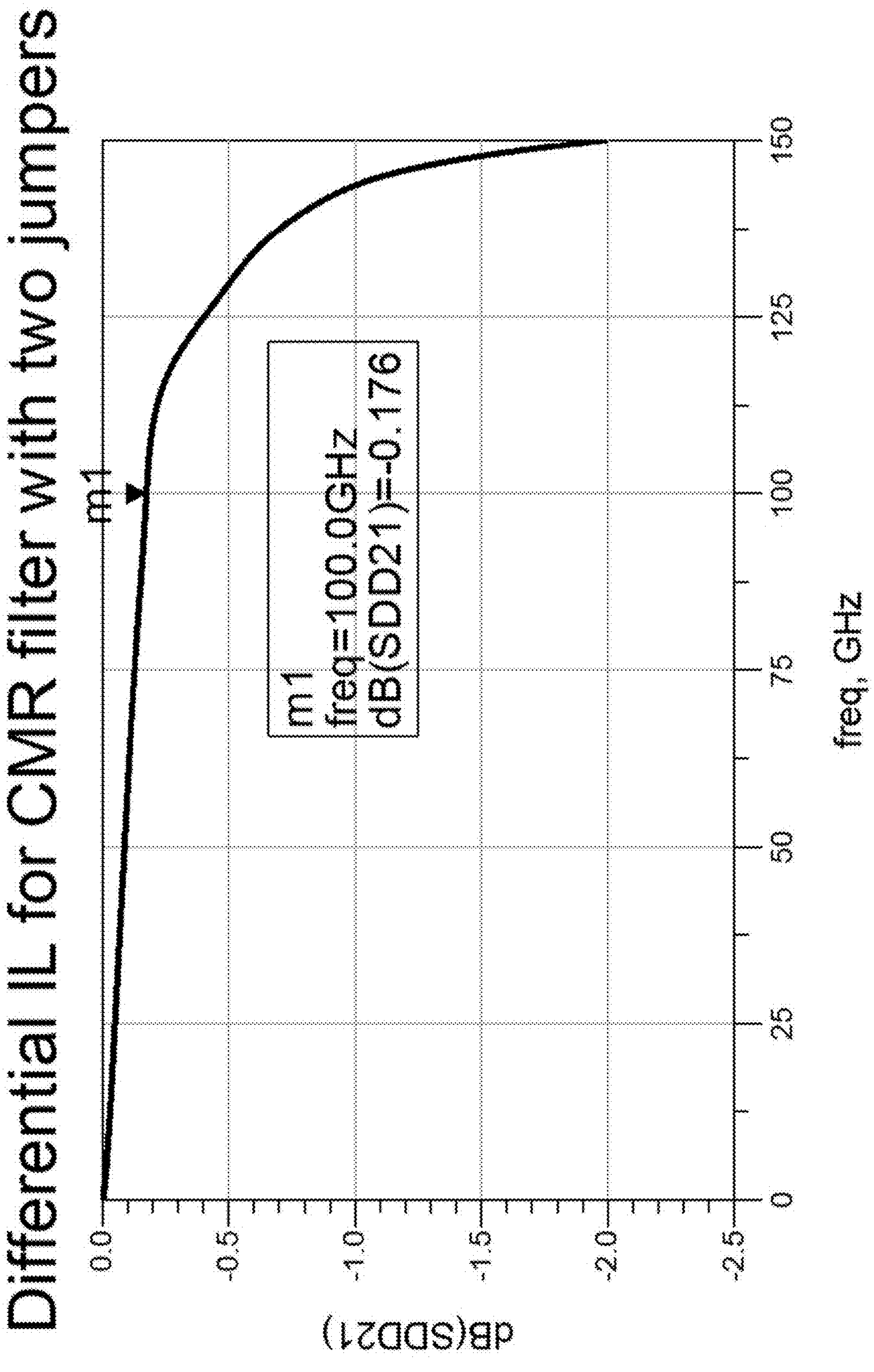
FIGS. 3D to 3J show example simulation results for the dual jumper configuration shown in FIGS. 3A to 3C.
Figure 3E:
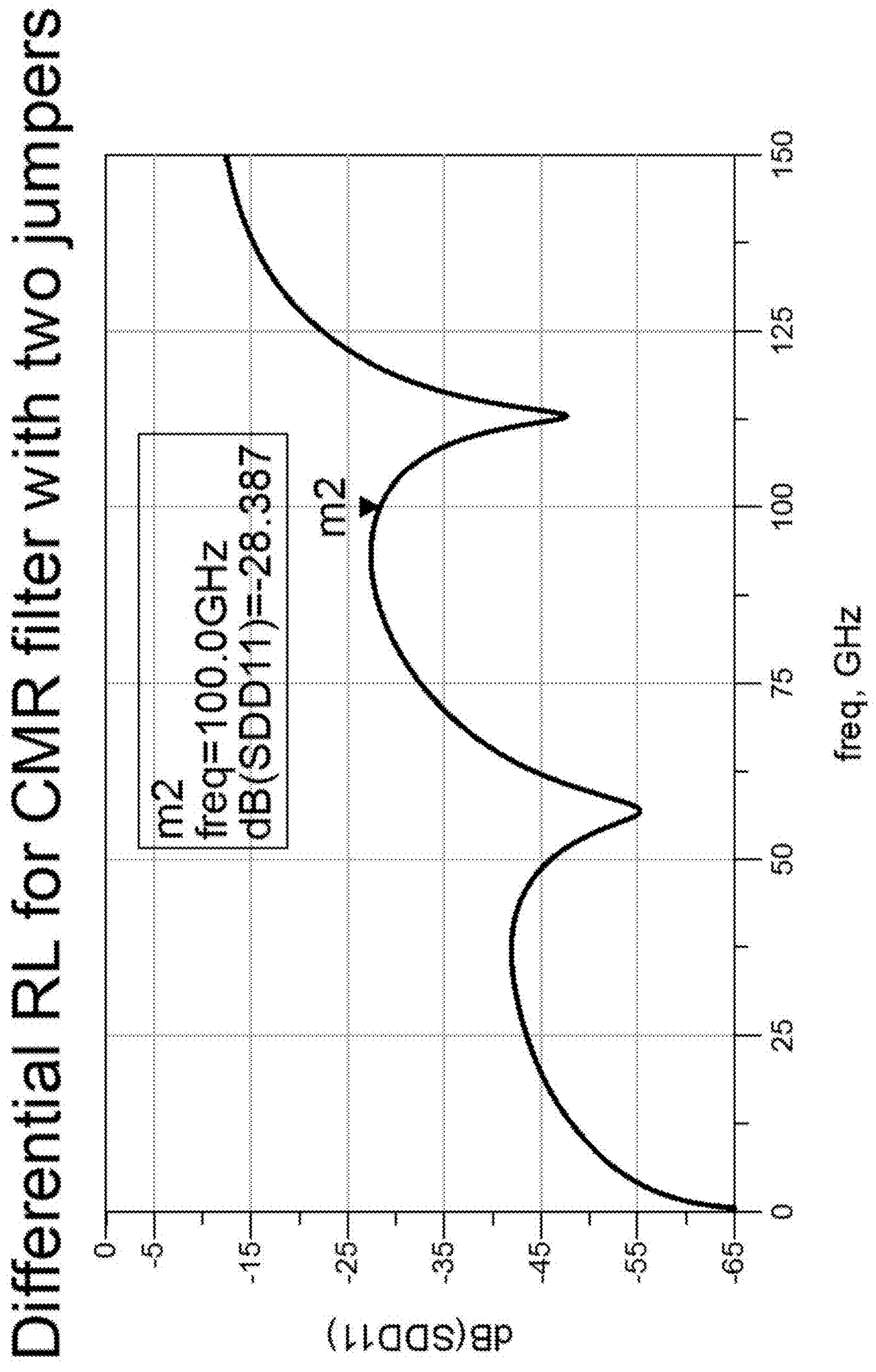

FIGS. 3A to 3C show a transparent perspective view, a top down view, and a cross-sectional view, respectively, of a portion of a flex 320 that is configured with two jumper configurations (or two jumper pairs) 350 and 350' in a cascaded arrangement, in accordance with various aspects described herein. In certain embodiments, the flex 320 may be the same as or similar to the flex 120 described above with respect to FIGS. 1A to 1C and/or the flex 220 described above with respect to FIGS. 2A and 2B, and the jumper configurations 350 and 350' may each be the same as or similar to the jumper configuration 150 described above with respect to respect to FIG. 1B and/or the jumper configuration 250 described above with respect to FIGS. 2A and 2B.

As depicted in FIGS. 3A to 3C, the jumper configuration 350 may include two jumpers 350*a*, 350*b* that respectively interconnect traces 321*t*, 322*t* in a layer 320*t* of the flex 320 with bridge traces 321*b*, 322*b* in a layer 320*b* of the flex 320. The jumper configuration 350' may include two jumpers 350*a*', 350*b*' that respectively interconnect traces 321*t*', 322*t*' in the layer 320*t* with the bridge traces 321*b*, 322*b* in the layer 320*b*. For differential impedance matching, anti-pads 323*t* and 323*t*' may be respectively defined for traces 321*t*, 322*t* and traces 321', 322*t*' in the layer 320*t*, and an anti-pad 323*b* may be defined for the bridge traces 321*b*, 322*b* in the layer 320*b*. By virtue of the bridge implementation of the dual jumper configuration, the input (IN) and output (OUT) of the overall or effective CMR filter may be in the same layer of the stack—here, layer 320*t*.

Figure 3F:
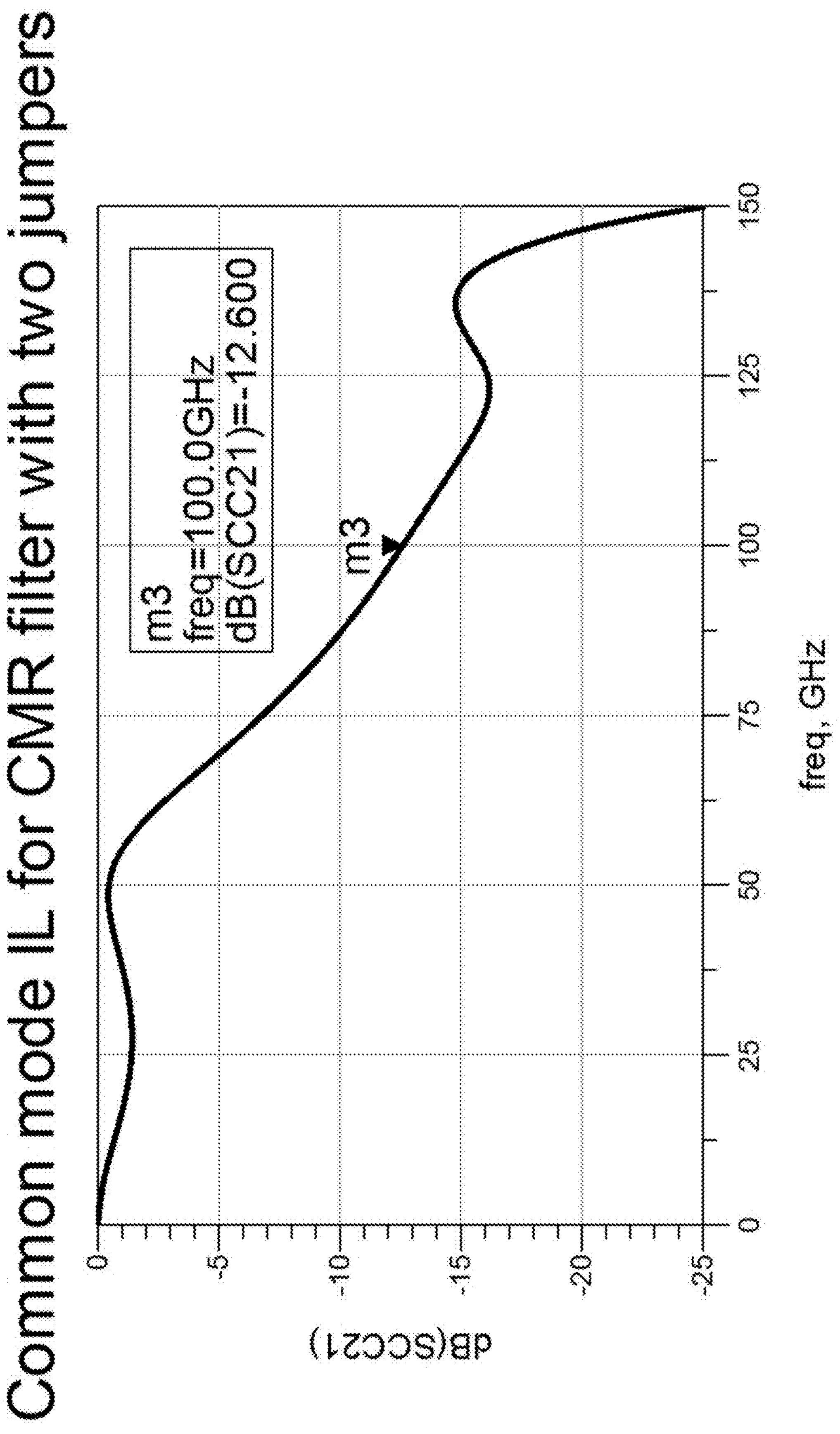
Figure 3G:
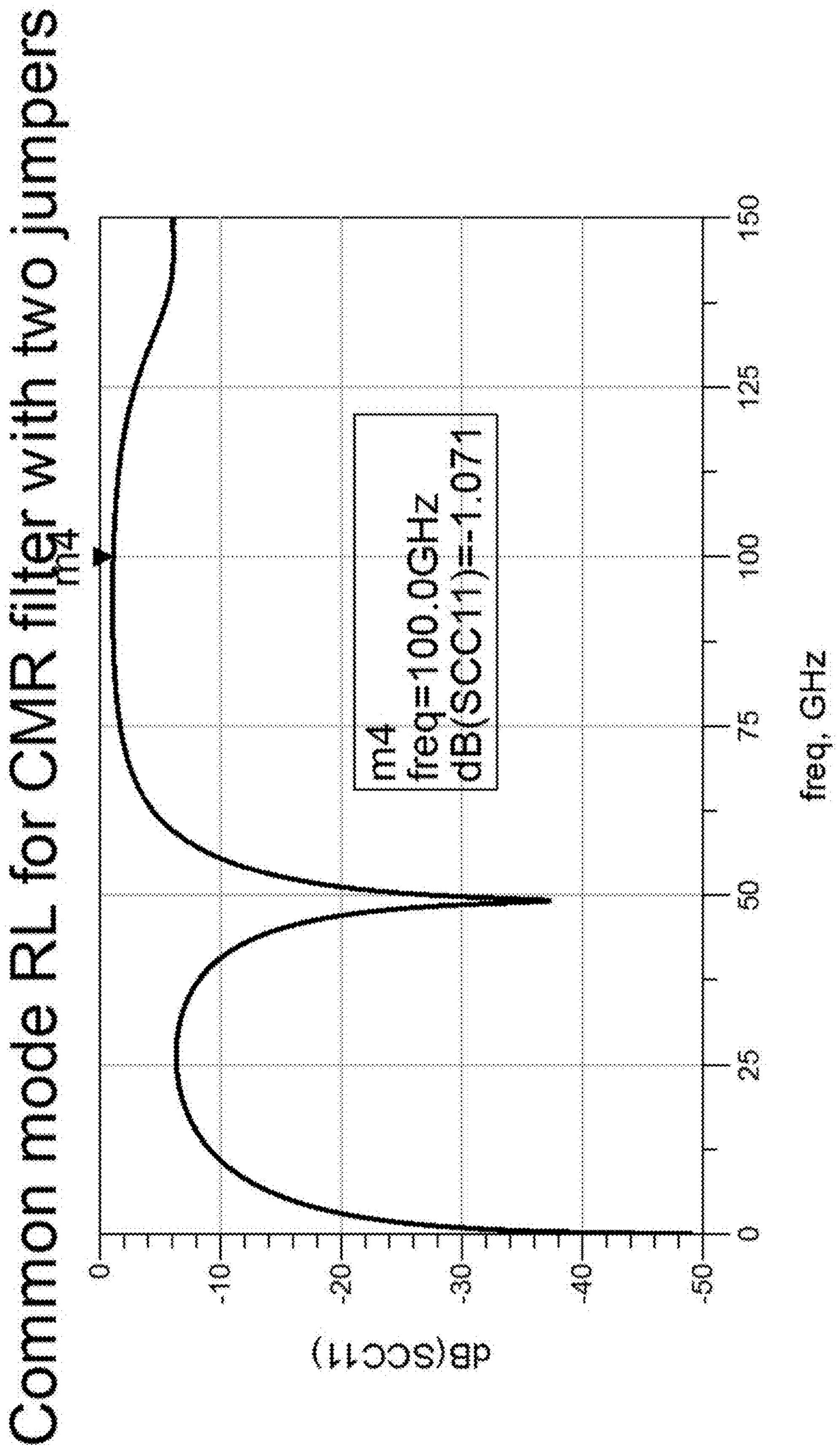
Figure 3H:
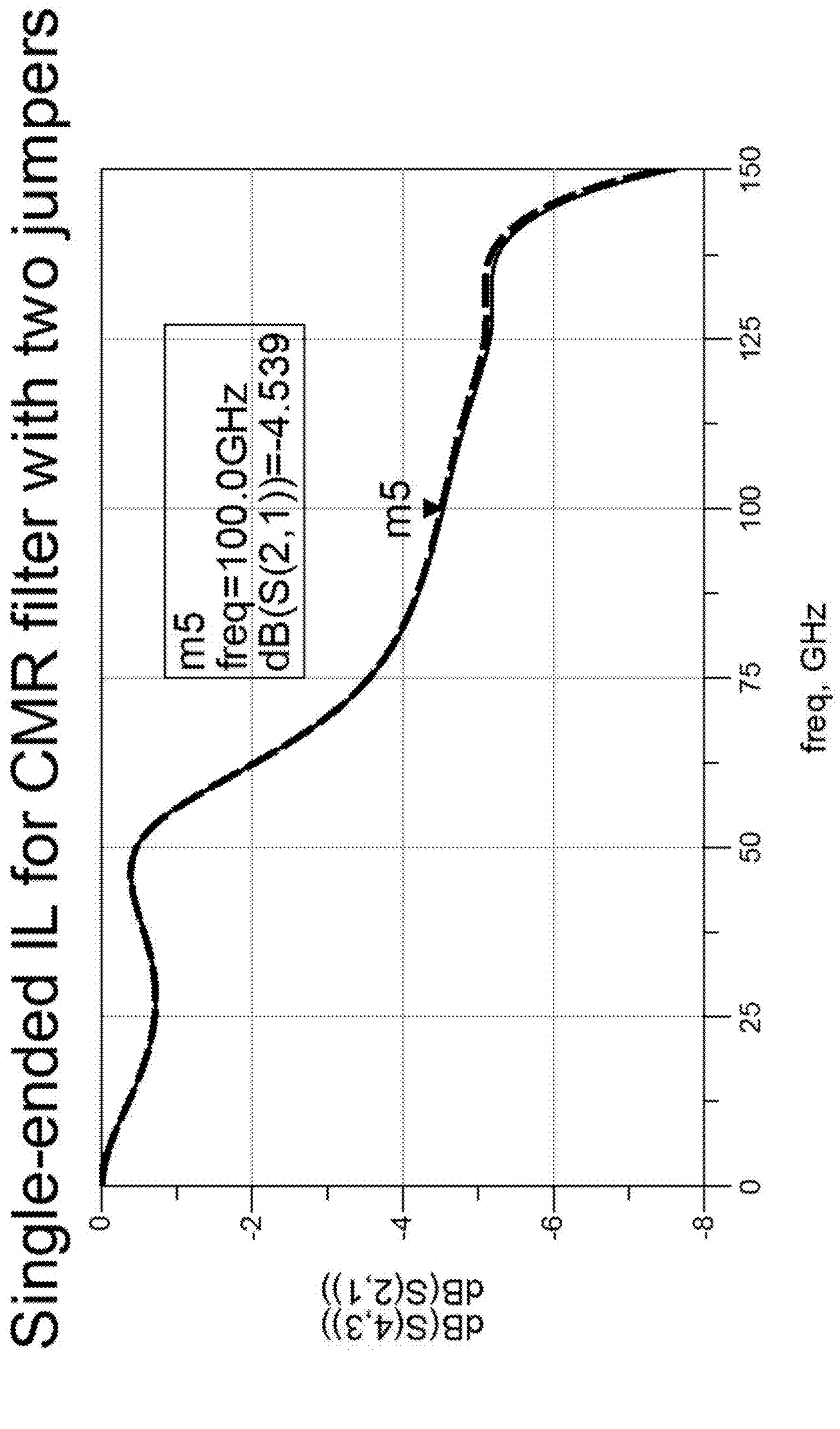
Figure 3I:
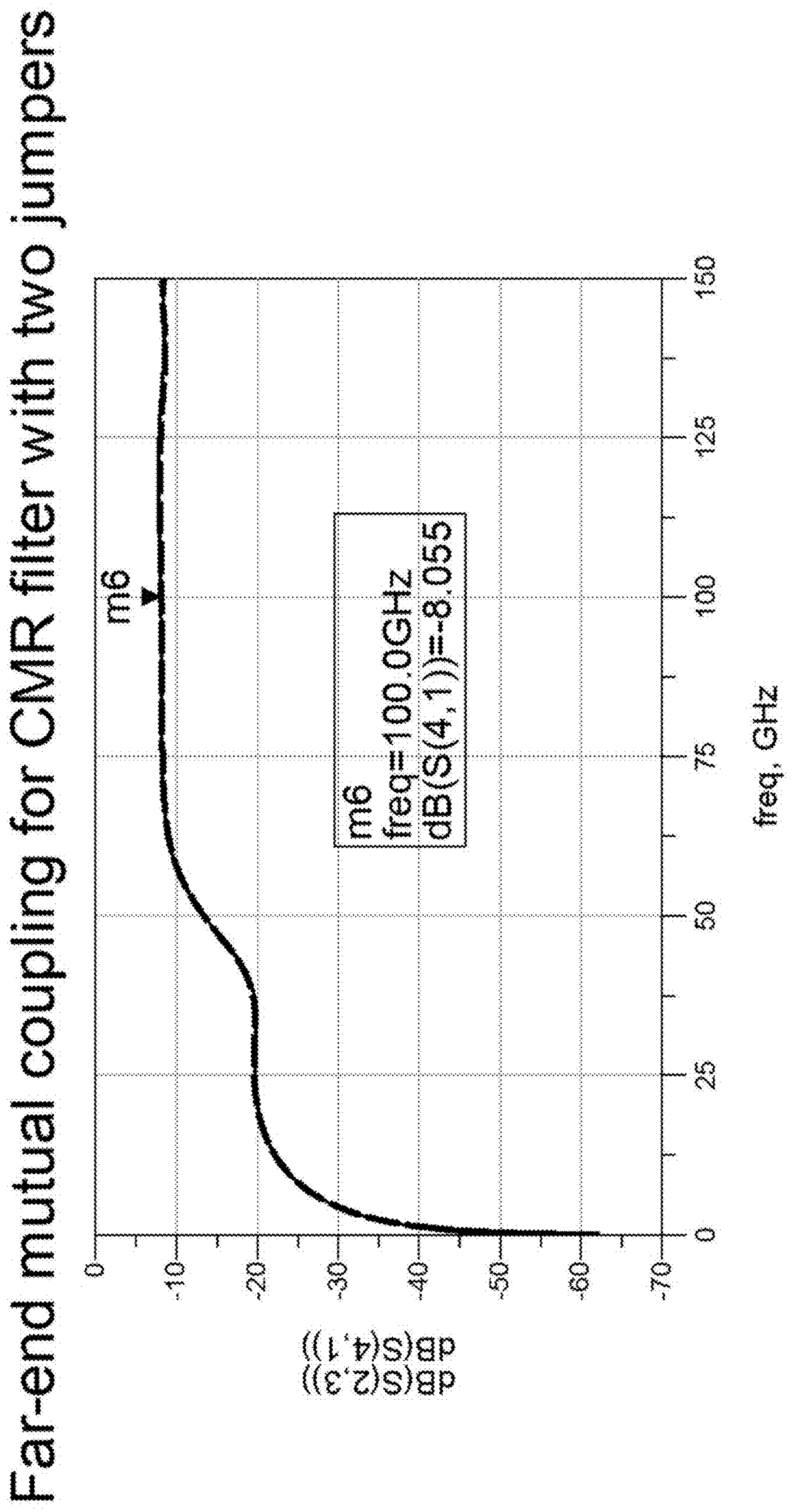
Figure 3J:
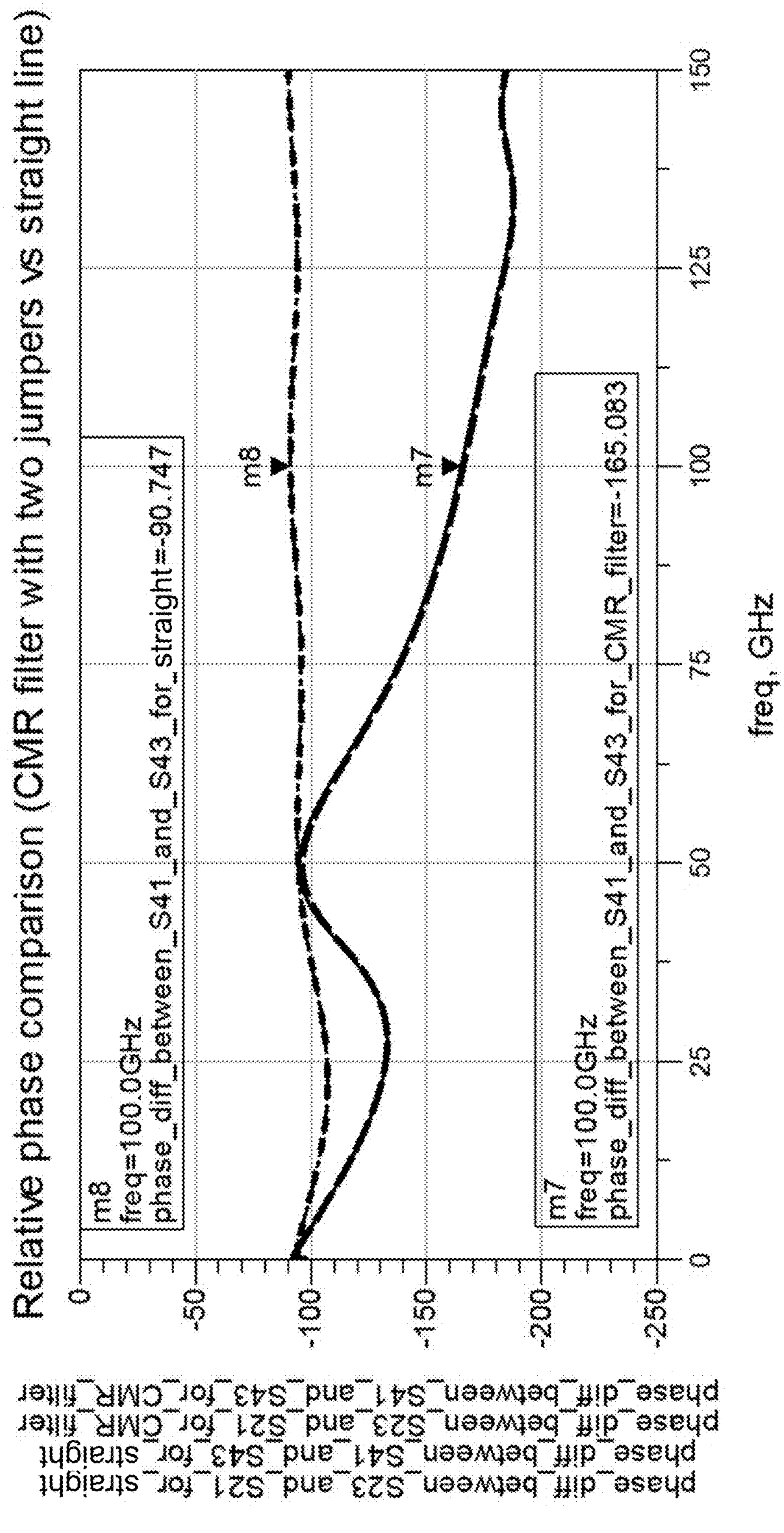

FIGS. 3D to 3J show example simulation results for the dual jumper configuration shown in FIGS. 3A to 3C. As can be seen in FIG. 3F, for instance, the dual jumper configuration achieves CMRR of 12.6 dB at 100 GHz. The mutual coupling approaches single-ended through at −8.055 dB (FIG. 3I) versus −4.539 dB (FIG. 3H). The relative phase difference (FIG. 3J) for the configuration is −165.083 degrees (which is near −180 degrees) as compared to −90.747 degrees in a case where straight differential lines are used without any jumper configuration.

In certain embodiments, additional cascaded jumper configurations may be implemented along differential traces (e.g., repeated along other spans of the differential traces) to further improve CMRR. In these embodiments, various parameters of each additional cascaded jumper configuration, such as, for instance, the pan of one or more of bridge traces, the width of one or more bridge traces, the length of one or more jumpers, and/or the diameter of one or more jumpers may be adjusted to achieve a desired (e.g., optimal) CMRR improvement.

Figure 4A:
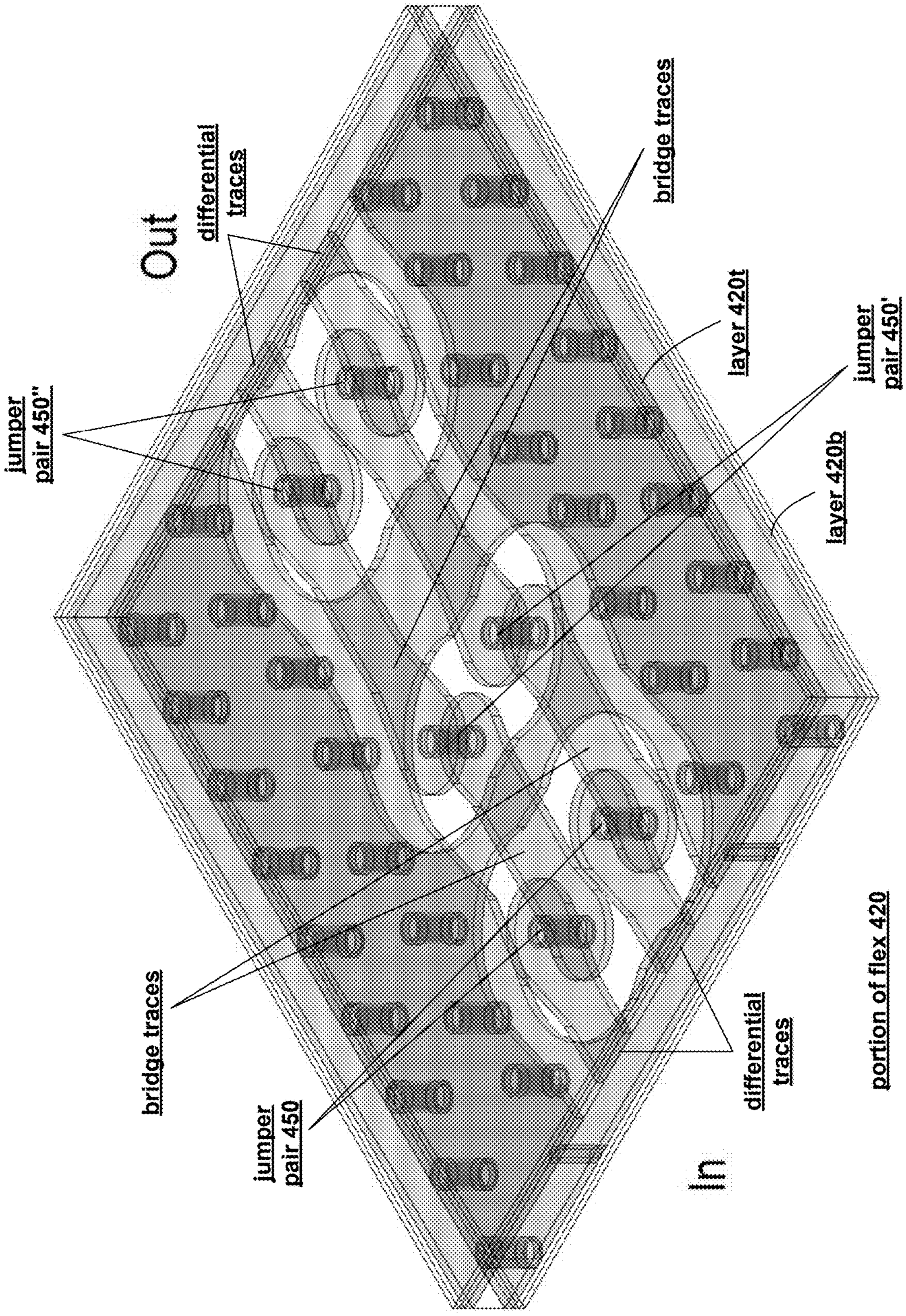
FIGS. 4A to 4C show a transparent perspective view, a top down view, and a cross-sectional view, respectively, of a portion of a flex that is configured with three jumper configurations (or three jumper pairs) in a cascaded arrangement, in accordance with various aspects described herein.
Figure 4B:
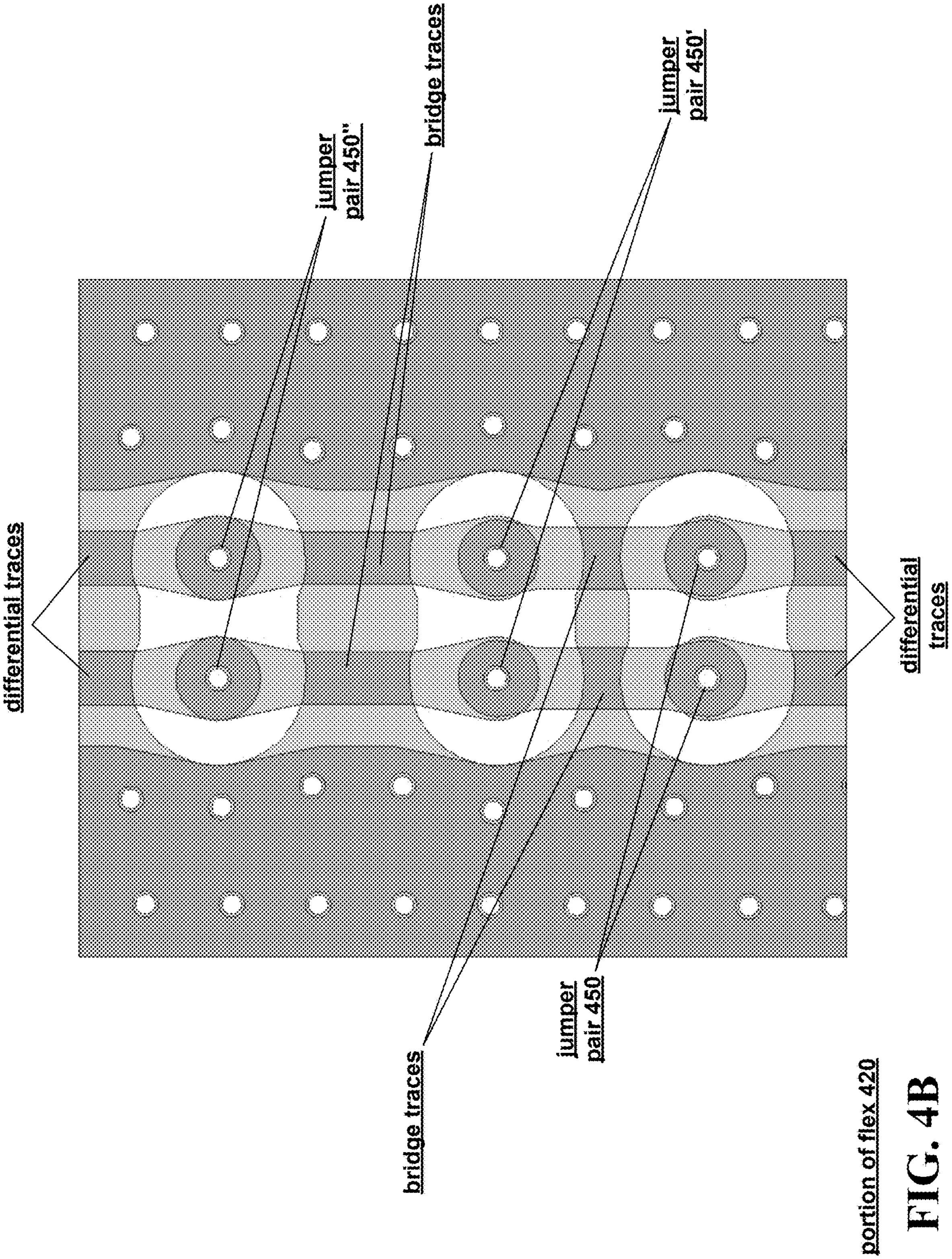
Figure 4C:
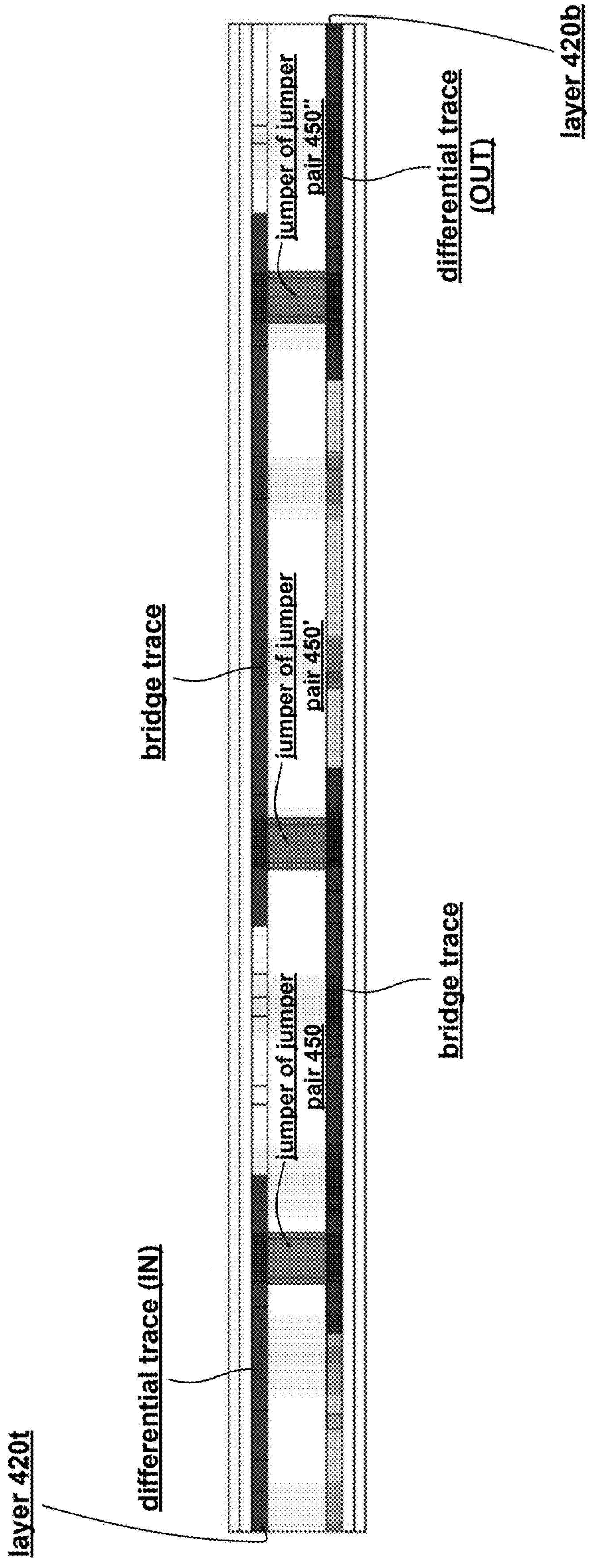
Figure 4D:
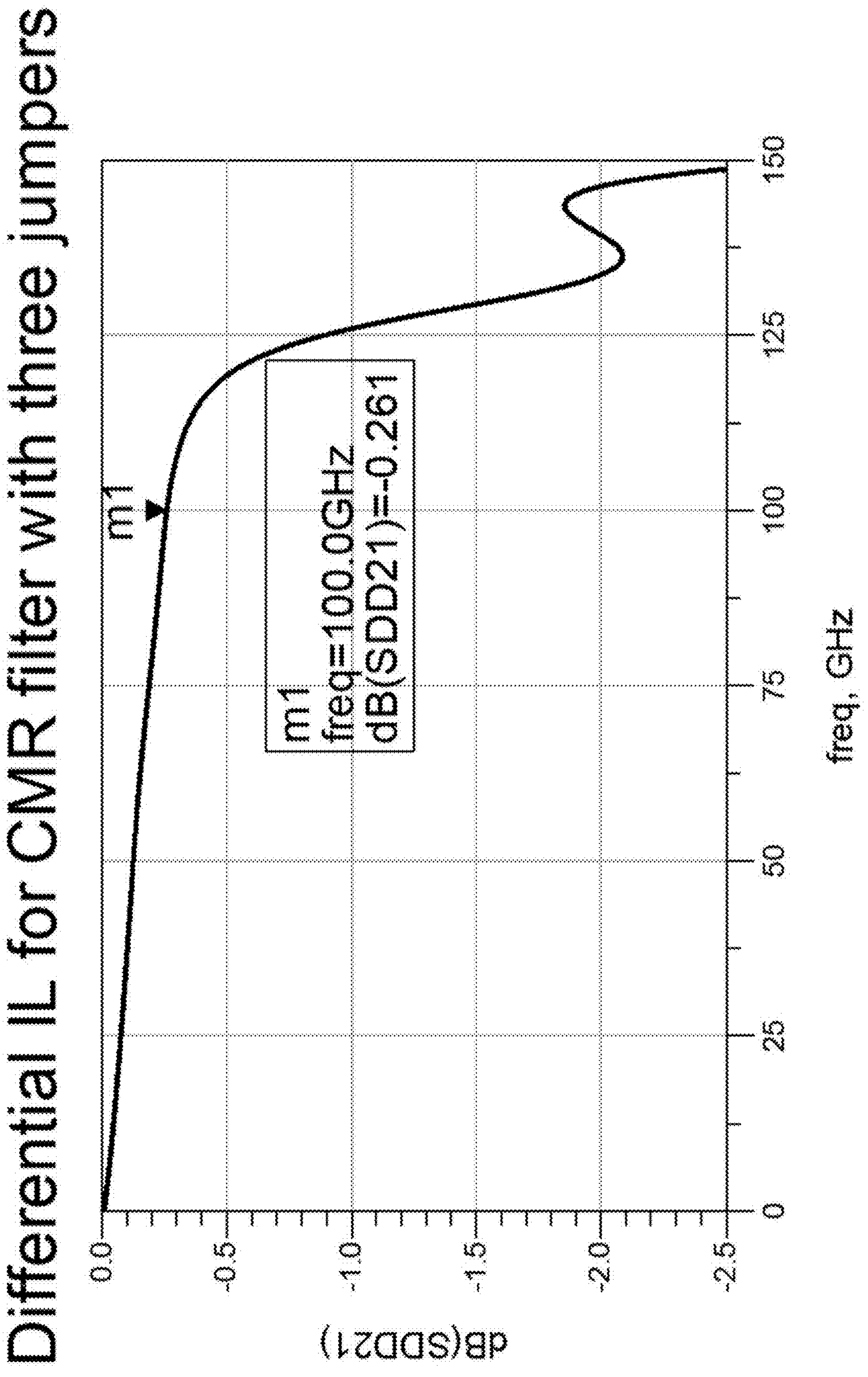
FIGS. 4D to 4J show example simulation results for the triple jumper configuration shown in FIGS. 4A to 4C.
Figure 4E:
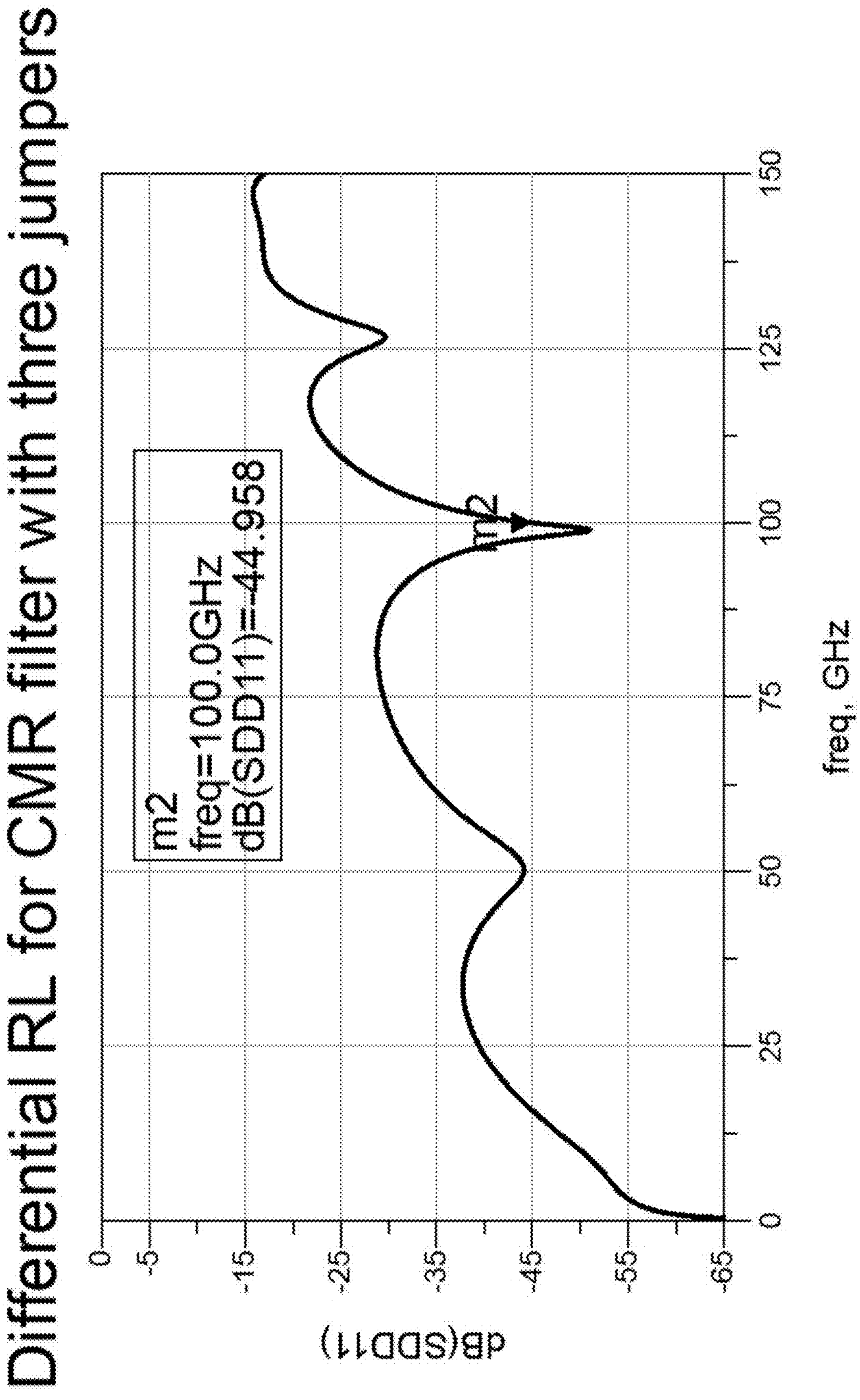

FIGS. 4A to 4C show a transparent perspective view, a top down view, and a cross-sectional view, respectively, of a portion of a flex 420 that is configured with three jumper configurations (or three jumper pairs) 450, 450', and 450" in a cascaded arrangement, in accordance with various aspects described herein. In certain embodiments, the flex 420 may be the same as or similar to the flex 120 described above with respect to FIGS. 1A to 1C and/or the flex 220 described above with respect to FIGS. 2A and 2B, and the jumper configurations 450, 450', and 450" may each be the same as or similar to the jumper configuration 150 described above with respect to FIG. 1B and/or the jumper configuration 250 described above with respect to FIGS. 2A and 2B.

As depicted in FIGS. 4A to 4C, the jumper configuration 450 may interconnect differential traces (IN) with bridge traces, the jumper configuration 450' may interconnect those bridge traces with another set of bridge traces, and the jumper configuration 450" may interconnect that other set of bridge traces with differential traces (OUT). Corresponding anti-pads may be defined for the various traces involved to provide for differential impedance matching. By virtue of the bridge implementation of the triple jumper configuration, the input (IN) and output (OUT) of the overall or effective CMR filter may be in different layers of the stack—here, layers 420*t* and 420*b*, respectively.

Figure 4F:
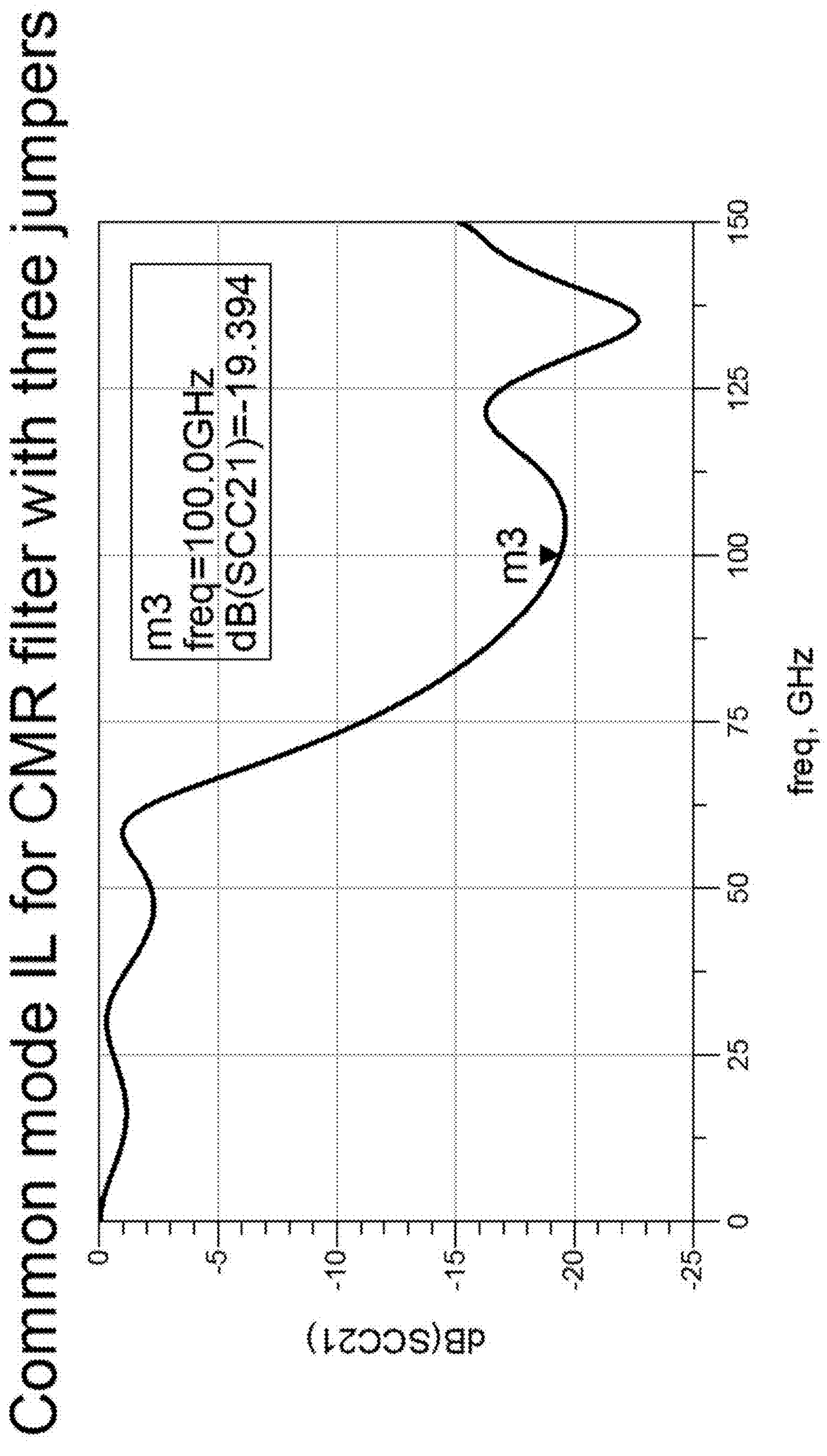
Figure 4G:
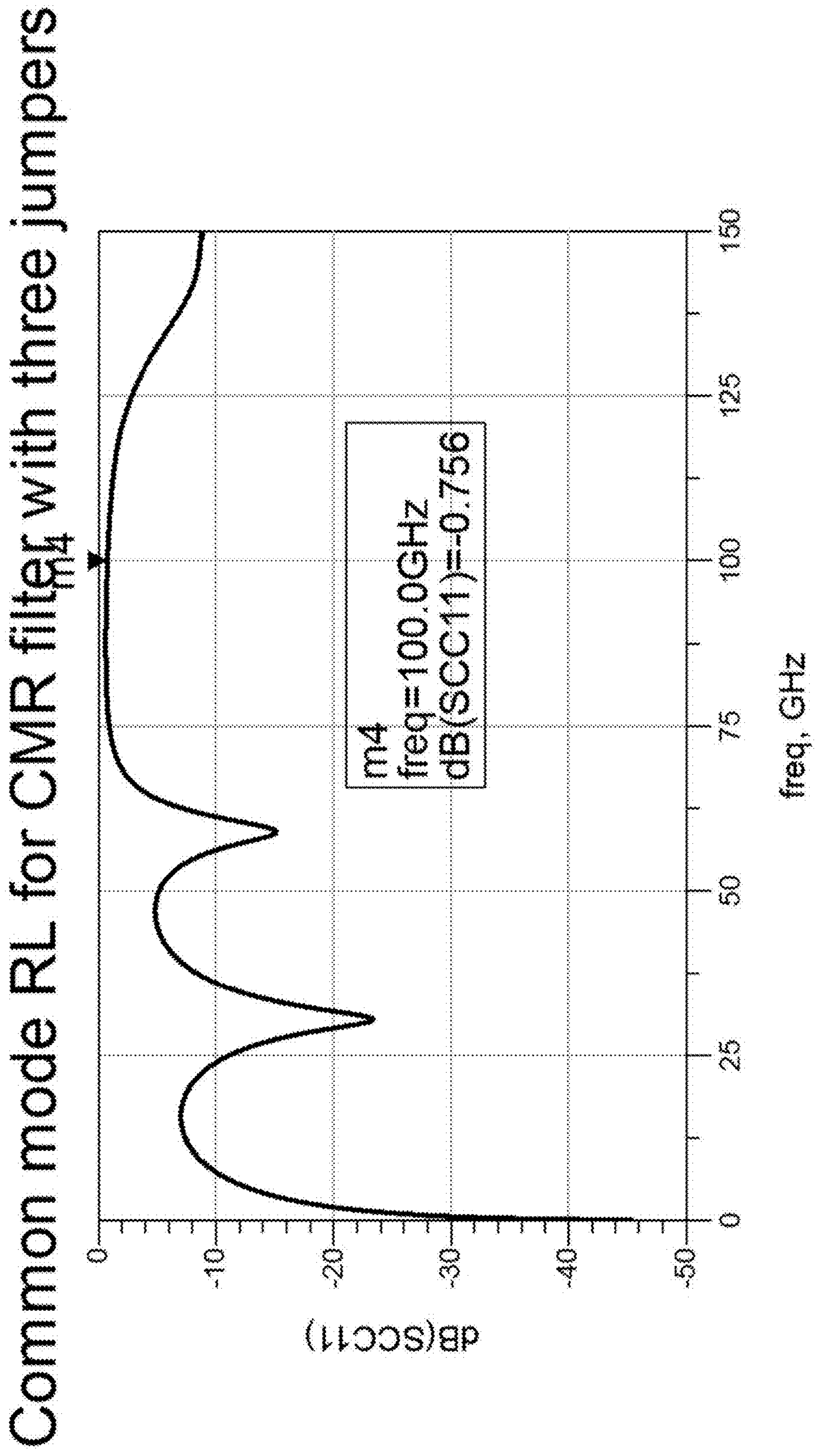
Figure 4H:
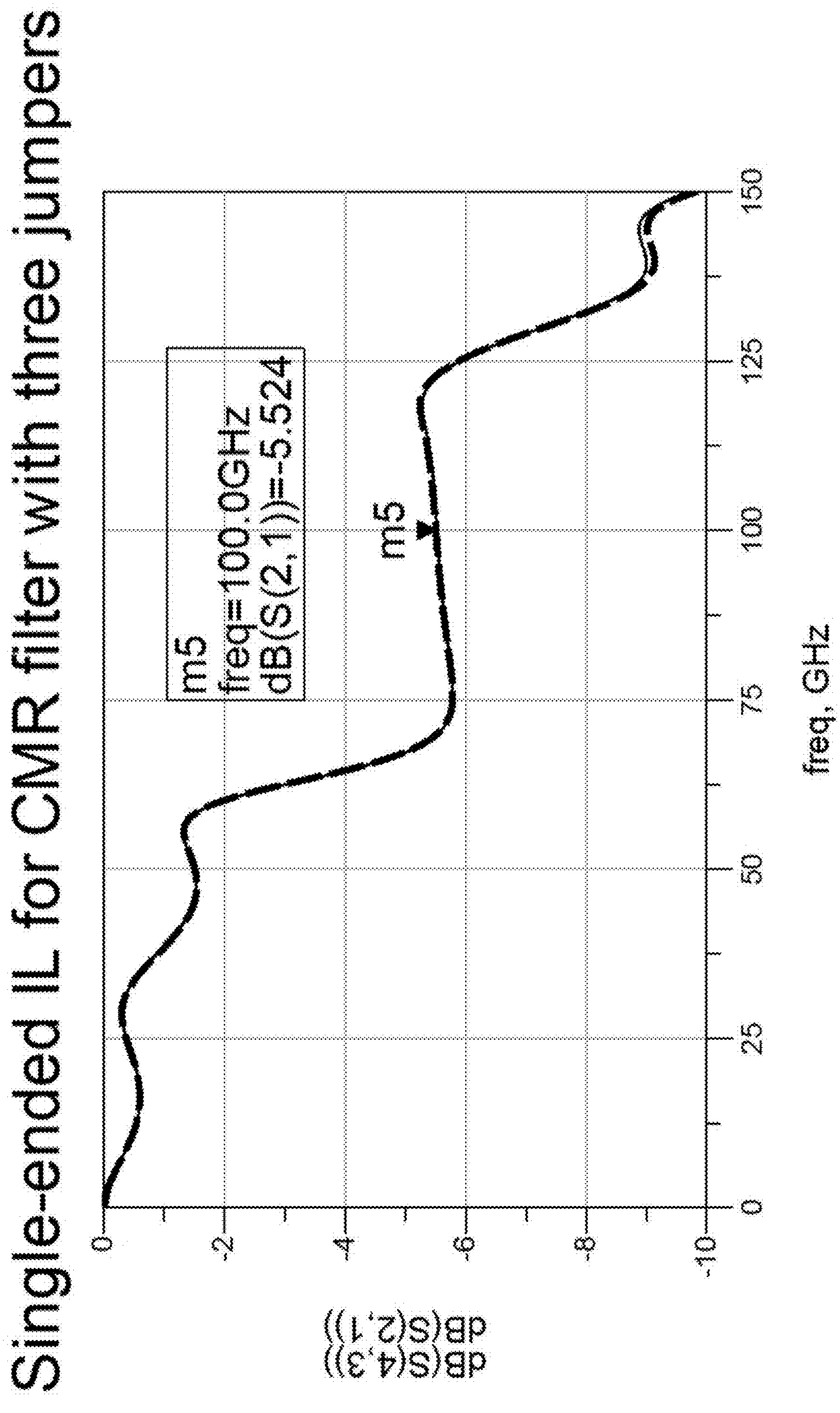
Figure 4I:
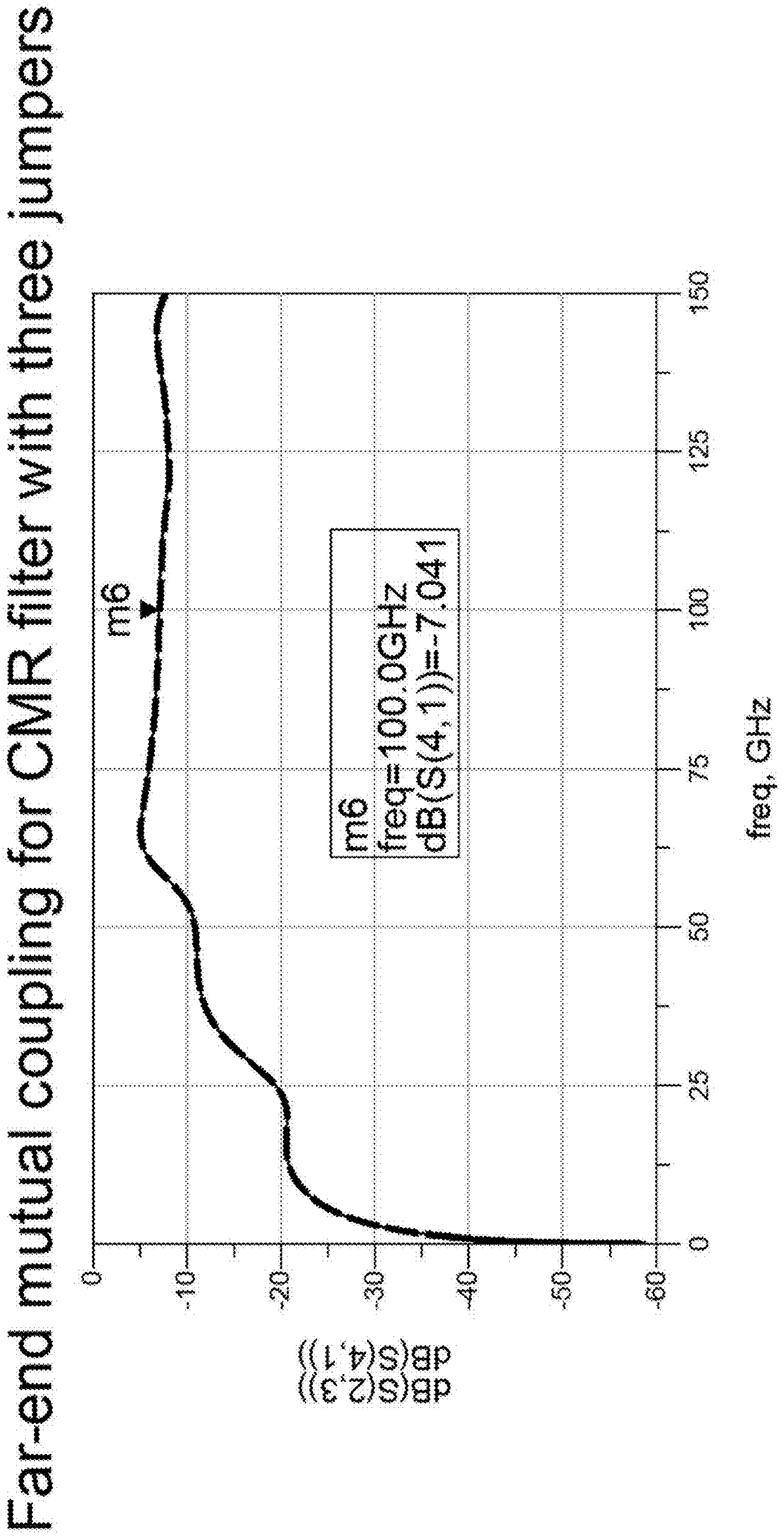
Figure 4J:
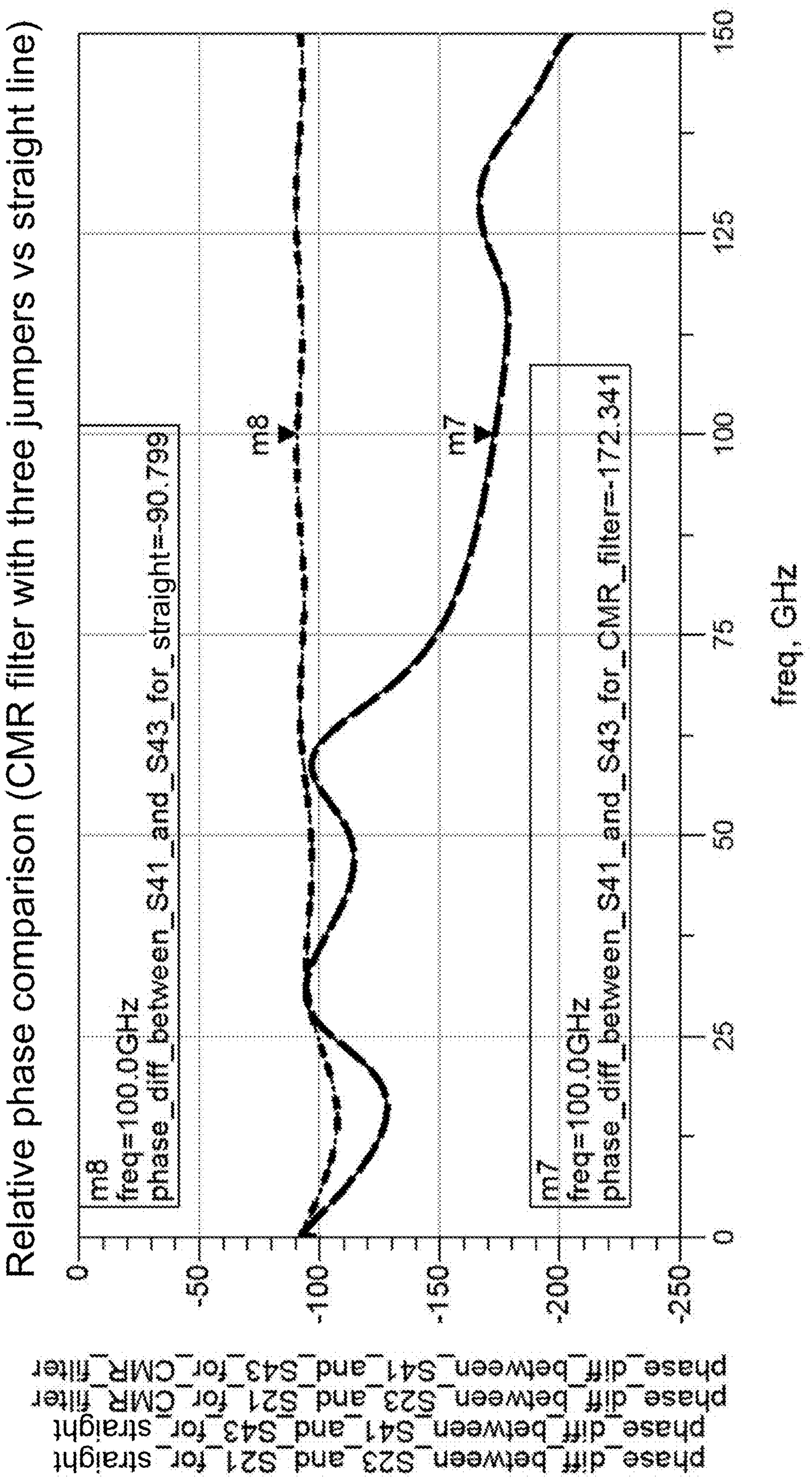

FIGS. 4D to 4J show example simulation results for the triple jumper configuration shown in FIGS. 4A to 4C. As can be seen in FIG. 4F, for instance, the triple jumper configuration achieves CMRR of 19.394 dB at 100 GHz. The mutual coupling further approaches single-ended through at −7.041 dB (FIG. 4I) versus −5.524 dB (FIG. 4H). The relative phase difference (FIG. 4J) for the configuration is −172.341 degrees (which is even nearer to −180 degrees) as compared to −90.799 degrees in a case where straight differential lines are used without any jumper configuration.

Figure 5A:
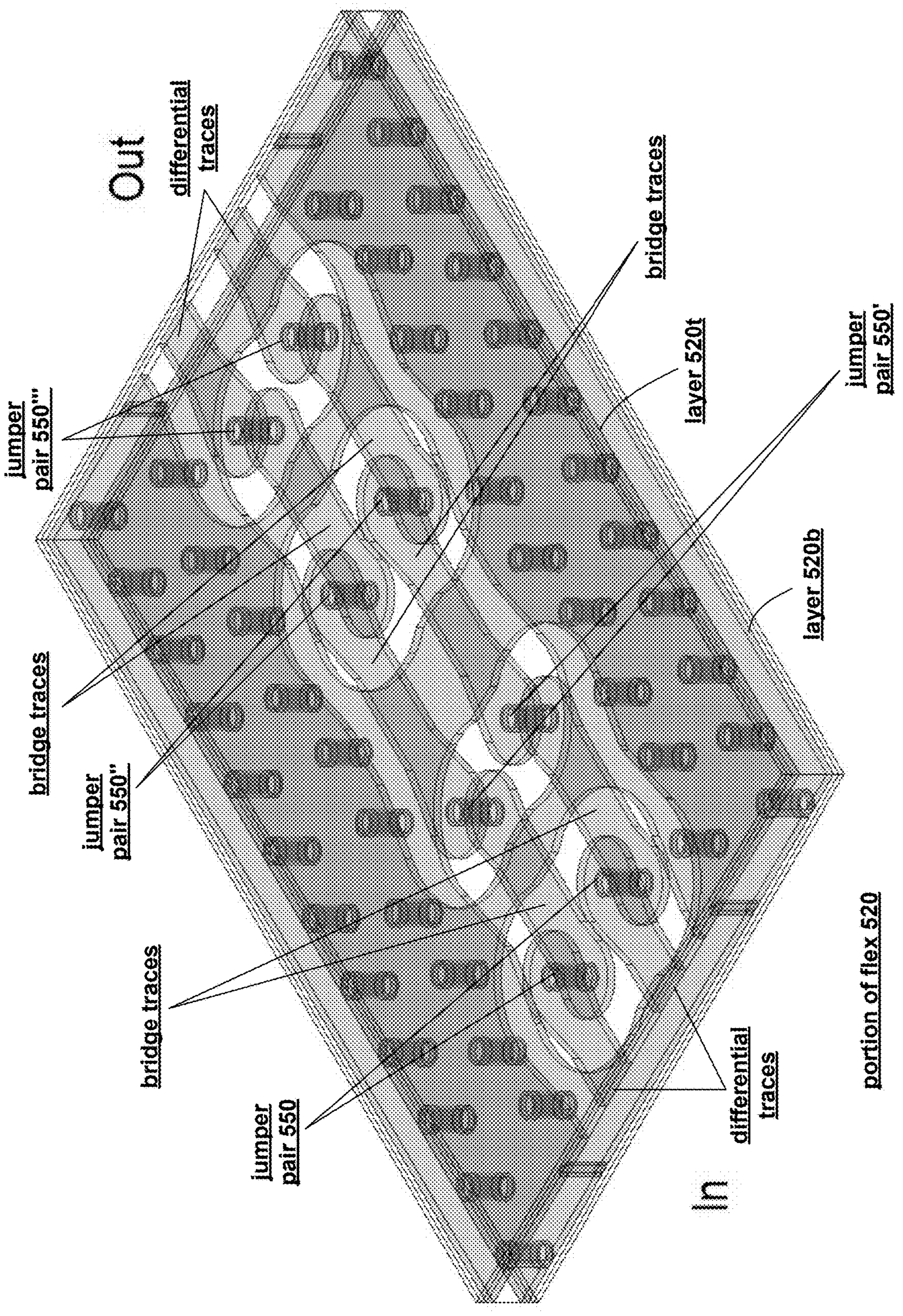
FIGS. 5A to 5C show a transparent perspective view, a top down view, and a cross-sectional view, respectively, of a portion of a flex that is configured with four jumper configurations (or four jumper pairs) in a cascaded arrangement, in accordance with various aspects described herein.
Figure 5B:
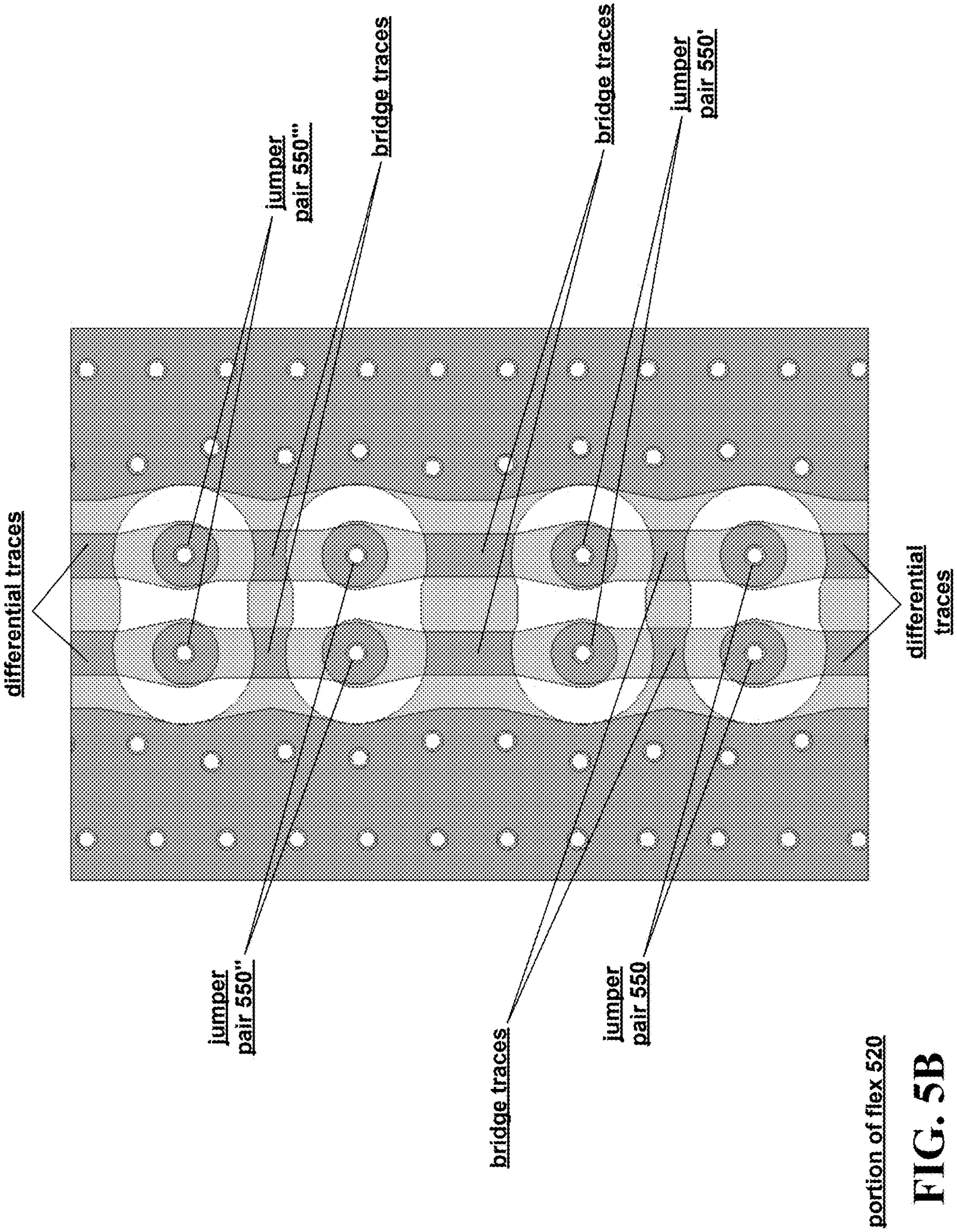
Figure 5C:
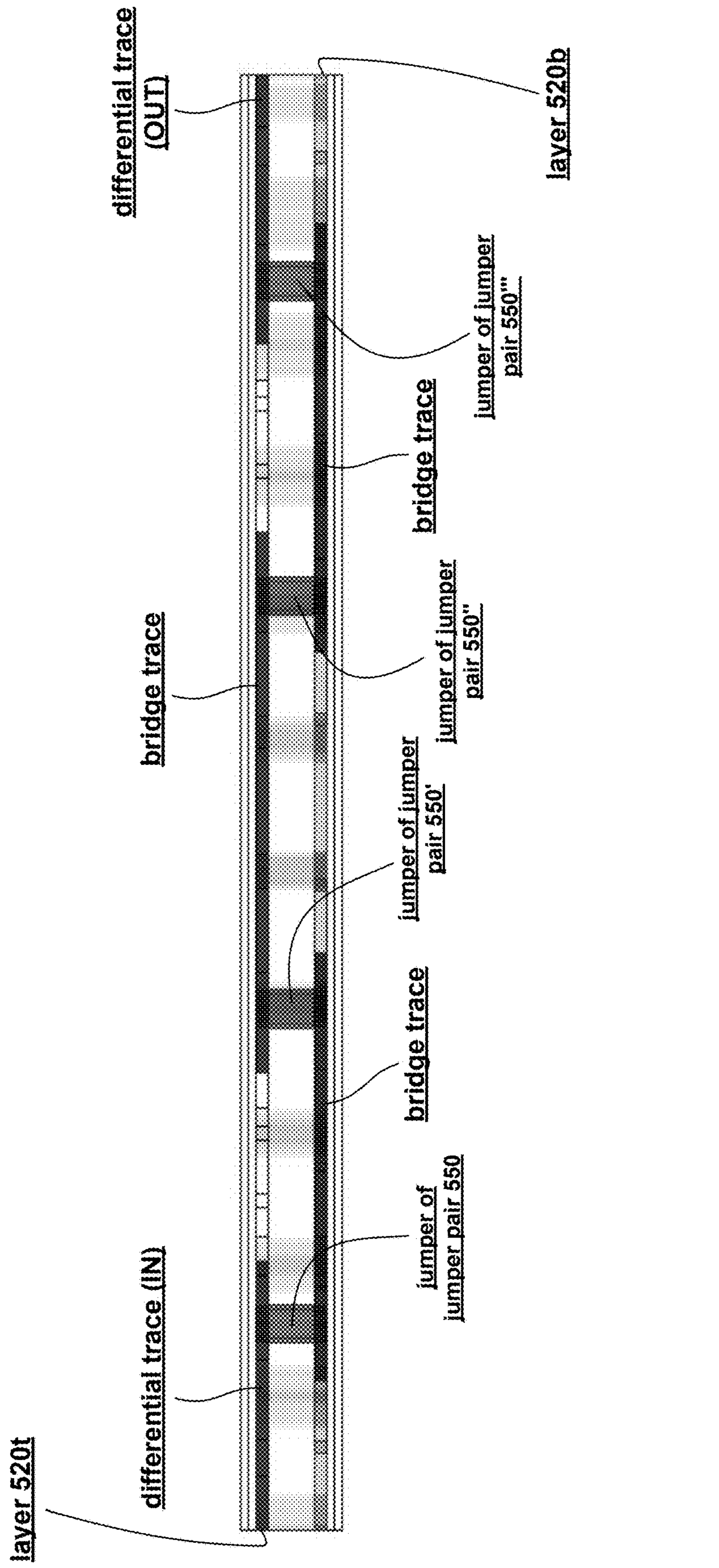
Figure 5D:
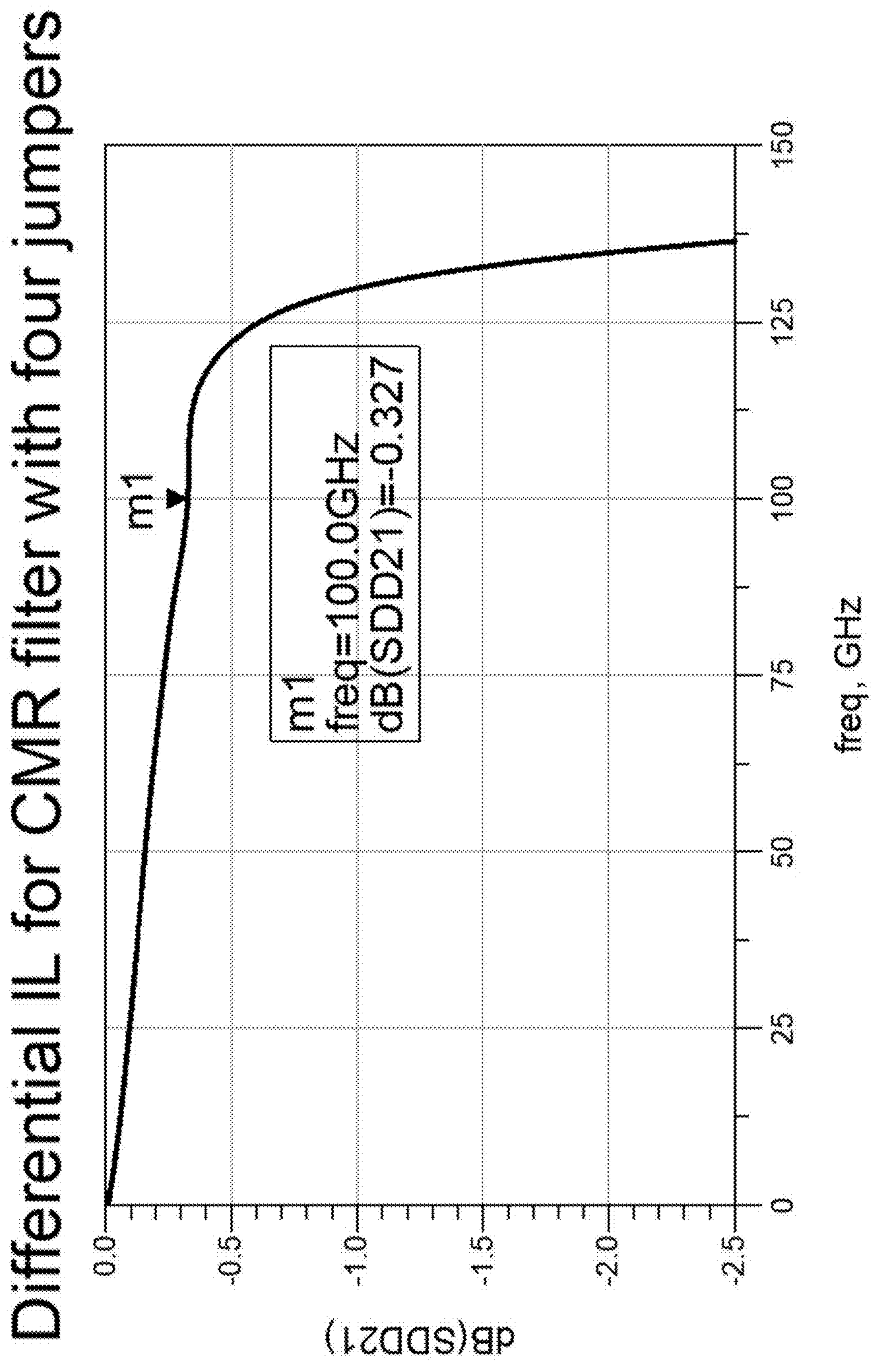
FIGS. 5D to 5J show example simulation results for the quadruple jumper configuration shown in FIGS. 5A to 5C.
Figure 5E:
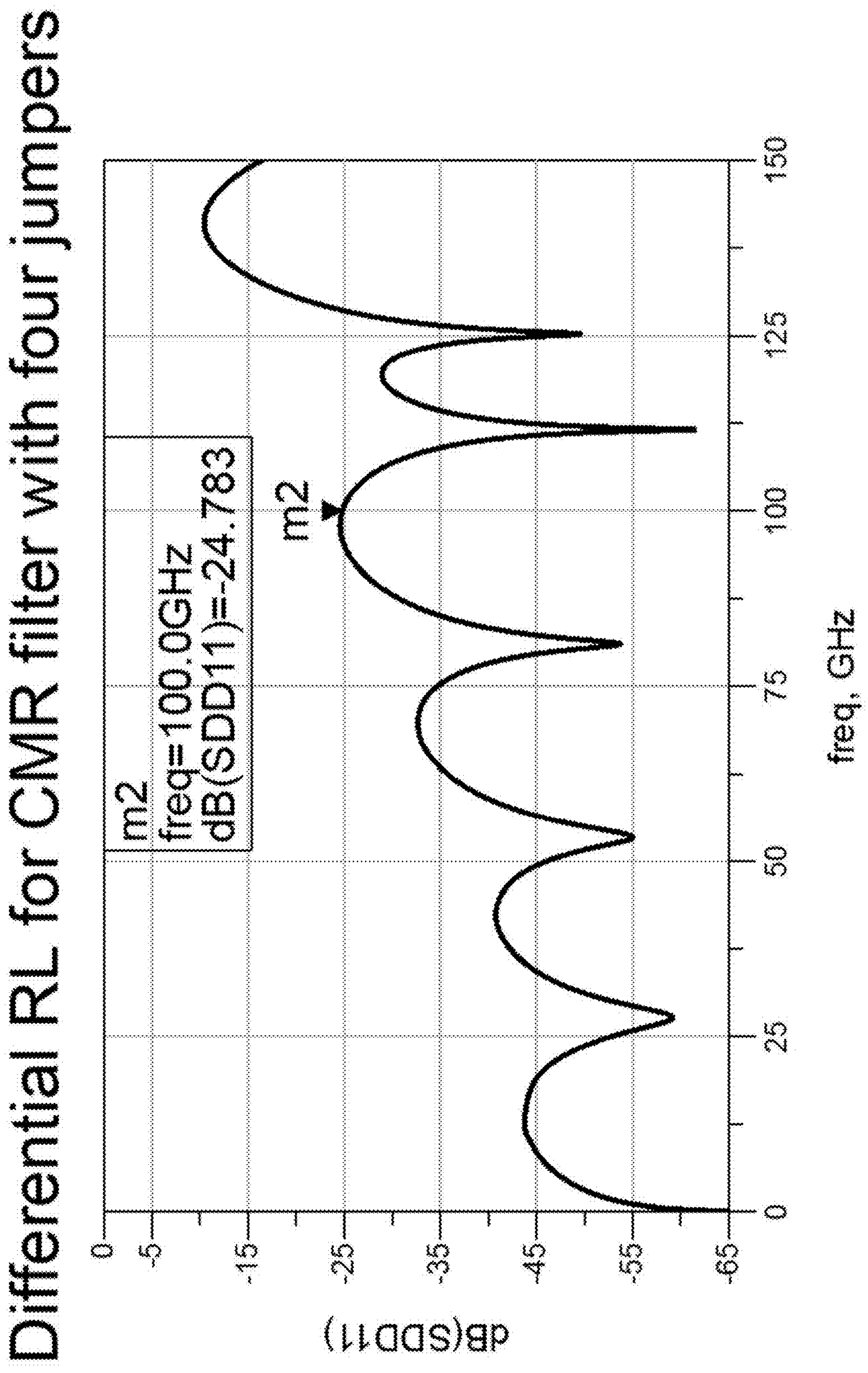

FIGS. 5A to 5C show a transparent perspective view, a top down view, and a cross-sectional view, respectively, of a portion of a flex 520 that is configured with four jumper configurations (or four jumper pairs) 550, 550', 550", and 550'" in a cascaded arrangement, in accordance with various aspects described herein. In certain embodiments, the flex 520 may be the same as or similar to the flex 120 described above with respect to FIGS. 1A to 1C and/or the flex 220 described above with respect to FIGS. 2A and 2B, and the jumper configurations 550, 550', 550", and 550'" may each be the same as or similar to the jumper configuration 150 described above with respect to FIG. 1B and/or the jumper configuration 250 described above with respect to FIGS. 2A and 2B.

As depicted in FIGS. 5A to 5C, the jumper configuration 550 may interconnect differential traces (IN) with bridge traces, the jumper configuration 550' may interconnect those bridge traces with another set of bridge traces, the jumper configuration 550" may interconnect that other set of bridge traces with yet another set of bridge traces, and the jumper configuration 550'" may interconnect that yet other set of bridge traces with differential traces (OUT). Corresponding anti-pads may be defined for the various traces involved to provide for differential impedance matching. By virtue of the bridge implementation of the quadruple jumper configuration, the input (IN) and output (OUT) of the overall or effective CMR filter may be in the same layer of the stack—here, layer 520*t*.

Figure 5F:
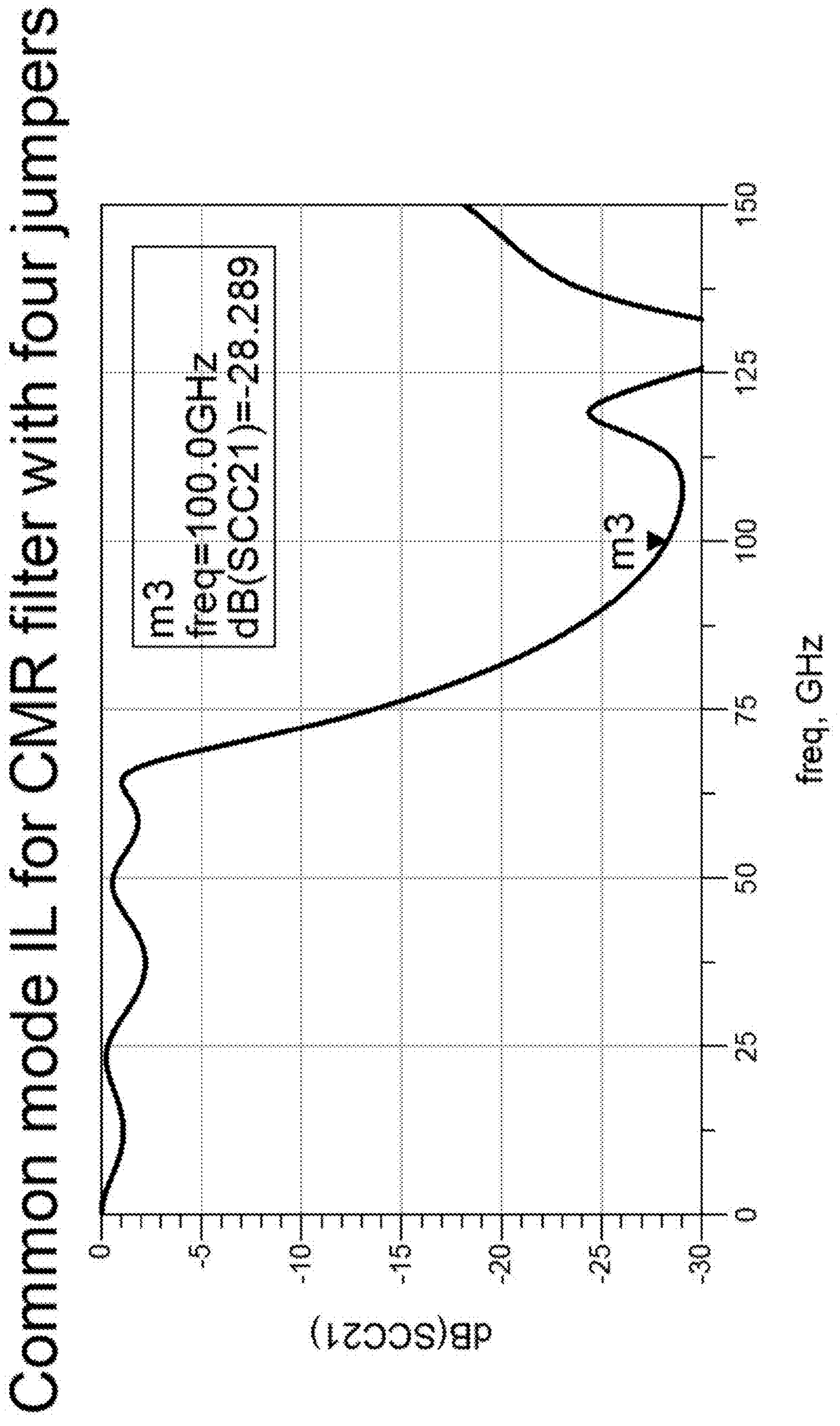
Figure 5G:
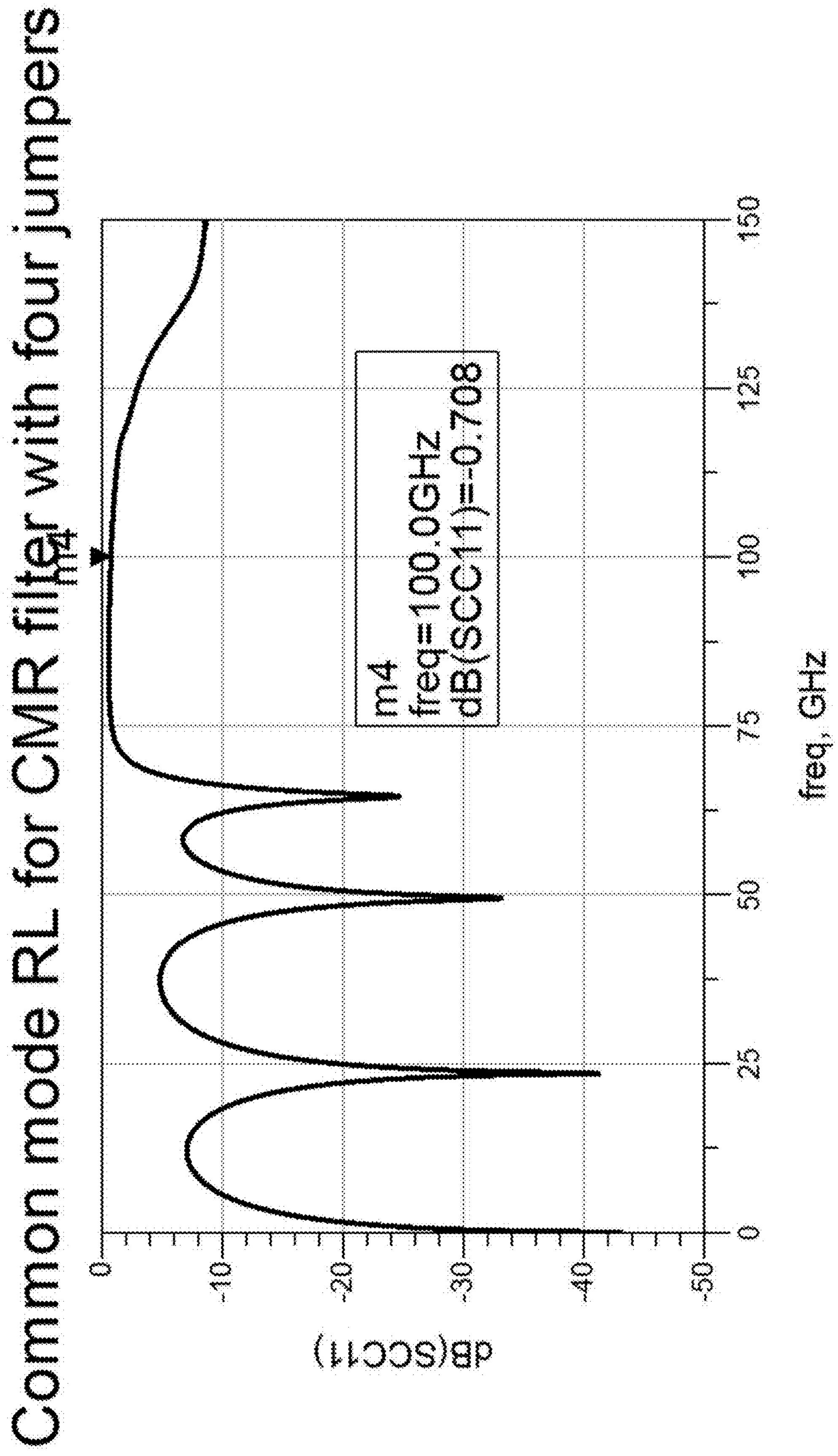
Figure 5H:
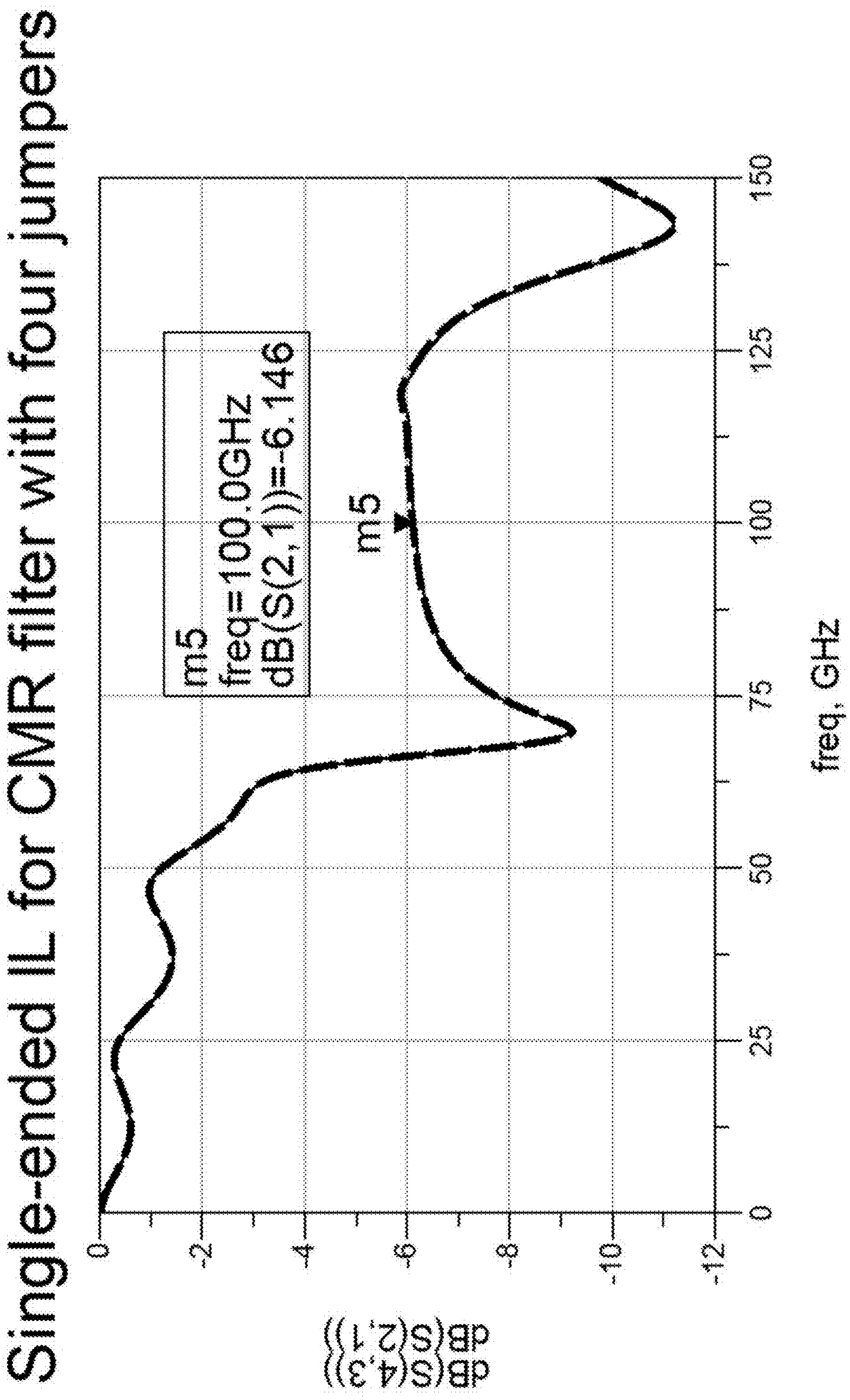
Figure 5I:
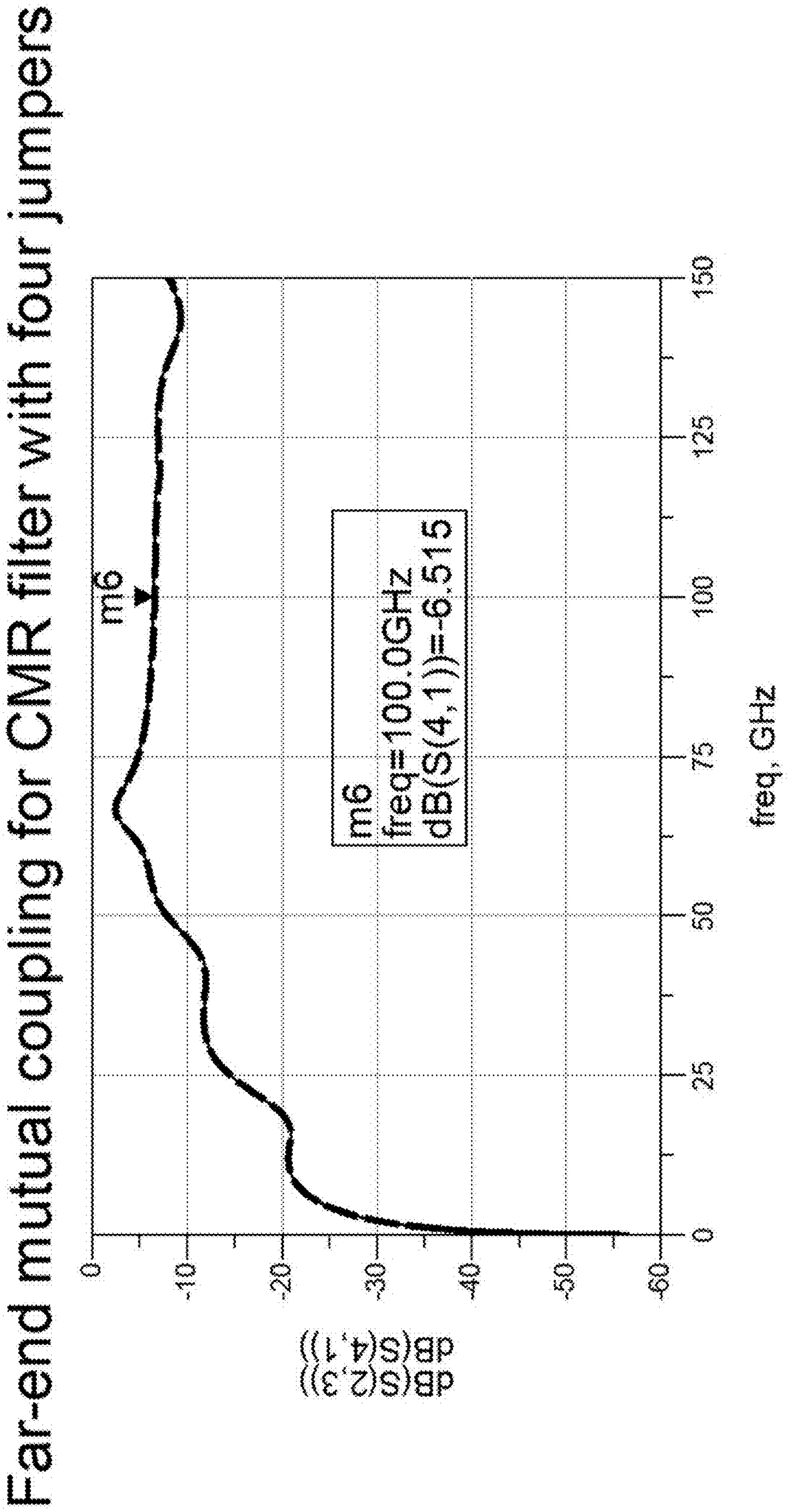
Figure 5J:
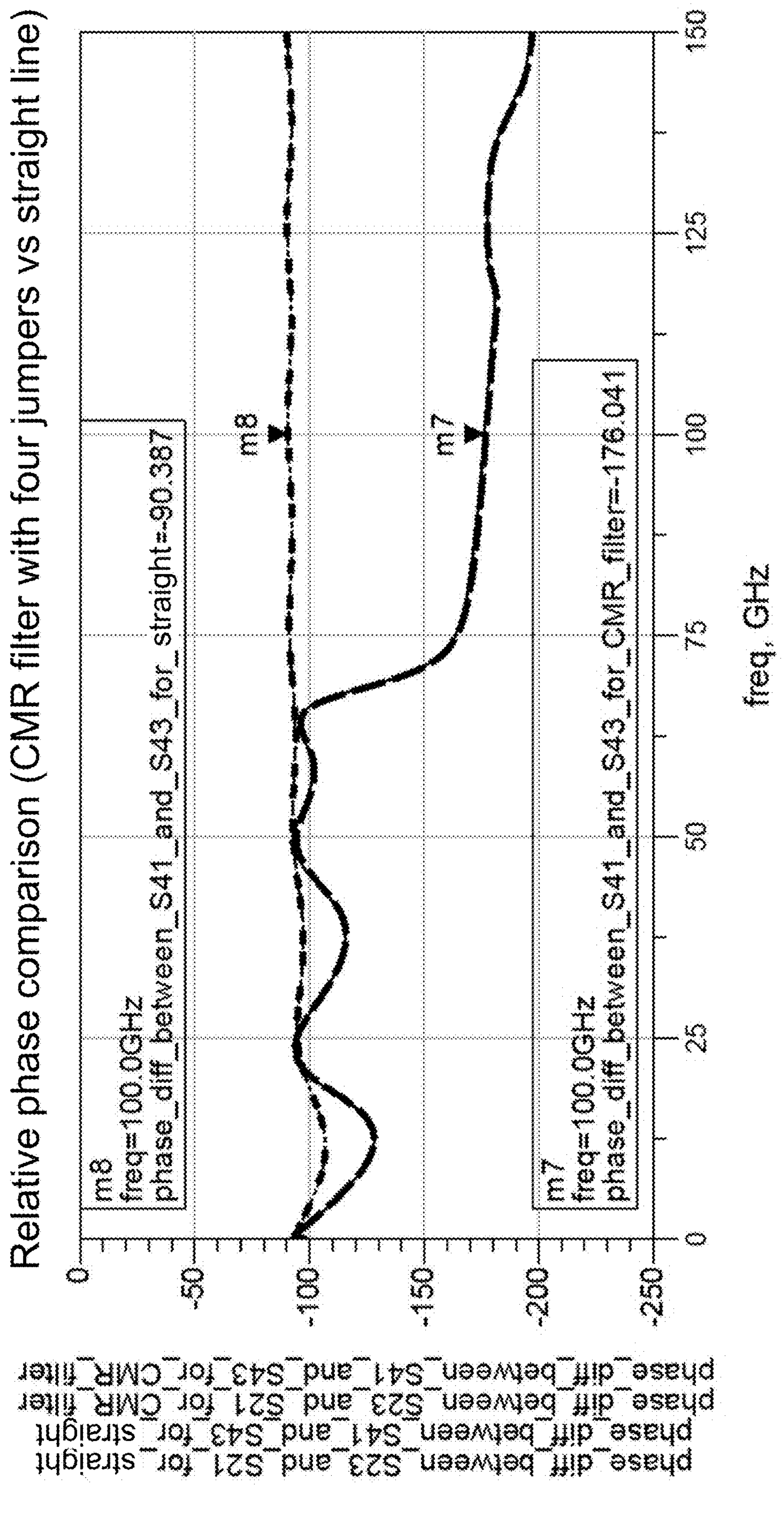

FIGS. 5D to 5J show example simulation results for the quadruple jumper configuration shown in FIGS. 5A to 5C. As can be seen in FIG. 5F, for instance, the quadruple jumper configuration achieves CMRR of 28.289 dB at 100 GHz. The mutual coupling further approaches single-ended through at −6.515 dB (FIG. 5I) versus −6.146 dB (FIG. 5H). The relative phase difference (FIG. 5J) for the configuration is −176.041 degrees (which is even nearer to −180 degrees) as compared to −90.387 degrees in a case where straight differential lines are used without any jumper configuration.

In scenarios where individual jumper configurations are implemented for different differential trace pairs—e.g., a first jumper configuration for the differential traces for XI and inverted XI, a second jumper configuration for the differential traces for XQ and inverted XQ, a third jumper configuration for the differential traces for YI and inverted YI, and a fourth jumper configuration for the differential traces for YQ and inverted YQ—two or more of the jumper configurations may be positioned directly adjacent to one another, such as in-line with one another along the y-direction in FIG. 1B. Additionally, or alternatively, two or more of the jumper configurations may be positioned at an offset from one another along the x-direction in FIG. 1B. In this way, any arrangement of jumper configurations is possible for the different pairs of differential traces.

Figure 6A:
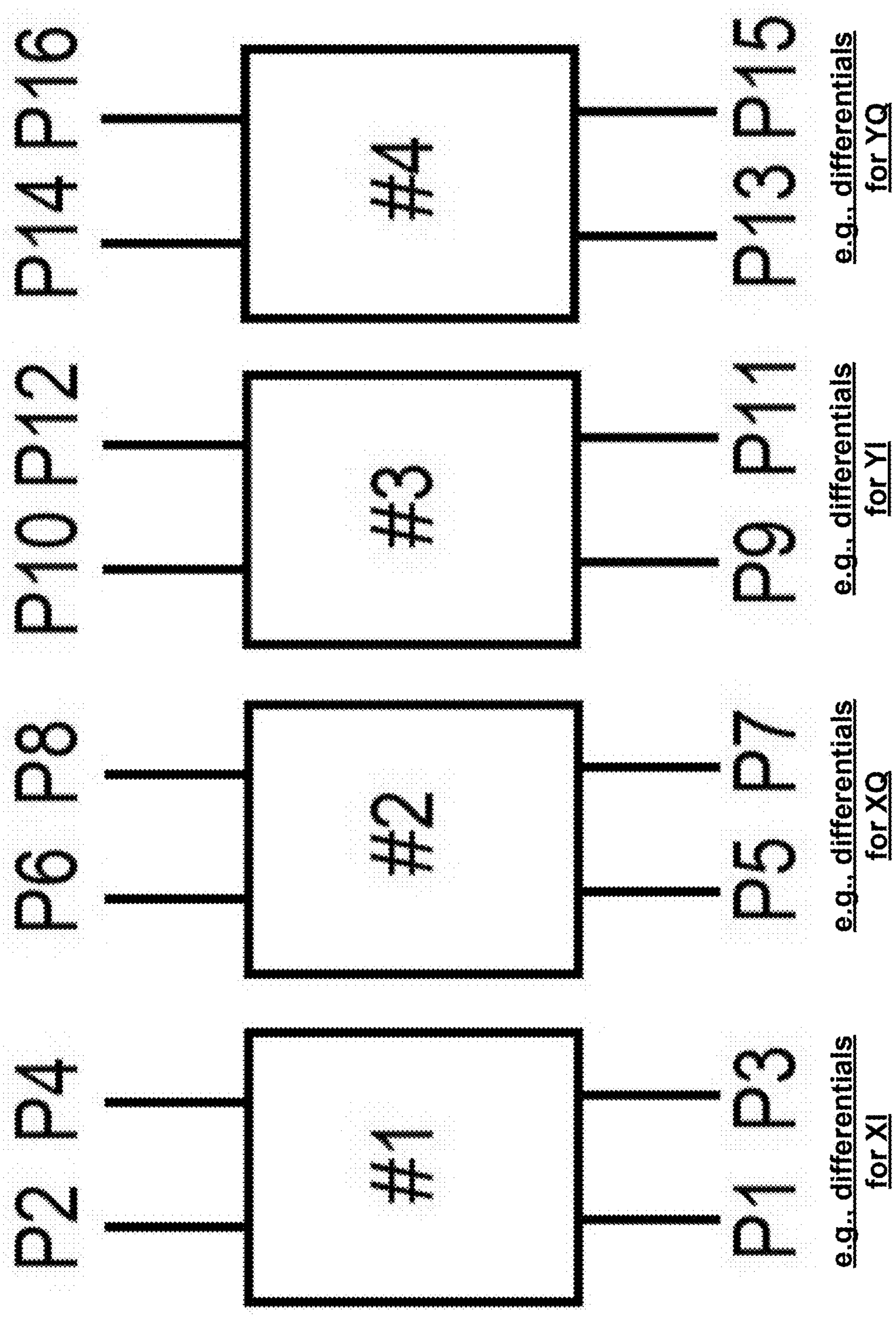
FIG. 6A shows an example arrangement of jumper configurations for XI, XQ, YI, and YQ differentials, in accordance with various aspects described herein.
Figure 6B:
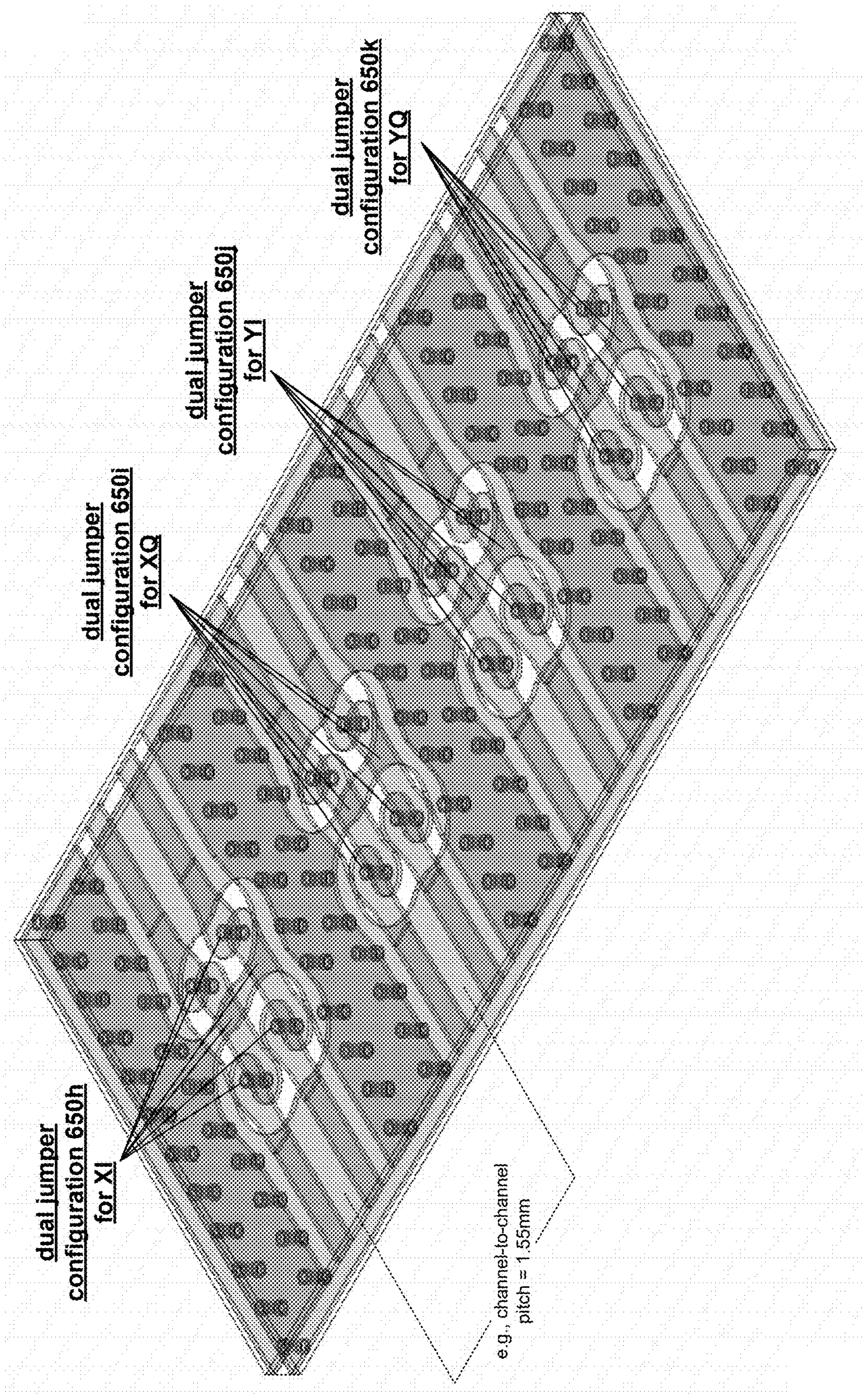
FIGS. 6B and 6C show a perspective view and a top down view, respectively, of a portion of a flex that is configured with the jumper configurations arranged in the manner shown in FIG. 6A.
Figure 6C:
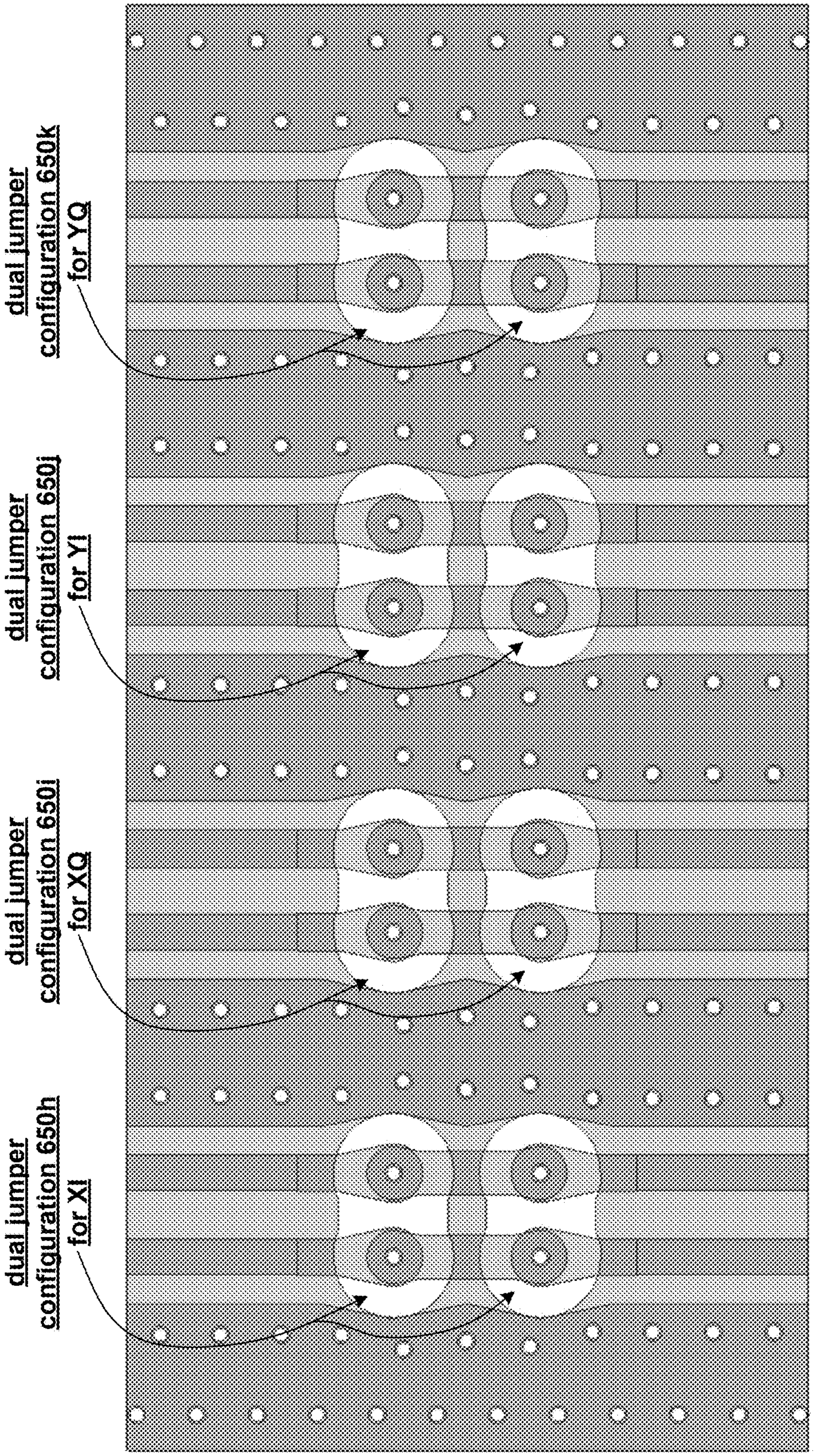
Figure 6D:
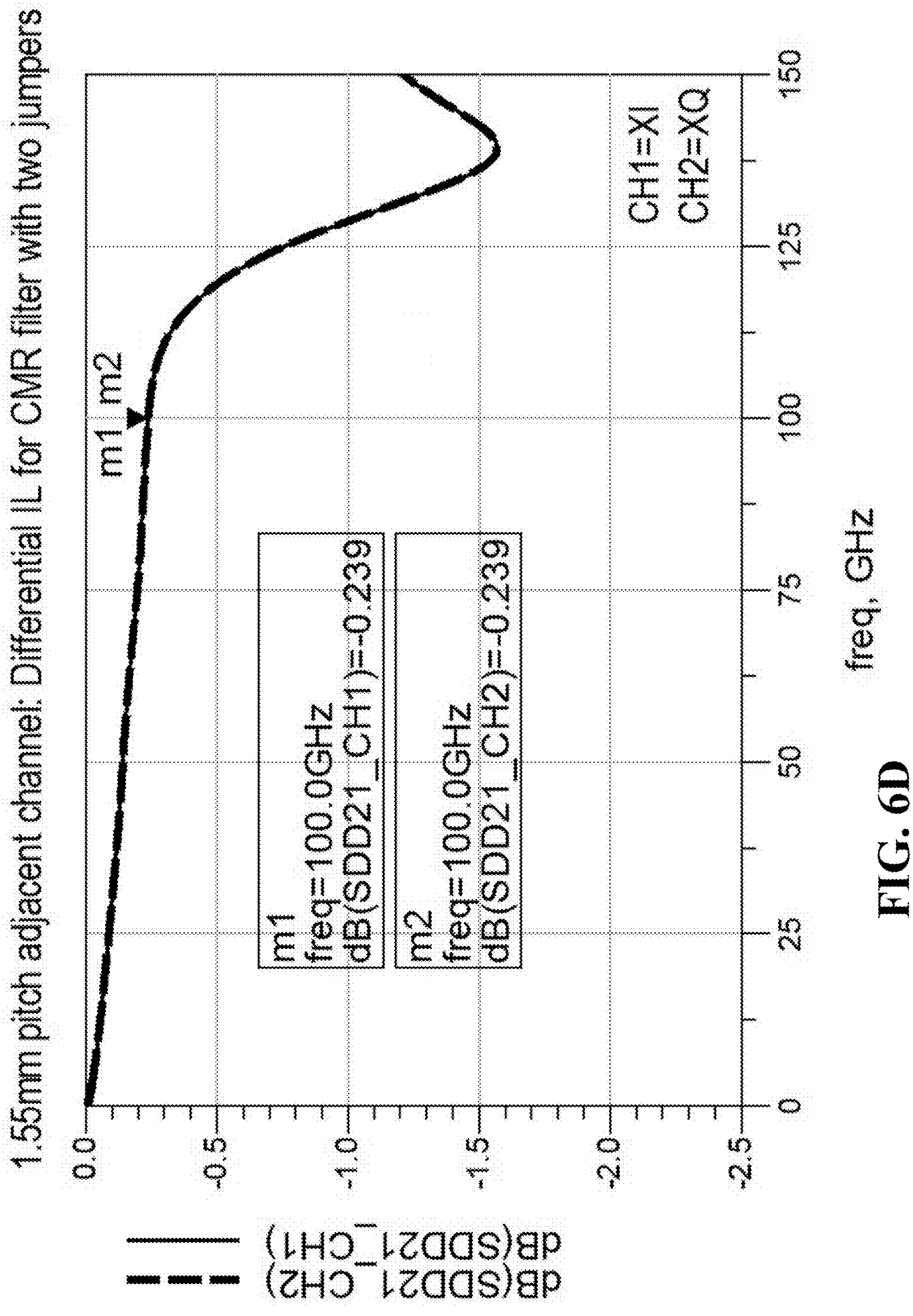
FIGS. 6D to 6G show example simulation results for the jumper configuration arrangement shown in FIGS. 6B and 6C.
Figure 6E:
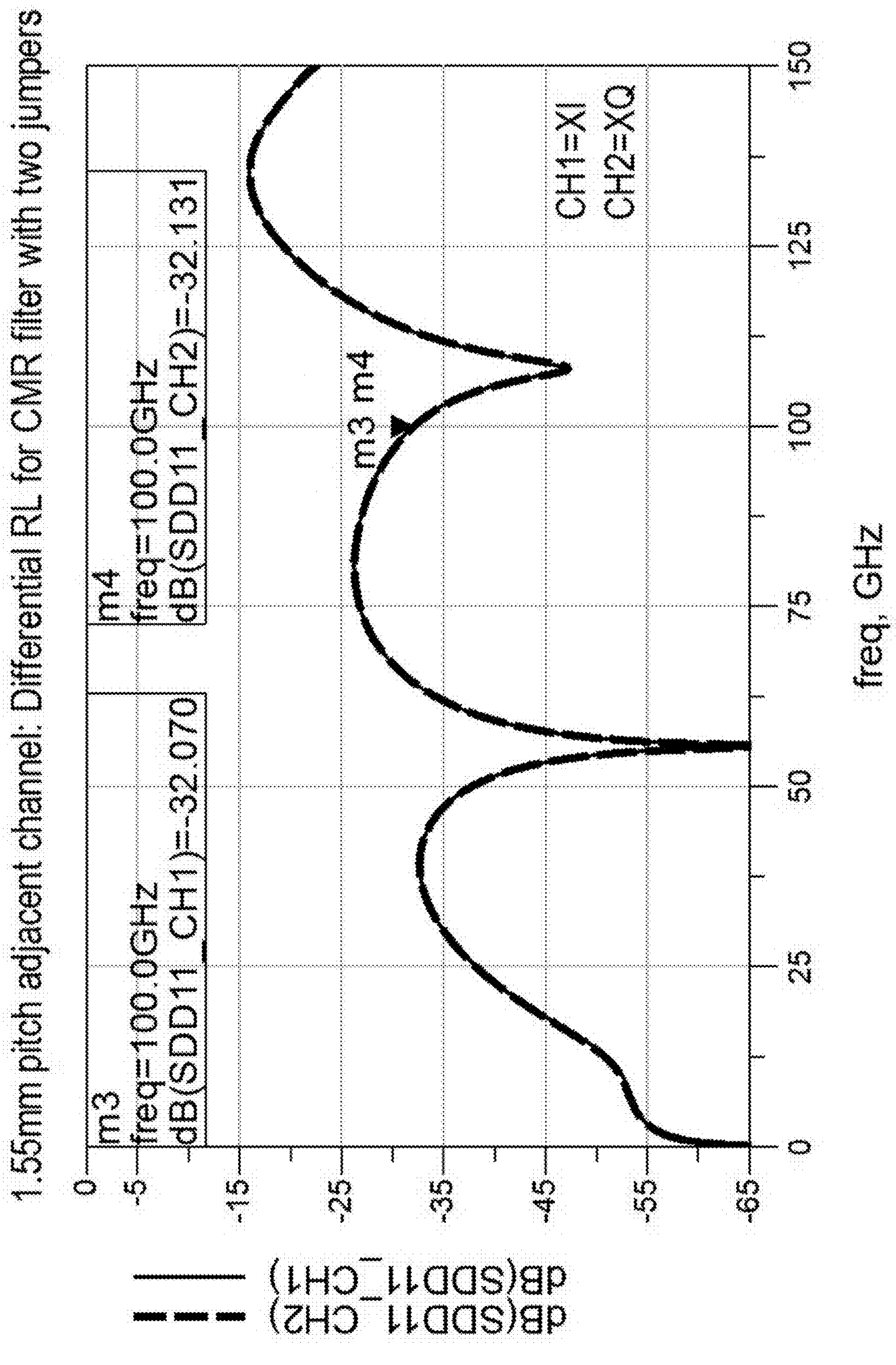
Figure 6F:
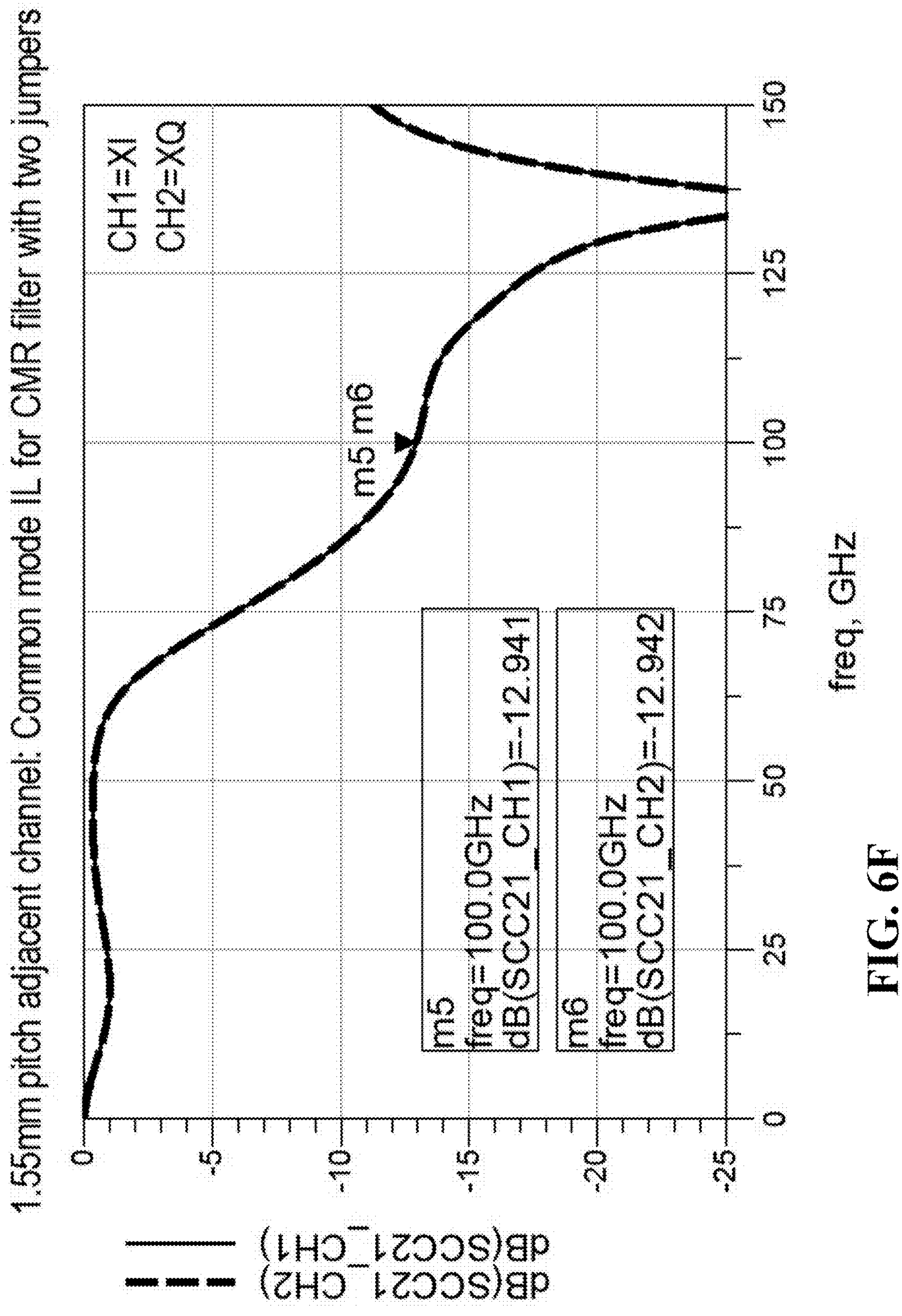

FIG. 6A shows an example arrangement of jumper configurations for XI, XQ, YI, and YQ differentials, in accordance with various aspects described herein. FIGS. 6B and 6C show a perspective view and a top down view, respectively, of a portion of a flex 620 that is configured with the jumper configurations 650*h*, 650*i*, 650*j*, and 650*k* arranged in the manner shown in FIG. 6A. In certain embodiments, the flex 620 may be the same as or similar to the flex 120 described above with respect to FIGS. 1A to 1C and/or the flex 220 described above with respect to FIGS. 2A and 2B, and the jumper pairs in the jumper configurations 650*h*, 650*i*, 650*j*, and 650*k* may each be the same as or similar to the jumper configuration 150 described above with respect to respect to FIG. 1B and/or the jumper configuration 250 described above with respect to FIGS. 2A and 2B. As depicted in FIGS. 6B and 6C, the jumper configurations 650*h*, 650*i*, 650*j*, and 650*k* (here, implemented using two jumper pairs each) may be positioned exactly adjacent to one another.

Figure 6G:
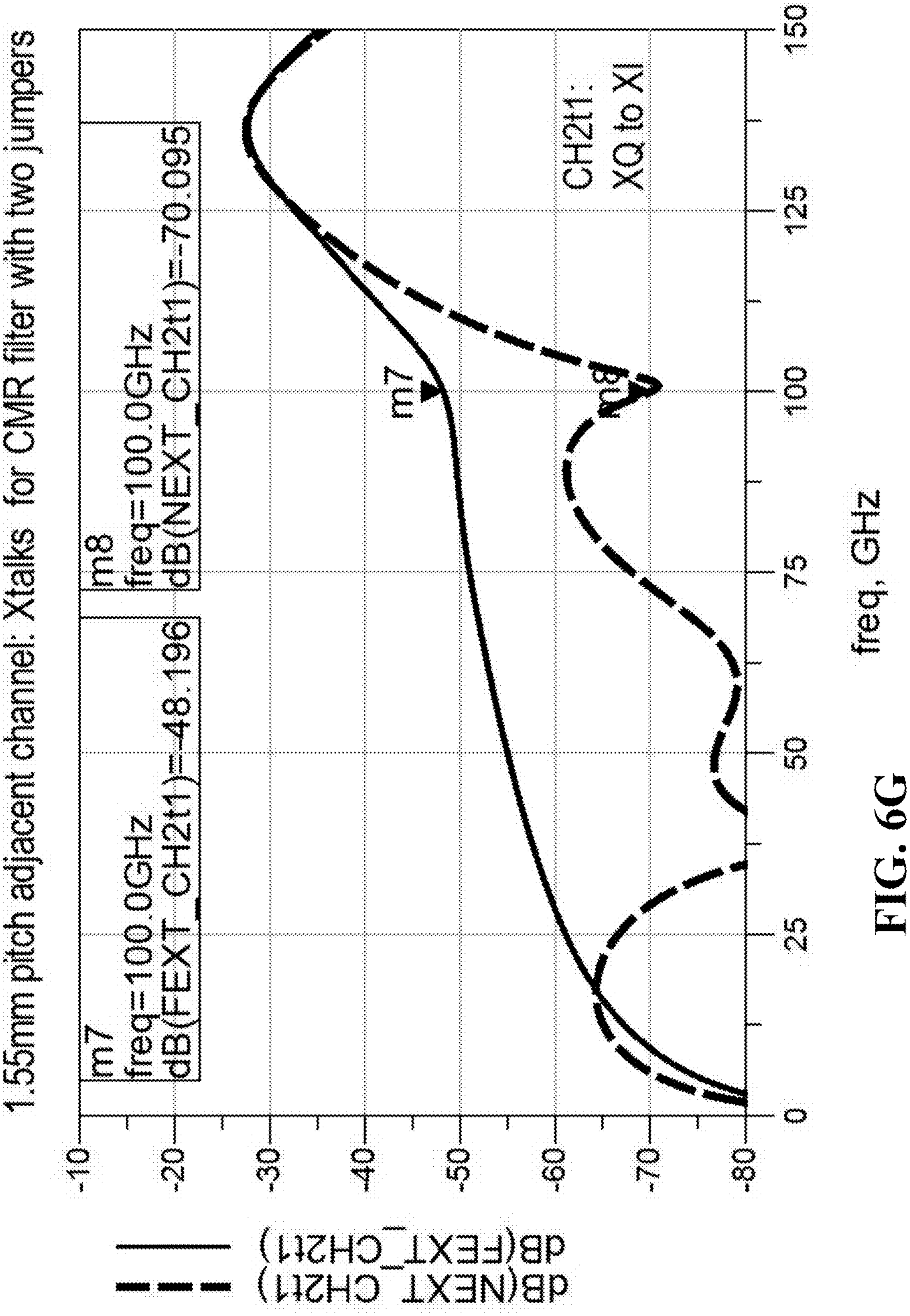

FIGS. 6D to 6G show example simulation results for the jumper configuration arrangement shown in FIGS. 6B and 6C. As can be seen in FIG. 6G, for instance, the near-end crosstalk (XTalk) is −70.095 dB and the far-end XTalk is −48.196 dB.

Figure 7A:
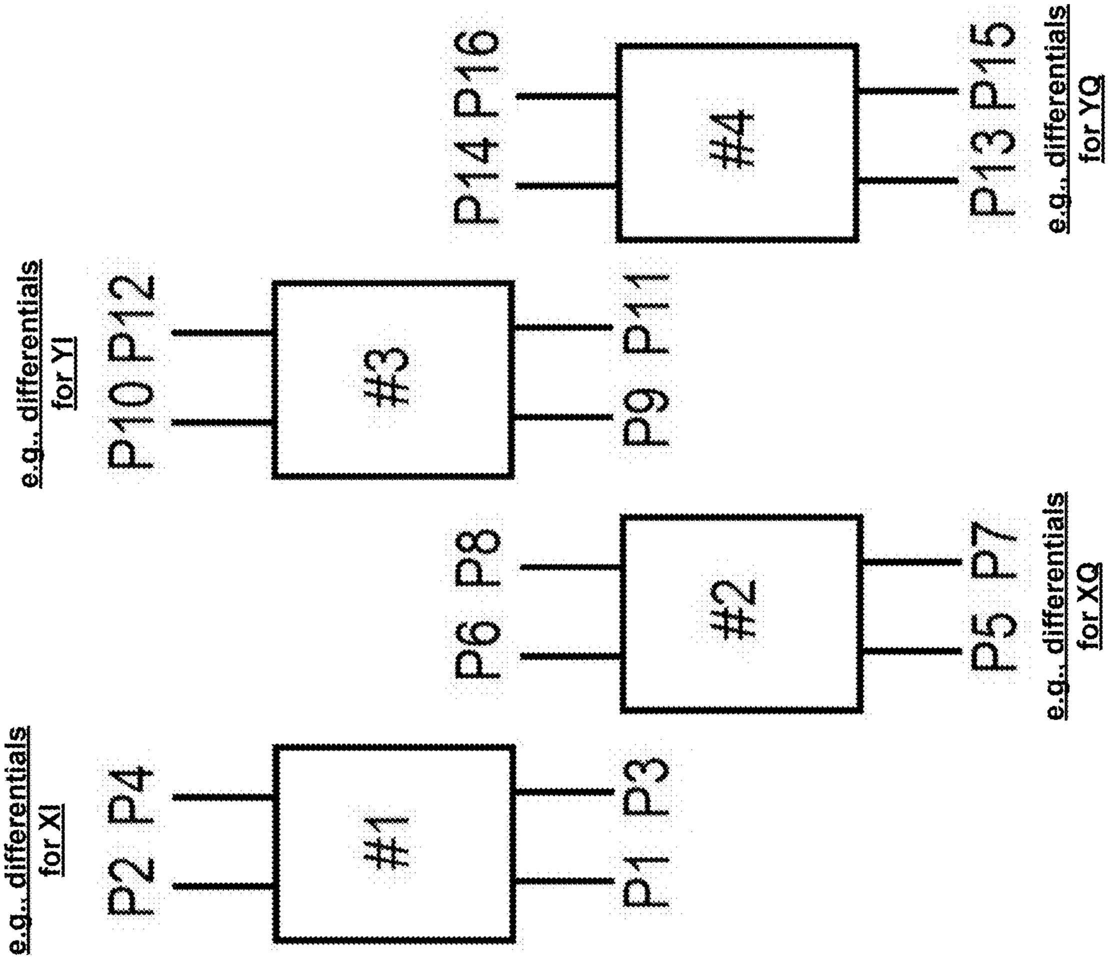
FIG. 7A shows another example arrangement of jumper configurations for XI, XQ, YI, and YQ differentials, in accordance with various aspects described herein.
Figure 7B:
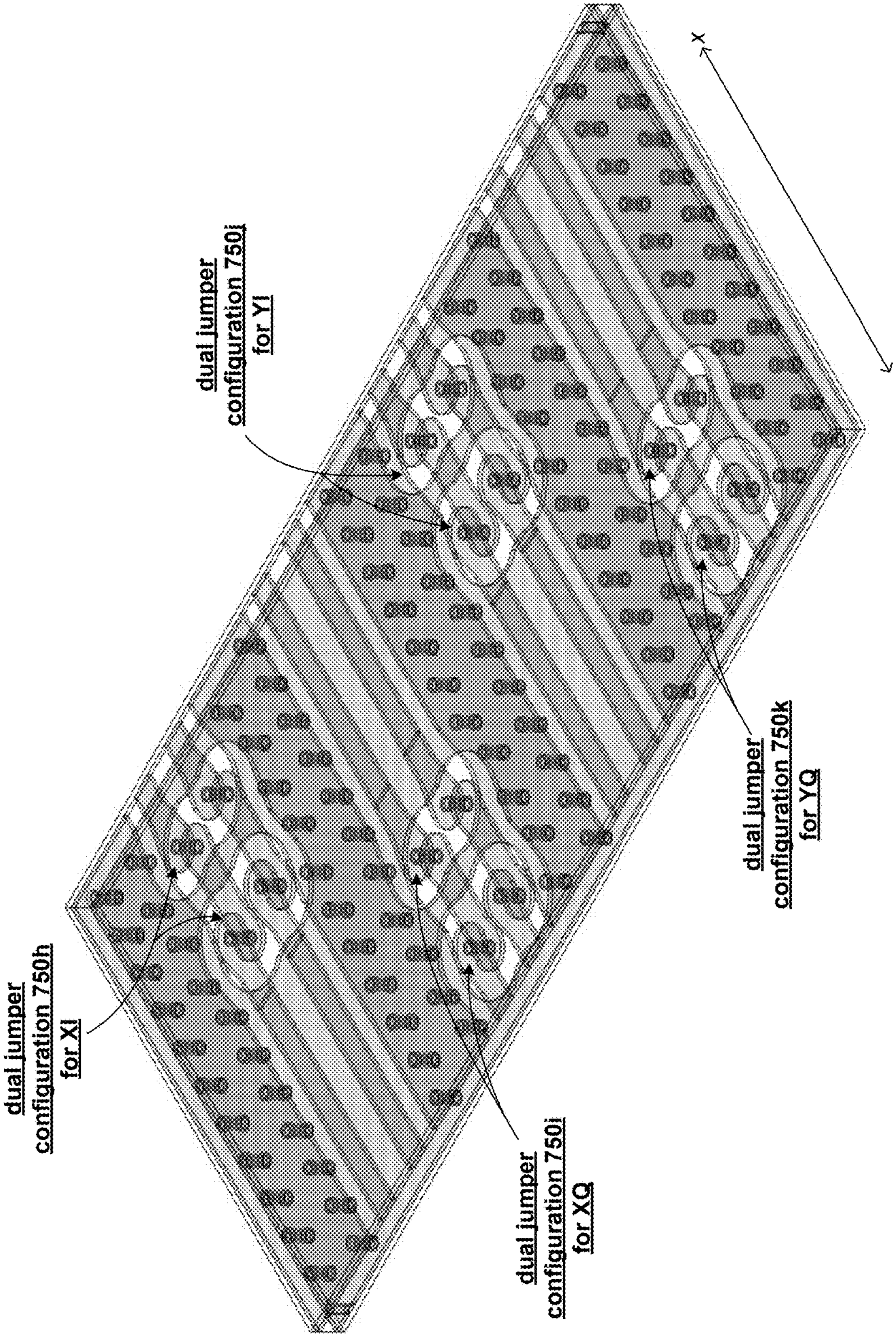
FIGS. 7B and 7C show a perspective view and a top down view, respectively, of a portion of a flex that is configured with the jumper configurations arranged in the manner shown in FIG. 7A.
Figure 7C:
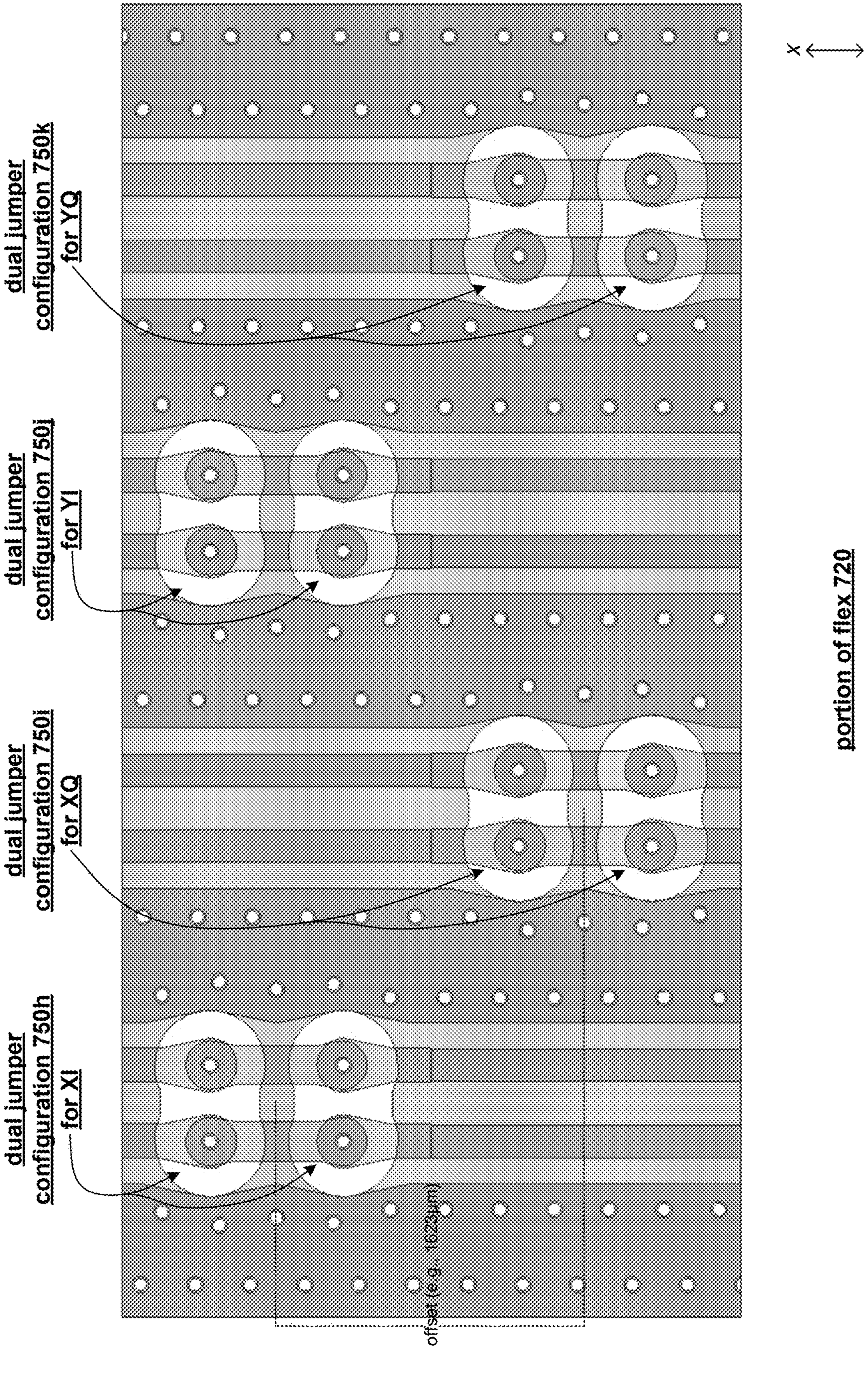
Figure 7D:
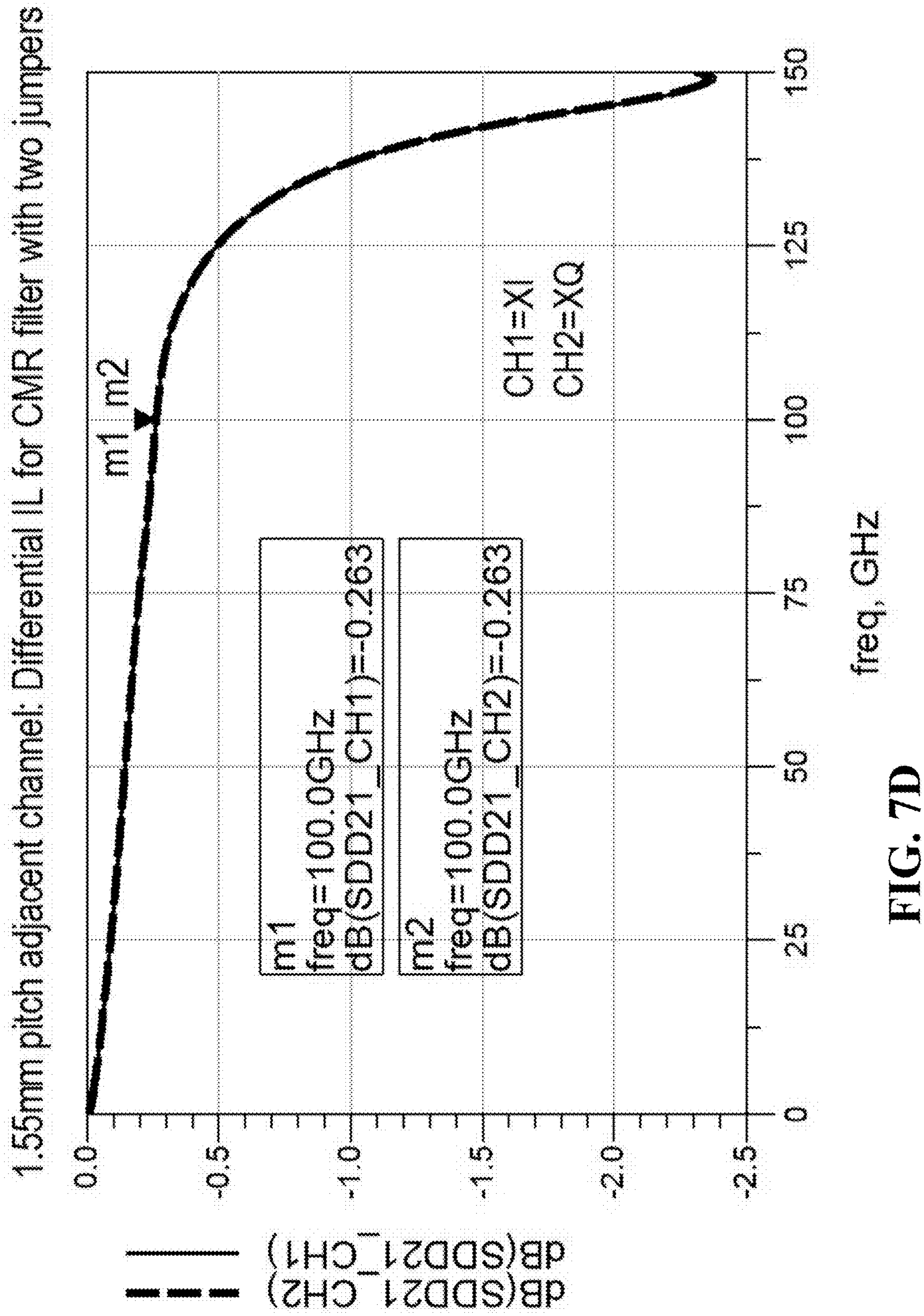
FIGS. 7D to 7G show example simulation results for the jumper configuration arrangement shown in FIGS. 7B and 7C.
Figure 7E:
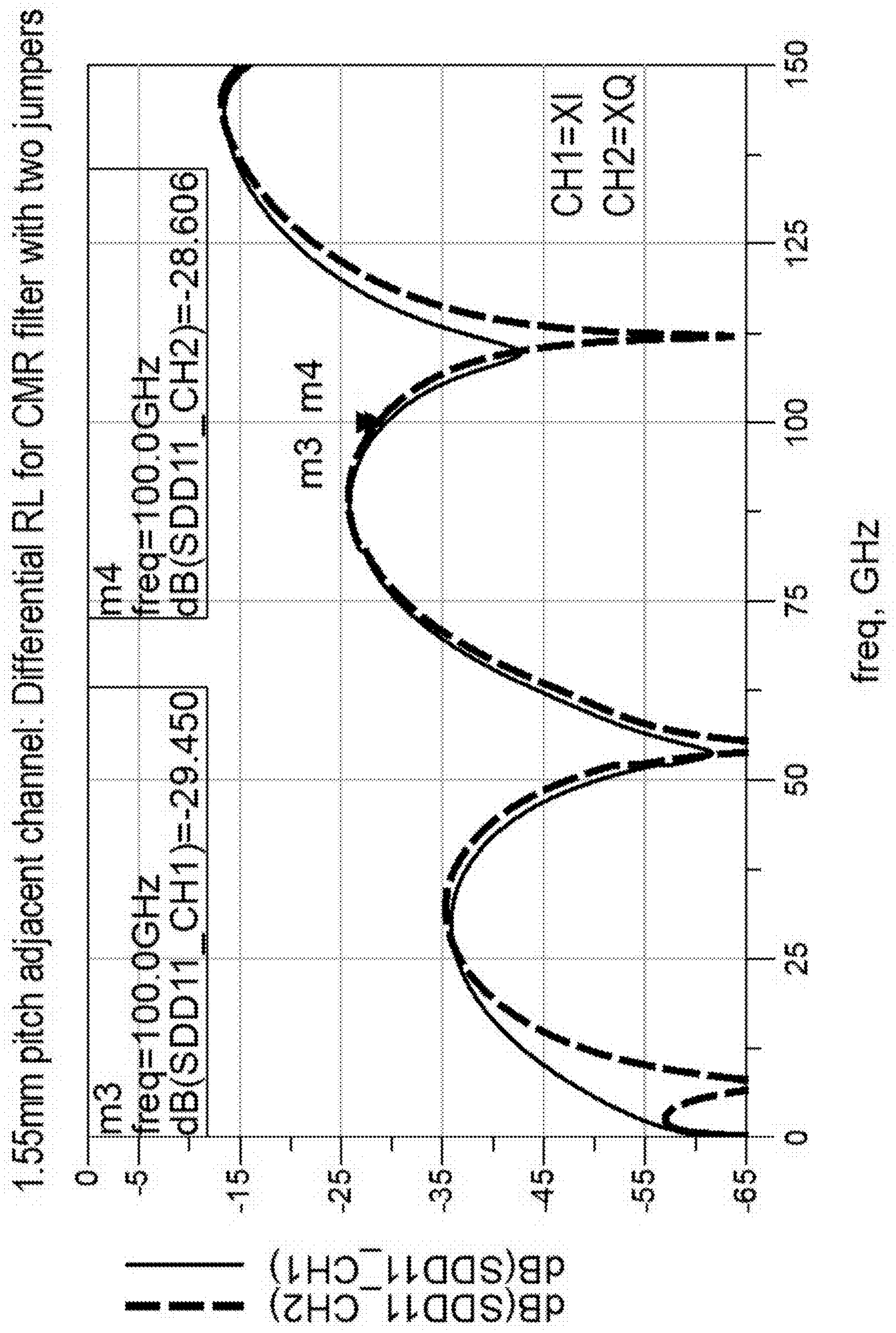
Figure 7F:
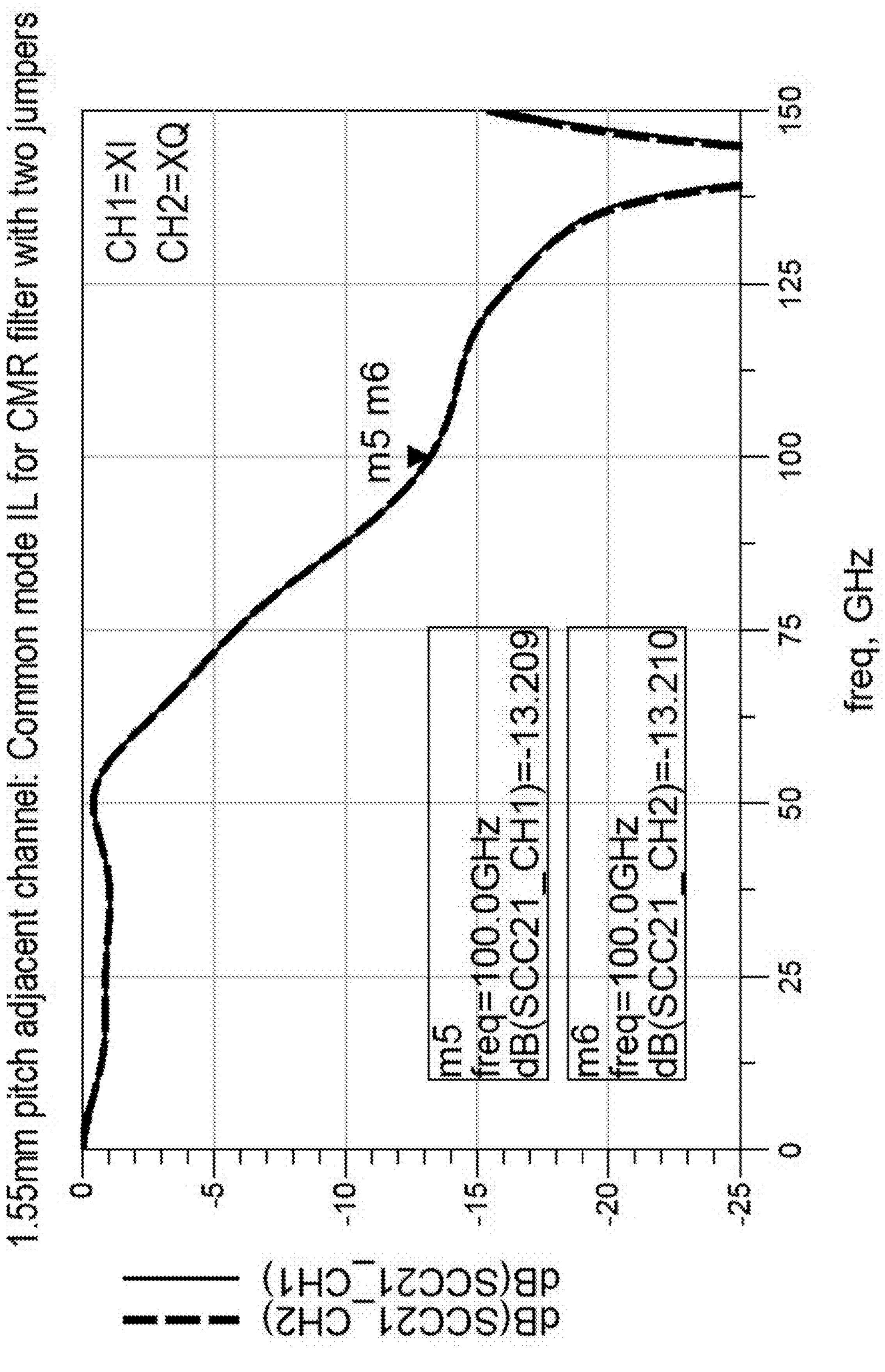

FIG. 7A shows another example arrangement of jumper configurations for XI, XQ, YI, and YQ differentials, in accordance with various aspects described herein. FIGS. 7B and 7C show a perspective view and a top down view, respectively, of a portion of a flex 720 that is configured with the jumper configurations 750*h*, 750*i*, 750*j*, and 750*k* arranged in the manner shown in FIG. 7A. In certain embodiments, the flex 720 may be the same as or similar to the flex 120 described above with respect to FIGS. 1A to 1C and/or the flex 220 described above with respect to FIGS. 2A and 2B, and the jumper pairs in the jumper configurations 750*h*, 750*i*, 750*j*, and 750*k* may each be the same as or similar to the jumper configuration 150 described above with respect to respect to FIG. 1B and/or the jumper configuration 250 described above with respect to FIGS. 2A and 2B. As depicted in FIGS. 7B and 7C, the jumper configurations 750*h*, 750*i*, 750*j*, and 750*k* (here, implemented using two jumper pairs each) may be positioned at particular offsets from one to the next (here, about 1623 μm). Of course, one skilled in the art would understand and appreciate that the offset between any two adjacent jumper configurations (e.g., the one for XI and the one for XQ, the one for XQ and the one for YI, etc.) may be adjusted or selected so as to achieve a desired CMR filtering characteristic.

Figure 7G:
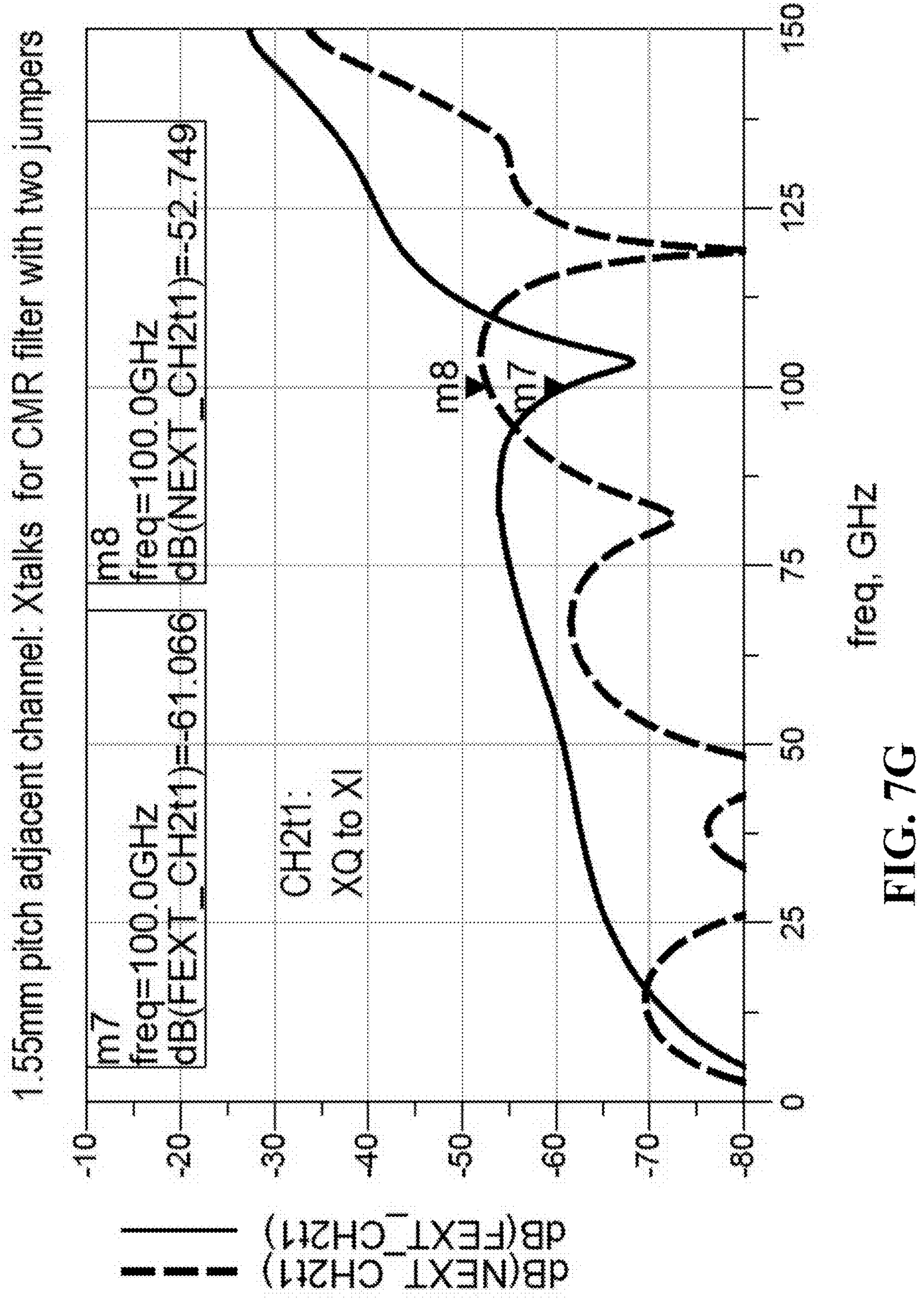
Figure 8A:
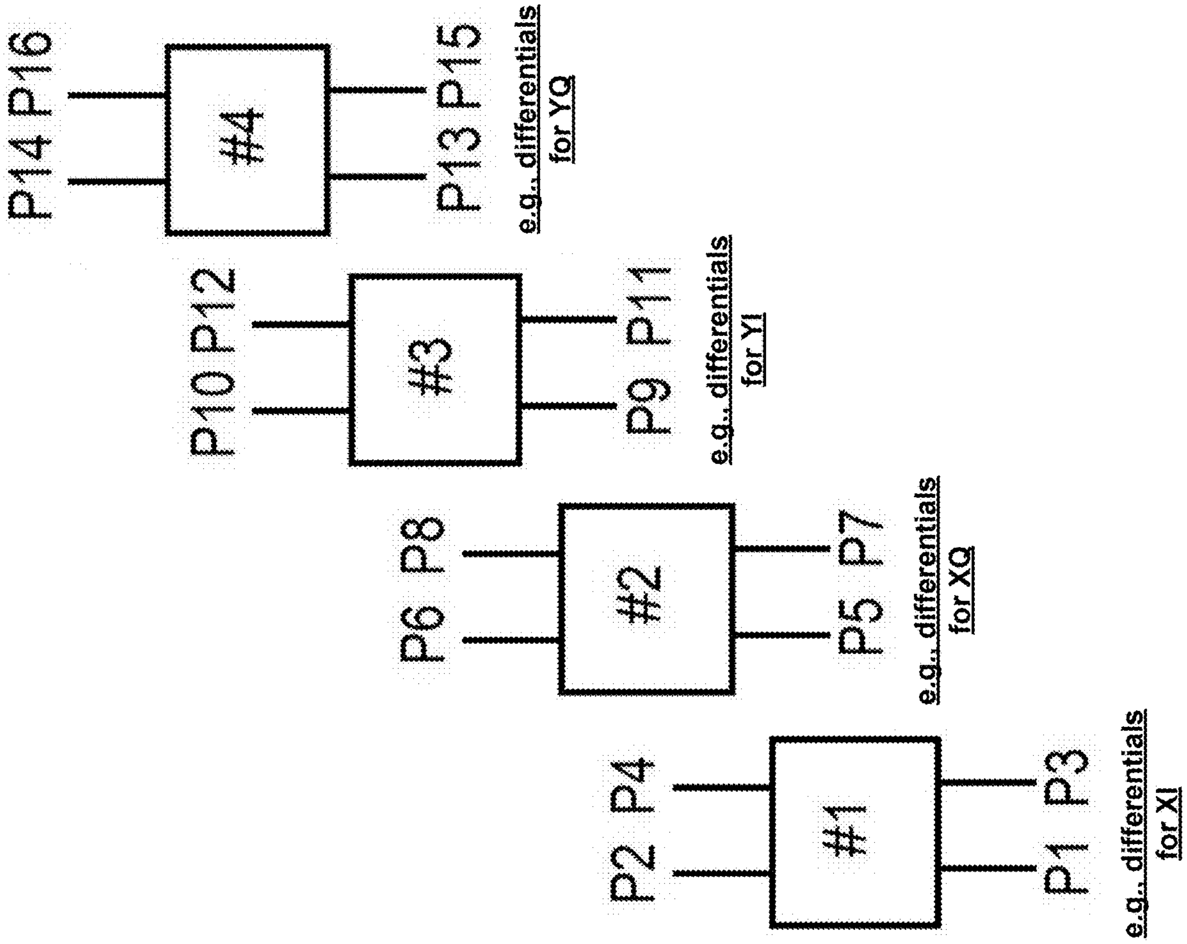
FIG. 8A shows a further example arrangement of jumper configurations for XI, XQ, YI, and YQ differentials, in accordance with various aspects described herein.

FIGS. 7D to 7G show example simulation results for the jumper configuration arrangement shown in FIGS. 7B and 7C. As can be seen in FIG. 7G, for instance, the near-end crosstalk (XTalk) is −52.749 dB and the far-end XTalk is −61.066 dB. FIG. 8A shows another example arrangement of jumper configurations for XI, XQ, YI, and YQ differentials, in accordance with various aspects described herein. The arrangements shown in FIGS. 7A and 8A may be used for lower far-end XTalk applications. The positioning offset from one jumper configuration to the next may be adjusted to achieve even lower near-end XTalk and far-end XTalk.

Figure 9:
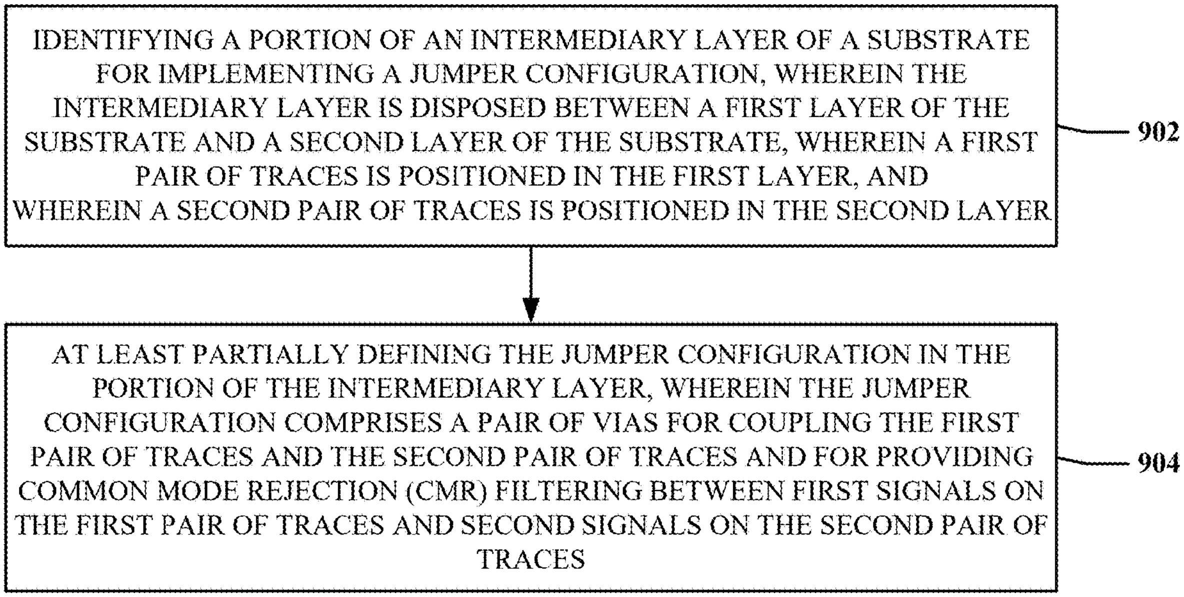
FIG. 9 depicts an illustrative embodiment of a method in accordance with various aspects described herein.

FIG. 9 depicts an illustrative embodiment of a method 900 in accordance with various aspects described herein.

At 902, the method may include identifying a portion of an intermediary layer of a substrate for implementing a jumper configuration, wherein the intermediary layer is disposed between a first layer of the substrate and a second layer of the substrate, wherein a first pair of traces is positioned in the first layer, and wherein a second pair of traces is positioned in the second layer. For instance, the method may include identifying a portion of an intermediary layer of a substrate for implementing a jumper configuration similar to that described above with respect to one or more embodiments. As an example, a portion of a core/dielectric layer may be identified as being suitable for implementing a jumper pair, where the identification may be made based on one or more criteria, such as a desired jumper pair arrangement pattern (FIGS. 6A, 7A, and/or 8A), a desired positioning of jumper pairs with respect to one or more edges of the substrate (e.g., within a threshold distance from an edge of the substrate along a longitudinal axis of the edge, within a threshold distance from an edge of the substrate along a latitudinal axis of the edge, etc.), and/or a desired distance between jumpers in a jumper pair.

At 904, the method may include at least partially defining the jumper configuration in the portion of the intermediary layer, wherein the jumper configuration comprises a pair of vias for coupling the first pair of traces and the second pair of traces and for providing common mode rejection (CMR) filtering between first signals on the first pair of traces and second signals on the second pair of traces. For instance, the method may include at least partially defining the jumper configuration in the portion of the intermediary layer similar to that described above with respect to one or more embodiments. For example, the pair of vias may be formed using lithography/mechanical drilling techniques and plated and/or filled with conductive material, such that pairs of input traces of a differential pair and output traces of the differential pair, in different layers of the substrate, are electrically coupled to one another and such that the jumper configuration functions as a CMR filter between signals on those pairs of traces. As should be understood based on the description above with regard to various embodiments of the jumper configuration, bridge traces and anti-pads may also be correspondingly defined (with selected dimension(s)/shape(s)) to arrive at cascaded jumper pair arrangements that provide enhanced CMR filtering.

While for purposes of simplicity of explanation, the respective processes are shown and described as a series of blocks in FIG. 9, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can comprise the widest variety of storage media including tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized. It is also to be understood and appreciated that the subject matter in one or more dependent claims may be combined with that in one or more other dependent claims.

What is claimed is:

1. A substrate, comprising:

a first layer, a second layer, and an intermediary layer between the first layer and the second layer;

a first pair of traces positioned in the first layer;

a second pair of traces positioned in the second layer; and a jumper configuration at least partially defined in the intermediary layer, wherein the jumper configuration comprises a pair of vias that electrically couples the first pair of traces to the second pair of traces and that provides common mode rejection (CMR) filtering between first signals on the first pair of traces and second signals on the second pair of traces.

2. The substrate of claim 1, wherein the substrate comprises a flexible printed circuit (FPC), a ceramic substrate, a high-density build-up (HDBU) substrate, or a substrate-like printed circuit board (PCB) (SLP).

3. The substrate of claim 1, wherein the first pair of traces, the second pair of traces, and the pair of vias are electrically conductive.

4. The substrate of claim 3, wherein the pair of vias is at least partially formed using lithography and plating techniques.

5. The substrate of claim 3, wherein the pair of vias is at least partially formed using mechanical drilling and plating techniques.

6. A substrate, comprising:

a first layer, a second layer, and an intermediary layer between the first layer and the second layer;

a first pair of traces positioned in the first layer;

a second pair of traces positioned in the second layer; and a jumper configuration at least partially defined in the intermediary layer, wherein the jumper configuration comprises a pair of vias that are configured for coupling the first pair of traces and the second pair of traces and for providing common mode rejection (CMR) filtering between first signals on the first pair of traces and second signals on the second pair of traces, and wherein one or more dimensions associated with the pair of vias are selected such that a desired amount of the CMR filtering is provided between the first signals and the second signals.

7. The substrate of claim 6, wherein the one or more dimensions include a length of each via in the pair of vias, a diameter of each via in the pair of vias, or a combination thereof.

8. The substrate of claim 1, wherein the first signals are fed from a transmitter (Tx) application specific integrated circuit (ASIC), and wherein the second signals are fed to a coherent driver modulator (CDM).

9. The substrate of claim 1, wherein the first signals are fed from an intradyne coherent receiver (ICR) or a micro-ICR (μICR), and wherein the second signals are fed to a receiver (Rx) application specific integrated circuit (ASIC).

10. The substrate of claim 1, wherein the first pair of traces and the second pair of traces correspond to a pair of differential signals.

11. The substrate of claim 1, wherein the intermediary layer is at least partially composed of dielectric material.

12. The substrate of claim 1, further comprising:

a third pair of traces positioned in the first layer; and an additional jumper configuration at least partially defined in the intermediary layer and arranged in a cascaded manner with respect to the jumper configuration, wherein the additional jumper configuration comprises a second pair of vias that are configured for coupling the second pair of traces and the third pair of traces and for providing further CMR filtering between the second signals and third signals on the third pair of traces.

13. The substrate of claim 1, wherein each of the first pair of traces and the second pair of traces is surrounded by a respective anti-pad.

14. The substrate of claim 13, wherein one or more of a shape and a dimension of each respective anti-pad are selected to provide differential impedance matching.

15. An apparatus, comprising:

first and second components of a communications system; and a substrate that interconnects the first and second components, the substrate having a first layer, a second layer, and an intermediary layer between the first layer and the second layer, a first pair of traces positioned in the first layer, a second pair of traces positioned in the second layer, a third pair of traces positioned in the first layer, and a jumper configuration at least partially defined in the intermediary layer, wherein the jumper configuration comprises a first pair of vias that electrically couples the first pair of traces to the second pair of traces and a second pair of vias that electrically couples the second pair of traces to the third pair of traces.

16. The apparatus of claim 15, wherein the substrate comprises a flexible printed circuit (FPC), a ceramic substrate, a high-density build-up (HDBU) substrate, or a substrate-like printed circuit board (PCB) (SLP).

17. The apparatus of claim 15, wherein the first and second pairs of vias are at least partially formed using lithography and plating techniques.

18. The apparatus of claim 15, wherein the first and second pairs of vias are at least partially formed using mechanical drilling and plating techniques.

19. The apparatus of claim 15, wherein the intermediary layer is at least partially composed of dielectric material.

20. The apparatus of claim 15, wherein the first pair of vias provide common mode rejection (CMR) filtering between first signals on the first pair of traces and second signals on the second pair of traces, and the second pair of vias provide further CMR filtering between the second signals and third signals on the third pair of traces.

* * * * *